United States Patent
Lee et al.

(10) Patent No.: US 11,849,143 B2
(45) Date of Patent: Dec. 19, 2023

(54) IMAGE DECODING METHOD AND APPARATUS BASED ON MOTION PREDICTION USING MERGE CANDIDATE LIST IN IMAGE CODING SYSTEM

(71) Applicant: LG ELECTRONICS INC., Seoul (KR)

(72) Inventors: Jaeho Lee, Seoul (KR); Seunghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/798,087

(22) Filed: Feb. 21, 2020

(65) Prior Publication Data
US 2020/0195966 A1    Jun. 18, 2020

Related U.S. Application Data

(63) Continuation of application No. PCT/KR2019/011580, filed on Sep. 6, 2019.
(Continued)

(51) Int. Cl.
*H04N 19/90* (2014.01)
*H04N 19/573* (2014.01)
(Continued)

(52) U.S. Cl.
CPC ........ *H04N 19/573* (2014.11); *H04N 19/176* (2014.11); *H04N 19/52* (2014.11)

(58) Field of Classification Search
CPC ..... H04N 19/573; H04N 19/176; H04N 19/52
See application file for complete search history.

(56) References Cited

U.S. PATENT DOCUMENTS

| | | | | |
|---|---|---|---|---|
| 6,275,532 B1 | * | 8/2001 | Hibi | H04N 19/517 |
| | | | | 375/E7.11 |
| 7,733,960 B2 | * | 6/2010 | Kondo | H04N 19/583 |
| | | | | 375/240.16 |

(Continued)

FOREIGN PATENT DOCUMENTS

| | | | | |
|---|---|---|---|---|
| CN | 107925758 A | | 4/2018 | |
| CN | 109922336 A | * | 6/2019 | ........... H04N 19/105 |

(Continued)

OTHER PUBLICATIONS

Lin S. et al. "Affine transform prediction t'o.r next gerseratfon video coding" ISO/IEC JTC1/SC29/WG11 MPEG2015/ m37525 Oct. 2015, Geneva, Switzerland (Year: 2015).*

(Continued)

*Primary Examiner* — Philip P. Dang
(74) *Attorney, Agent, or Firm* — Bryan Cave Leighton Paisner LLP

(57) ABSTRACT

An image decoding method performed by a decoding apparatus according to the present document includes constituting a candidate list for deriving motion information of a sub-block unit for a current block, wherein the merge candidate list includes constructed candidates; deriving control point motion vectors (CPMVs) for control points (CPs) of the current block based on the merge candidate list; deriving prediction samples for the current block based on the CPMVs; and generating a reconstructed picture for the current block based on the derived prediction samples, wherein the constructed candidates are derived based on combination of at least two of a first neighboring block in a first group, a second neighboring block in a second group, a third neighboring block in a third group and a fourth neighboring block, and the first neighboring block, the second neighboring block and the third neighboring block (Continued)

and the fourth neighboring block constituting the combination have the same reference picture index.

3 Claims, 20 Drawing Sheets

Related U.S. Application Data

(60) Provisional application No. 62/728,068, filed on Sep. 6, 2018.

(51) Int. Cl.
*H04N 19/176* (2014.01)
*H04N 19/52* (2014.01)

(56) References Cited

U.S. PATENT DOCUMENTS

| | | | |
|---|---|---|---|
| 10,448,010 B2* | 10/2019 | Chen | H04N 19/139 |
| 10,560,712 B2* | 2/2020 | Zou | H04N 19/537 |
| 10,602,180 B2* | 3/2020 | Chen | H04N 19/70 |
| 10,631,002 B2* | 4/2020 | Li | H04N 19/147 |
| 10,701,390 B2* | 6/2020 | Li | H04N 19/176 |
| 10,798,403 B2* | 10/2020 | Ikai | H04N 19/52 |
| 10,805,630 B2* | 10/2020 | Li | H04N 19/176 |
| 10,873,760 B2* | 12/2020 | Chen | H04N 19/105 |
| 10,880,543 B2* | 12/2020 | Lv | H04N 19/52 |
| 2004/0136461 A1 | 7/2004 | Kondo et al. | |
| 2012/0163466 A1 | 6/2012 | Sugio et al. | |
| 2017/0332095 A1 | 11/2017 | Zou et al. | |
| 2018/0098062 A1* | 4/2018 | Li | H04N 19/70 |
| 2018/0192069 A1* | 7/2018 | Chen | H04N 19/176 |
| 2018/0270500 A1* | 9/2018 | Li | H04N 19/52 |
| 2018/0316918 A1* | 11/2018 | Drugeon | H04N 19/105 |
| 2019/0007682 A1* | 1/2019 | Kanoh | H04N 19/12 |
| 2019/0037231 A1* | 1/2019 | Ikai | H04N 19/513 |
| 2019/0058896 A1* | 2/2019 | Huang | H04N 19/159 |
| 2019/0082191 A1* | 3/2019 | Chuang | H04N 19/513 |
| 2019/0110061 A1* | 4/2019 | Park | H04N 19/44 |
| 2019/0124332 A1* | 4/2019 | Lim | H04N 19/137 |
| 2019/0191171 A1* | 6/2019 | Ikai | H04N 19/51 |
| 2019/0273943 A1* | 9/2019 | Zhao | H04N 19/139 |
| 2019/0335170 A1* | 10/2019 | Lee | H04N 19/52 |
| 2019/0342547 A1* | 11/2019 | Lee | H04N 19/147 |

FOREIGN PATENT DOCUMENTS

| | | | | |
|---|---|---|---|---|
| CN | 110868587 A | * | 3/2020 | ........... H04N 19/103 |
| EP | 2387003 A1 | * | 11/2011 | ....... G06F 17/30247 |
| EP | 3291557 A1 | | 3/2018 | |
| KR | 10-2018-0061025 A | | 6/2018 | |
| WO | 2017/156705 A1 | | 9/2017 | |
| WO | 18/008678 A1 | | 1/2018 | |
| WO | 18/066867 A1 | | 4/2018 | |
| WO | 18/067823 A1 | | 4/2018 | |
| WO | 2018/128379 A1 | | 7/2018 | |

OTHER PUBLICATIONS

Haitao Yang et al., "Description of Core Experiment 4 (CE4): Inter prediction and motion vector coding", JVET-K1024-V2, Joint Video Experts Team (JVET) of ITU-T SG 16 WP 3 and ISO/IEC JTC 1/SC 29/WG 11, 11th Meeting: Ljubljana, SI, Jul. 10-18, 2018, 1-45.

\* cited by examiner

FIG. 3
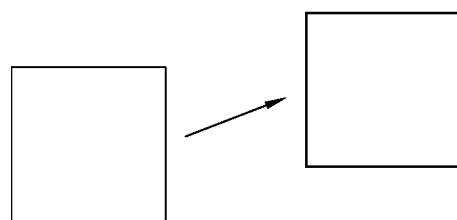
Translate
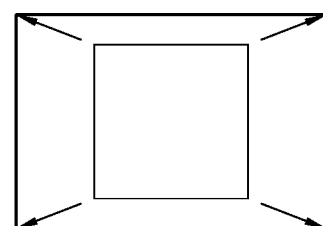
Scale
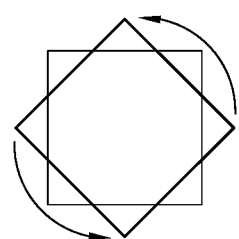
Rotate
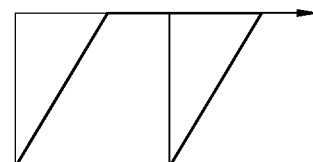
Shear

IMAGE DECODING METHOD AND APPARATUS BASED ON MOTION PREDICTION USING MERGE CANDIDATE LIST IN IMAGE CODING SYSTEM

CROSS-REFERENCE TO RELATED APPLICATIONS

Pursuant to 35 U.S.C. § 119(e), this application is a continuation of International Application PCT/KR2019/011580, with an international filing date of Sep. 6, 2019, which claims the benefit of U.S. Provisional Application No. 62/728,068 filed on Sep. 6, 2018, the contents of which are all hereby incorporated by reference herein in their entirety.

BACKGROUND OF THE DISCLOSURE

Field of the Disclosure

The present document relates to an image coding technique, and more particularly, to an image decoding method and apparatus based on motion prediction using a merge candidate list for deriving motion information of a sub-block unit in an image coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

A technical problem of the present document lies in providing a method and an apparatus which increase image coding efficiency.

Another technical problem of the present document lies in providing an image decoding method and an image decoding apparatus which constitute a merge candidate list of a current block based on a neighboring block having the same reference picture, and perform prediction for the current block based on the constituted merge candidate list.

According to an embodiment of the present document, an image decoding method which is performed by a decoding apparatus is provided. The method includes constituting a candidate list for deriving motion information of a sub-block unit for a current block, wherein the merge candidate list includes constructed candidates; deriving control point motion vectors (CPMVs) for control points (CPs) of the current block based on the merge candidate list; deriving prediction samples for the current block based on the CPMVs; and generating a reconstructed picture for the current block based on the derived prediction samples, wherein the constructed candidates are derived based on combination of at least two of a first neighboring block in a first group, a second neighboring block in a second group, a third neighboring block in a third group and a fourth neighboring block, and the first neighboring block, the second neighboring block, the third neighboring block and the fourth neighboring block constituting the combination have the same reference picture index.

According to another embodiment of the present document, a decoding apparatus which performs image decoding is provided. The decoding apparatus includes a predictor configured to: constitute a candidate list for deriving motion information of a subblock unit for a current block, wherein the merge candidate list includes constructed candidates; derive control point motion vectors (CPMVs) for control points (CPs) of the current block based on the merge candidate list; derive prediction samples for the current block based on the CPMVs; and generate a reconstructed picture for the current block based on the derived prediction samples, wherein the constructed candidates are derived based on combination of at least two of a first neighboring block in a first group, a second neighboring block in a second group, a third neighboring block in a third group and a fourth neighboring block, and the first neighboring block, the second neighboring block, the third neighboring block and fourth neighboring block constituting the combination have the same reference picture index.

According to still another embodiment of the present document, a video encoding method which is performed by an encoding apparatus is provided. The method includes constituting a merge candidate list for a current block, wherein the merge candidate list includes constructed candidates; deriving control point motion vectors (CPMVs) for control points (CPs) of the current block based on the merge candidate list; and encoding image information including prediction information for the current block, wherein the constructed candidates are derived based on combination of at least two of a first neighboring block in a first group, a second neighboring block in a second group, a third neighboring block in a third group and a fourth neighboring block, and the first neighboring block, the second neighboring block, the third neighboring block and fourth neighboring block constituting the combination have the same reference picture index.

According to still another embodiment of the present document, a video encoding apparatus is provided. The encoding apparatus includes a predictor configured to constitute a merge candidate list for a current block, wherein the merge candidate list includes constructed candidates; and derive control point motion vectors (CPMVs) for control points (CPs) of the current block based on the merge candidate list; and an encoder configured to encode image information including prediction information for the current block, wherein the constructed candidates are derived based on combination of at least two of a first neighboring block in a first group, a second neighboring block in a second group, a third neighboring block in a third group and a fourth neighboring block, and the first neighboring block, the second neighboring block, the third neighboring block and fourth neighboring block constituting the combination have the same reference picture index.

According to the present document, it is possible to increase general image/video compression efficiency.

According to the present document, it is possible to reduce operation complexity of a merge mode, which can lead to generally improved efficiency of image coding.

According to the present document, it is possible to reduce operation complexity of a process of constituting a merge candidate list and improve coding efficiency by constituting the merge candidate list of a current block based on a neighboring block having the same reference picture, and performing prediction for the current block based on the constituted merge candidate list.

BRIEF DESCRIPTION OF THE DRAWINGS

FIG. 3 illustratively represents motions which are expressed through an affine motion model.

DESCRIPTION OF EXEMPLARY EMBODIMENTS

Figure 1:
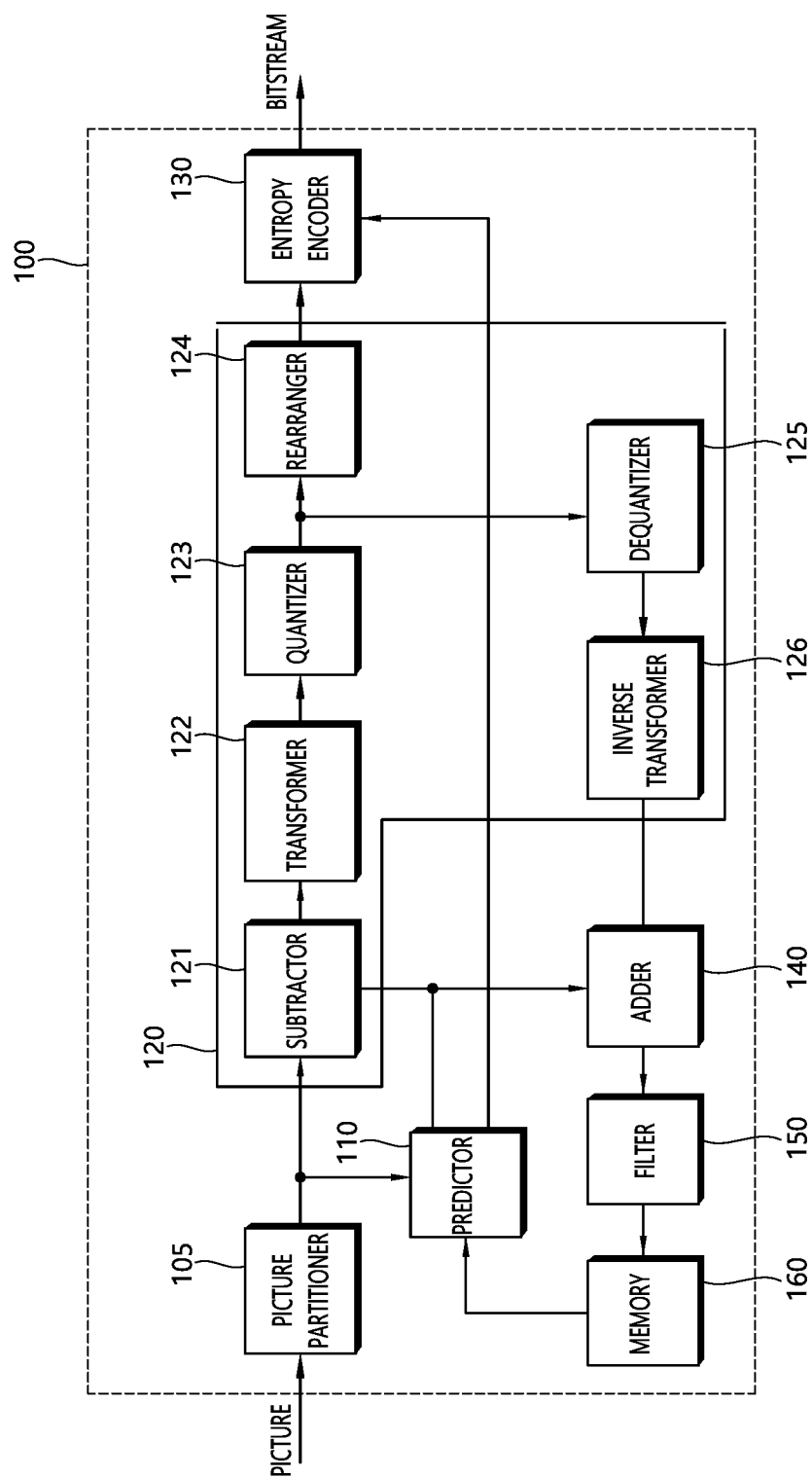
FIG. 1 is a diagram schematically describing a configuration of a video encoding apparatus to which the present document may be applied.

While the present document may be susceptible to various modifications and include various embodiments, specific embodiments thereof have been shown in the drawings by way of example and will now be described in detail. However, this is not intended to limit the present document to the specific embodiments disclosed herein. The terminology used herein is for the purpose of describing specific embodiments only, and is not intended to limit technical idea of the present document. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present document as long as they do not depart from the essence of the present document.

Hereinafter, preferred embodiments of the present document will be explained in more detail while referring to the attached drawings. In addition, the same reference signs are used for the same components on the drawings, and repeated descriptions for the same components will be omitted.

Herein, a video may mean a set of a series of images over time. Generally a picture means a unit representing an image at a specific time, and a slice is a unit constituting a part of the picture. One picture may be composed of plural slices or tile groups, and the picture, the slice, and the tile group may be used in place of each other as needed. Herein, the image may be a still image, or represent an image at a specific time, which constitutes a video. Hereinafter, image coding and video coding may be used in place of each other. Further, image coding, picture coding and frame coding may be used in place of one other.

A pixel or a pa may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

FIG. 1 is a diagram schematically describing a configuration of a video/image encoding apparatus to which the present document may be applied. Hereinafter, what is referred to as the video encoding apparatus may include an image encoding apparatus.

Referring to FIG. 1, a video encoding apparatus 100 may include a picture partitioner 105, a predictor 110, a residual processer 120, an entropy encoder 130, an adder 140, a filter 150 and a memory 160. The residual processor 120 may include a substractor 121, a transformer 122, a quantizer 123, a rearranger 124, a dequantizer 125 and an inverse transformer 126.

The picture partitioner 105 may partition an input picture into at least one processing unit.

For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later.

As another example, the processing unit may include a coding unit (CU), a prediction unit (PU) or a transform unit (TU). The coding unit may be split from a largest coding unit (LCU) into coding units of a deeper depth along a quad-tree structure. In this case, the maximum coding unit may be used directly as a final coding unit based on coding efficiency according to the image characteristic. Alternatively, if necessary, the coding unit may be recursively partitioned into coding units of a further deeper depth so that the coding unit of an optimal size may be used as the final coding unit. If a smallest coding unit (SCU) is set, the coding unit may not be split into smaller coding units than the minimum coding unit. Here, the final coding unit refers to a coding unit that is the basis of partitioning or dividing into a prediction unit or a transform unit. A prediction unit is a unit partitioned from a coding unit and may be a unit of sample prediction. In this case, the prediction unit may be divided into sub-blocks. The transform unit may be divided along the quad tree structure from a coding unit, and may be a unit that derives a transform coefficient and/or a unit that derives a residual signal from a transform coefficient. Hereinafter, the coding unit may be called a coding block (CB), the prediction unit may be called a prediction block (PB), and the transform unit may be called a transform block (TB). A prediction block or the prediction unit may mean a specific area in the form of a block within a picture, and may include an array of prediction samples. In addition, a transform block or a transform unit may mean a specific area in a block form within a picture, and may include an array of transform coefficients or residual samples.

The predictor 110 may perform a prediction on a block to be processed (hereinafter, referred to as a current block) and generate a predicted block including prediction samples of the current block. The unit of prediction performed by the predictor 110 may be a coding block, a transform block, or a prediction block.

The predictor 110 may determine whether intra prediction or inter prediction is applied to the current block. As an example, the predictor 110 may determine whether intra prediction or inter prediction is applied on a CU basis.

In the case of intra prediction, the predictor 110 may derive a prediction sample for the current block based on reference samples outside the current block in the picture to which the current block belongs (hereinafter, referred to as the current picture). In this case, the predictor 110 may (i) derive the prediction sample based on the average or interpolation of neighbor reference samples of the current block, and (ii) derive the prediction sample based on a reference sample existing in a specific (prediction) direction as to a prediction sample among neighbor reference sample of the current block. The case (i) may be called a non-directional mode or a non-angular mode, and the case (ii) may be called a directional mode or an angular mode. In intra prediction, the prediction mode may have, for example, 33 directional prediction modes and at least two non-directional modes. The non-directional modes may include a DC prediction mode and a planar mode. The predictor 110 may determine the prediction mode applied to the current block by using the prediction mode applied to the neighboring block.

In case of the inter prediction, the predictor 110 may derive the prediction sample for the current block based on the sample specified by a motion vector on the reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike the merge mode, a difference (residual) between the prediction sample and an original sample is not transmitted. In the MVP mode, the motion vector of the current block can be derived using the motion vector of the neighboring block as a motion vector predictor of the current block.

In the case of inter prediction, the neighboring block may include a spatial neighboring block existing in the current picture and a temporal neighboring block present in the reference picture. A reference picture including the temporal neighboring block may be called a collocated picture (colPic). The motion information may include a motion vector and a reference picture index. Information such as prediction mode information and motion information may be (entropy) encoded, and then output in the form of a bitstream.

When the motion information of the temporal neighboring block is used in the skip mode and the merge mode, the highest picture on the reference picture list may be used as a reference picture. Reference pictures included in a reference picture list may be sorted based on a difference in a picture order count (POC) between a current picture and a corresponding reference picture. The POC may correspond to the display order of the pictures and may be distinguished from the coding order.

The subtractor 121 generates a residual sample which is a difference between the original sample and the prediction sample. If the skip mode is applied, the residual sample may not be generated as described above.

The transformer 122 generates a transform coefficient by transforming the residual sample in a transform block unit. The transformer 122 may perform the transform according to the size of the corresponding transform block and the prediction mode applied to the coding block or the prediction block that spatially overlaps the corresponding transform block. For example, if intra prediction is applied to the coding block or the prediction block that overlaps the transform block, and the transform block is a 4×4 residual array, the residual sample may be transformed by using a DST (discrete sine transform) transform kernel. In other cases, the residual sample may be transformed by using a DCT (discrete cosine transform) transform kernel.

The quantizer 123 may quantize the transform coefficients to generate quantized transform coefficients.

The rearranger 124 rearranges the quantized transform coefficients. The rearranger 124 may rearrange the quantized transform coefficients in the form of a block into a one-dimensional vector form through a coefficient scanning method. Although the rearranger 124 is described as a separate configuration, the rearranger 124 may be a part of the quantizer 123.

The entropy encoder 130 may perform entropy encoding on the quantized transform coefficients. The entropy encoding may include various encoding methods such as, for example, exponential Golomb, context-adaptive variable length coding (CAVLC), context-adaptive binary arithmetic coding (CABAC), and the like. The entropy encoder 130 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like.

The dequantizer 125 dequantizes the quantized values (quantized transform coefficients) in the quantizer 123, and the inverse transformer 126 inversely transforms the dequantized values in the inverse quantizer 125 to generate a residual sample.

The adder 140 reconstructs the picture by combining the residual sample and the prediction sample. The residual sample and the prediction sample may be added in units of blocks to generate a reconstructed block. Here, although the adder 140 has been described as a separate configuration, the adder 140 may be a part of the predictor 110. Meanwhile, the adder 140 may be called a reconstructor or reconstruction block generator.

The filter 150 may apply a deblocking filter and/or a sample adaptive offset to the reconstructed picture. Through deblocking filtering and/or sample adaptive offset, the artifacts of the block boundaries in the reconstructed picture or the distortion in the quantization process can be corrected. The sample adaptive offset may be applied on a sample basis and may be applied after the process of deblocking filtering has been completed. The filter 150 may apply an adaptive loop filter (ALF) to the reconstructed picture. The ALF may be applied to the reconstructed picture to which deblocking filter and/or sample adaptive offset has been applied.

The memory 160 may store information necessary for encoding/decoding or a reconstructed picture (decoded picture). Here, the reconstructed picture may be a reconstructed picture for which the filtering process has been completed by the filter 150. The stored reconstructed picture may be used as a reference picture for (inter) prediction of other pictures. For example, the memory 160 may store (reference) pictures used for inter prediction. In this case, pictures used for inter prediction may be designated by a reference picture set or a reference picture list.

Figure 2:
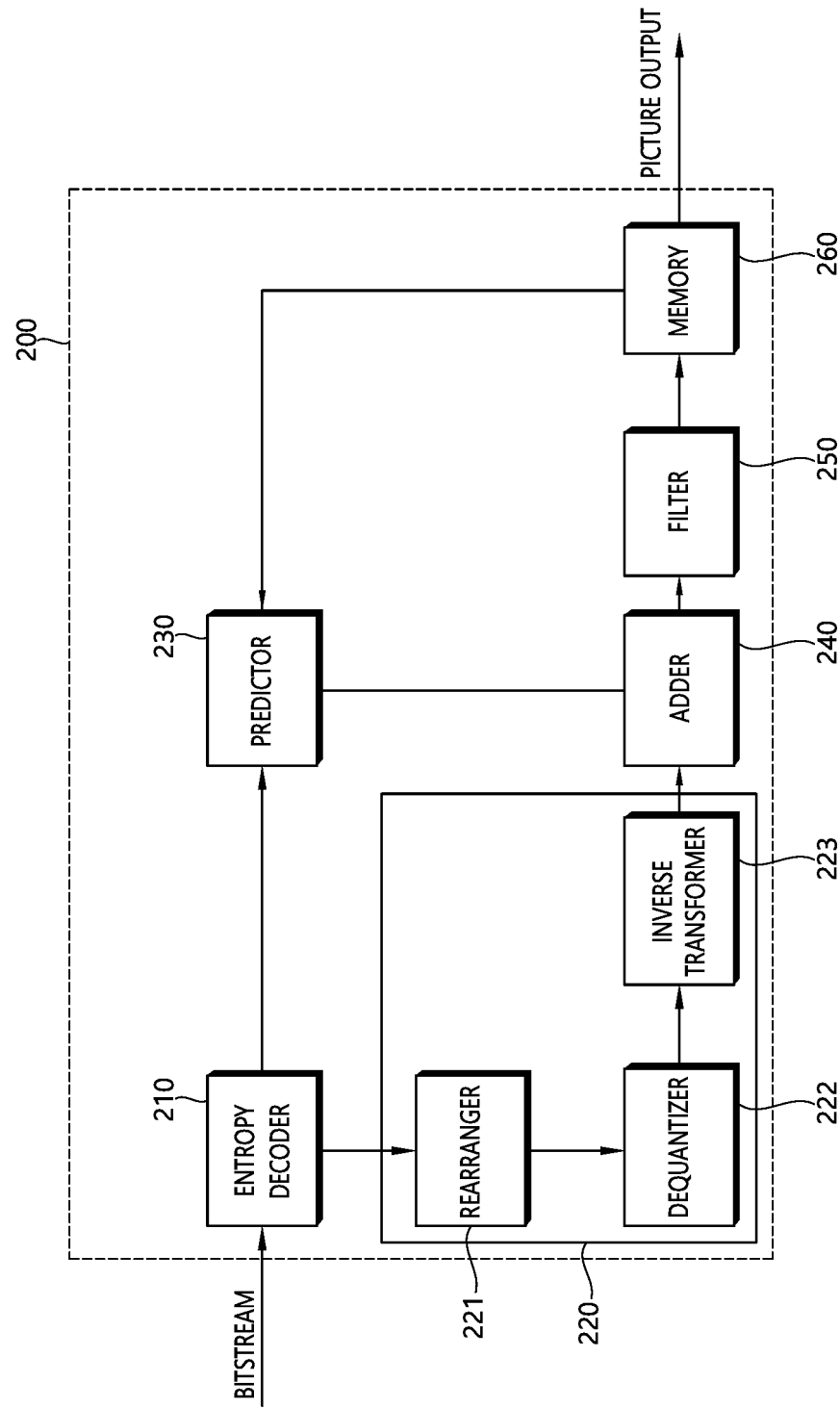
FIG. 2 is a diagram schematically describing a configuration of a video decoding apparatus to which the present document may be applied.

FIG. 2 is a diagram schematically describing a configuration of a video/image decoding apparatus to which the present document may be applied. Hereinafter, what is referred to as the video decoding apparatus may include an image decoding apparatus.

Referring to FIG. 2, the video decoding apparatus 200 may include an entropy decoder 210, a residual processer 220, a predictor 230, an adder 240, a filter 250 and a memory 260. Here, the residual processer 220 may include a rearranger 221, a dequantizer 222 and an inverse transformer 223. Further, although not shown, the video decoding apparatus 200 may include a receiver which receives a bitstream including video information. The receiver may be constituted as a separator, or incorporated into the entropy decoder 210.

When a bitstream including video/image information is input, the decoding apparatus 200 may reconstruct an image corresponding to a process in which the video/image information is processed in the encoding apparatus.

For example, the decoding apparatus 200 may perform decoding using a processor applied in the encoding apparatus. Thus, the processor of decoding may be a coding unit, other example, and the coding unit may be partitioned according to a quad tree structure, binary tree structure and/or ternary tree structure from the coding tree unit or the largest coding unit.

A prediction unit or a transform unit may be further used in some cases, and in this case, the prediction block, which is a block derived or partitioned from the coding unit, may be a unit of sample prediction. In this case, the prediction unit may be divided into sub-blocks. The transform unit may be split according to the quad tree structure, and may be a unit for deriving a transform coefficient or a unit for deriving a residual signal from the transform coefficient.

The entropy decoder 210 may parse the bitstream to output information necessary for image reconstruction (or picture reconstruction). For example, the entropy decoder 210 decodes the information in the bitstream based on a coding method such as exponential Golomb coding, CAVLC, or CABAC, and output syntax elements required for image reconstruction and quantized values of transform coefficients for residual.

More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model.

Information on prediction among information decoded in the entropy decoder 210 may be provided to the predictor 230 and residual values, that is, quantized transform coefficients, on which entropy decoding has been performed by the entropy decoder 210 may be input to the rearranger 221.

The rearranger 221 may rearrange the quantized transform coefficients in the form of a two-dimensional block. The rearranger 221 may perform rearrangement in correspondence to coefficient scanning performed by the encoding apparatus. Here, although the rearranger 221 is described as a separate component, the rearranger 221 may be a part of the dequantizer 222.

The dequantizer 222 may dequantize the quantized transform coefficients based on a (de)quantization parameter to output a transform coefficient. In this case, information for deriving a quantization parameter may be signaled from the encoding apparatus.

The inverse transformer 223 may derive residual samples by inversely transforming the transform coefficients.

The predictor 230 may perform prediction on the current block and generate a predicted block including prediction samples for the current block. The unit of prediction performed in the predictor 230 may be a coding block, a transform block or a prediction block.

The predictor 230 may determine whether to apply intra prediction or inter prediction based on information on prediction. In this case, a unit for determining which of intra prediction and inter prediction is to be applied and a unit for generating a prediction sample may be different. Additionally, the unit for generating a prediction sample in inter prediction and intra prediction may also be different. For example, whether to apply inter prediction or intra prediction may be determined in units of CUs. In addition, for example, in inter prediction, a prediction mode may be determined and a prediction sample may be generated in PU units, and in intra prediction, a prediction mode may be determined in PU units and a prediction sample may be generated in TU units.

In the case of intra prediction, the predictor 230 may derive the prediction sample for the current block based on the neighbor reference sample in the current picture. The predictor 230 may derive the prediction sample for the current block by applying the directional mode or the non-directional mode based on the neighbor reference sample of the current block. In this case, the prediction mode to be applied to the current block may be determined using the intra prediction mode of the neighboring block.

In the case of inter prediction, the predictor 230 may derive the prediction sample for the current block based on the sample specified on the reference picture by the motion vector on the reference picture. The predictor 230 may derive a prediction sample for the current block by applying any one of a skip mode, a merge mode, and an MVP mode. In this case, motion information necessary for inter prediction of the current block provided by a video encoding apparatus, for example, information on a motion vector, a reference picture index, and the like may be acquired or derived based on the information on prediction.

In case of the skip mode and the merge mode, motion information of a neighboring block may be used as motion information of the current block. In this case, the neighboring block may include a spatial neighboring block and a temporal neighboring block.

The predictor 230 may construct a merge candidate list using motion information of an available neighboring block, and may use information indicated by the merge index on the merge candidate list as a motion vector of the current block. The merge index may be signaled from the encoding apparatus. The motion information may include a motion vector and a reference picture. If motion information of a temporal neighboring block is used in the skip mode and the merge mode, a highest picture on the reference picture list may be used as the reference picture.

In case of the skip mode, unlike the merge mode, a difference (residual) between the prediction sample and the original sample is not transmitted.

In the case of the MVP mode, the motion vector of the current block may be derived using the motion vector of the neighboring block as a motion vector predictor. In this case, the neighboring block may include a spatial neighboring block and a temporal neighboring block.

For example, when the merge mode is applied, a merge candidate list may be generated by using a motion vector of a reconstructed spatial neighboring block and/or a motion vector corresponding to a Col block, which is a temporal neighboring block. In the merge mode, the motion vector of the candidate block selected from the merge candidate list is used as the motion vector of the current block. The information on prediction may include a merge index indicating a candidate block having an optimal motion vector selected from candidate blocks included in the merge candidate list. In this case, the predictor 230 may derive the motion vector of the current block by using the merge index.

As another example, when the Motion Vector Prediction (MVP) mode is applied, a motion vector predictor candidate list may be generated using a motion vector of a reconstructed spatial neighboring block and/or a motion vector corresponding to a Col block, which is a temporal neighboring block. That is, the motion vector of a reconstructed spatial neighboring block and/or the motion vector corresponding to the Col block, which is a temporal neighboring block, may be used as a motion vector candidate. The information on prediction may include a prediction motion vector index indicating an optimal motion vector selected from the motion vector candidates included in the list. In this case, the predictor 230 may select the predicted motion vector of the current block from the motion vector candidates included in the motion vector candidate list, by using the motion vector index. The predictor of the encoding apparatus may acquire a motion vector difference (MVD) between a motion vector of a current block and a motion vector predictor, and may encode the MVD and output the encoded MVD in the form of a bitstream. That is, MVD may be acquired by subtracting the motion vector predictor from the motion vector of the current block. In this case, the predictor 230 may acquire a motion vector difference included in the information on prediction, and derive the motion vector of the current block by adding the motion vector difference and the motion vector predictor. The prediction unit may also acquire or derive a reference picture index or the like indicating a reference picture from the information on prediction.

The adder 240 may reconstruct the current block or the current picture by adding the residual sample and the prediction sample. The adder 240 may reconstruct the current picture by adding the residual sample and the prediction sample in block units. Since the residual is not transmitted when the skip mode is applied, the prediction sample may be a reconstruction sample. Although the adder 240 is described in a separate configuration, the adder 240 may be a part of the predictor 230. Meanwhile, the adder 240 may be called a reconstructor or reconstruction block generator.

The filter 250 may apply the deblocking filtering sample adaptive offset, and/or ALF to the reconstructed picture. In this case, the sample adaptive offset may be applied in units of sample and may be applied after deblocking filtering. ALF may be applied after deblocking filtering and/or sample adaptive offset.

The memory 260 may store information necessary for decoding or a reconstructed picture (decoded picture). Here, the reconstructed picture may be a reconstructed picture on which the filtering procedure has been completed by the filter 250. For example, the memory 260 may store pictures used for inter prediction. In this case, pictures used for inter prediction may be designated by a reference picture set or a reference picture list. The reconstructed picture may be used as a reference picture for another picture. In addition, the memory 260 may output the reconstructed picture in an output order.

Meanwhile, in the case of inter prediction, inter prediction method in which the distortion of image is considered is being proposed. Specifically, there is proposed an affine motion model which efficiently derives the motion vector for sample blocks or sub-blocks of the current block, and which increases the accuracy of inter prediction despite deformation such as rotation, zoom in, zoom out of an image. That is, the affine motion model is one that derives the motion vector for sample points or sub-blocks of the current block, and the prediction using the affine motion model may be called an affine motion prediction, an affine motion prediction, motion prediction of a sub-block unit or a sub-block motion prediction.

For example, the sub-block motion prediction using the affine motion model may efficiently express such four motions as described later, that is, such four deformations as described later.

FIG. 3 illustratively represents motions which are expressed through an affine motion model. Referring to FIG. 3, the motions which can be expressed through the affine motion model may include translate motion, scale motion, rotate motion and shear motion. That is, as shown in FIG. 3, the translate motion that an image (or a part thereof) is moved in a plane over time, the scale motion that an image (or a part thereof) is scaled over time, the rotate motion that an image (or a part thereof) is rotated over time, and the shear motion that an image (or a part thereof) is deformed to a parallelogram over time may be efficiently expressed through motion prediction of the sub-block unit.

The encoding apparatus/decoding apparatus may predict distortion shape of the image based on motion vectors at control points (CP) of the current block through the affine inter prediction, which can lead to increase in prediction accuracy, thus improving compression performance of an image. Further, by using the motion vector of the neighboring block of the current block, a motion vector for at least one control point of the current block may be derived, and thus it is possible to reduce data amount of added additional information, and considerably improve inter prediction efficiency.

As one example of the affine motion prediction, motion information at three control points, that is, three reference points may be required.

Figure 4:
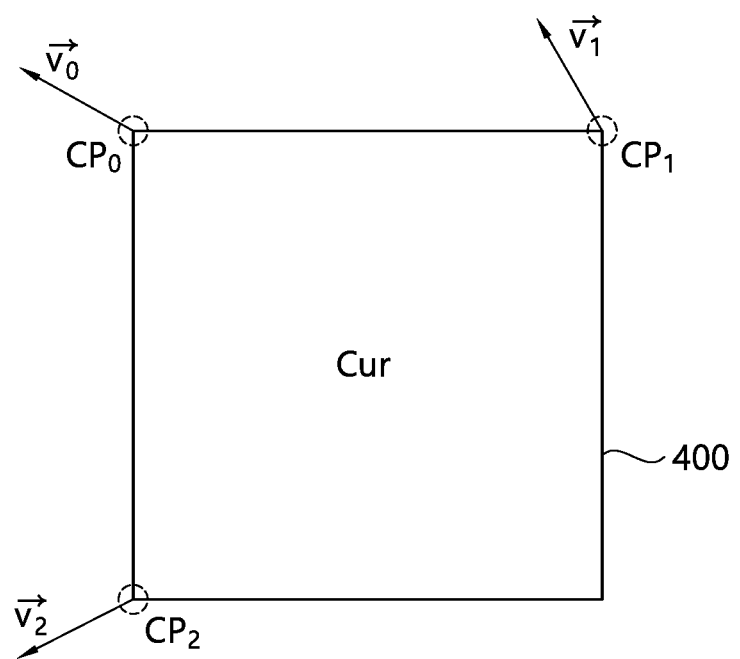
FIG. 4 illustratively represents the affine motion model in which motion vectors for three control points are used.

FIG. 4 illustratively represents the affine motion model in which motion vectors for three control points are used.

If a top-left sample position in the current block 400 is set as (0, 0), as shown in FIG. 4, sample positions (0, 0), (w, 0), (0, h) may be determined as the control points. Hereinafter, the control point of (0, 0) sample position may be represented as CP0; the control point of (w, 0) sample position, CP1; and the control point of (0, h) sample position, CP2.

By using each of the above-described control points and the motion vector for the corresponding control point, an equation for the affine motion model may be derived. The equation for the affine motion model may be represented as below:

$$\begin{cases} v_x = \frac{(v_{1x} - v_{0x})}{w} * x + \frac{(v_{2x} - v_{0x})}{h} * y + v_{0x} \\ v_y = \frac{(v_{1y} - v_{0y})}{w} * x - \frac{(v_{2y} - v_{0y})}{h} * y + v_{0y} \end{cases} \quad \text{[Equation 1]}$$

where w represents a width of the current block 400; h, a height of the current block 400; v0x and v0y, an x component and y component of the motion vector of CP0, respectively; v1x and v1y, an x component and y component of the motion vector of CP1, respectively; and v2x and v2y, an x component and y component of the motion vector of CP2, respectively. Further, x represents an x component of a position of a target sample in the current block 400; y, a y component of the position of the target sample in the current block 400; vx, an x component of a motion vector of the target sample in the current block 400; and vy, a y component of the motion vector of the target sample in the current block 400.

Since the motion vector of CP0, the motion vector of CP1, and the motion vector of CP2 are known, the motion vector according to the sample position in the current block may be derived based on Equation 1. That is, according to the affine motion model, the motion vectors v0(v0x, v0y), v1(v1x, v1y), v2(v2x, v2y) at the control points may be scaled based on ratios of distances between coordinates (x, y) of the target sample and three control points, so that the motion vector of the target sample according to the target sample position may be derived. That is, according to the affine motion model, the motion vector of each sample in the current block may be derived based on the motion vectors of the control points. Meanwhile, a set of the motion vectors of the samples in the current block which have been derived according to the affine motion model may be represented as an affine motion vector field (MVF).

Meanwhile, six parameters for Equation 1 above may be represented as a, b, c, d, e and f of following equations, and equation for the affine motion model which is represented using the six parameters may be as below:

$$a = \frac{(v_{1x} - v_{0x})}{w} \quad \text{[Equation 2]}$$

$$b = \frac{(v_{2x} - v_{0x})}{h}$$

$$c = v_{0x}$$

$$d = \frac{(v_{1y} - v_{0y})}{w}$$

$$e = -\frac{(v_{2y} - v_{0y})}{h}$$

$$f = v_{0y}$$

$$\begin{cases} v_x = a * x + b * y + c \\ v_y = d * x + e * y + f \end{cases}$$

where w represents a width of the current block 400; h, a height of the current block 400; v0x and v0y, an x component and y component of the motion vector of CP0, respectively; v1x and v1y, an x component and y component of the motion vector of CP0, respectively; and v2x and v2y, an x component and y component of the motion vector of CP1, respectively. Further, x represents an x component of a position of a target sample in the current block 400; y, a y component of the position of the target sample in the current block 400; vx, an x component of a motion vector of the target sample in the current block 400; and vy, a y component of the motion vector of the target sample in the current block 400.

The affine motion model using the six parameters or the affine inter prediction may be represented as 6-parameter affine motion model or AF6.

Further, as one example of the affine motion prediction, motion information at two control points, that is, two reference points may be required.

Figure 5:
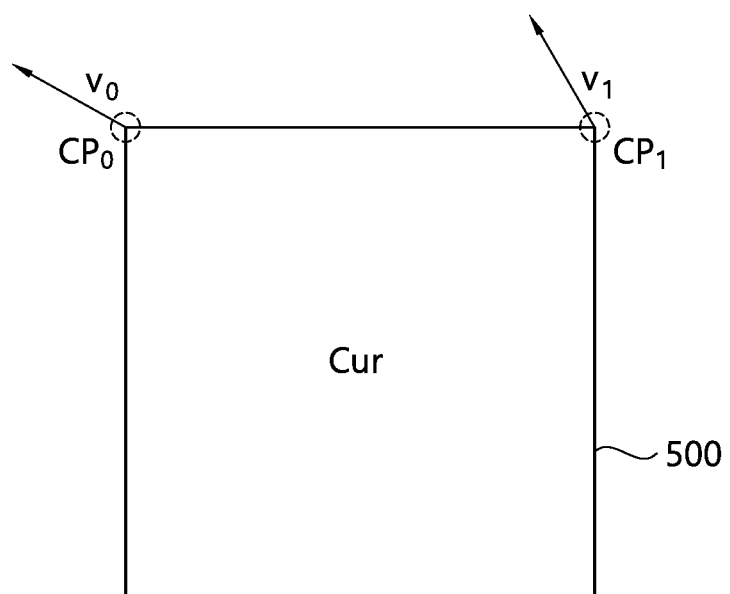
FIG. 5 illustratively represents the affine motion model in which motion vectors for two control points are used.

FIG. 5 illustratively represents a motion model of the affine unit in which motion vectors for two control points are used. The affine motion model using two control points may express three motions including the translate motion, the scale motion and the rotate motion. The affine motion model expressing three motions may be represented as a similarity affine motion model or a simplified affine motion model.

If a top-left sample position in the current block 500 is set as (0, 0), as shown in FIG. 5, sample positions (0,0), (w, 0) may be determined as the control points. Hereinafter, the control point of (0, 0) sample position may be represented as CP0; and the control point of (w, 0) sample position, CP0.

By using each of the above-described control points and the motion vector for the corresponding control point, an equation for the affine motion model may be derived. The equation for the affine motion model may be represented as below:

$$\begin{cases} v_x = \frac{(v_{1x} - v_{0x})}{w} * x - \frac{(v_{2y} - v_{0y})}{h} * y + v_{0x} \\ v_y = \frac{(v_{1y} - v_{0y})}{w} * x - \frac{(v_{2x} - v_{0x})}{h} * y + v_{0y} \end{cases} \quad \text{[Equation 3]}$$

where w represents a width of the current block 500; $v_{0x}$ and $v_{0y}$, an x component and y component of the motion vector of CP0, respectively; $v_{1x}$ and $v_{1y}$, an x component and y component of the motion vector of CP0, respectively. Further, x represents an x component of a position of a target sample in the current block 500; y, a y component of the position of the target sample in the current block 500; vx, an x component of a motion vector of the target sample in the current block 500; and vy, a y component of the motion vector of the target sample in the current block 500.

Meanwhile, four parameters for Equation 3 above may be represented as a, b, c and d of following equations, and equation for the affine motion model which is represented using the four parameters may be as below:

$$a = \frac{(v_{1x} - v_{0x})}{w} \quad \text{[Equation 4]}$$
$$b = \frac{(v_{1y} - v_{0y})}{h}$$
$$c = v_{0x}$$
$$d = v_{0y}$$
$$\begin{cases} v_x = a*x + b*y + c \\ v_y = d*x + e*y + d \end{cases}$$

where w represents a width of the current block 500; $v_{0x}$ and $v_{0y}$, an x component and y component of the motion vector of CP0, respectively; $v_{1x}$ and $v_{1y}$, an x component and y component of the motion vector of CP0, respectively. Further, x represents an x component of a position of a target sample in the current block 500; y, a y component of the position of the target sample in the current block 500; vx, an x component of a motion vector of the target sample in the current block 500; and vy, a y component of the motion vector of the target sample in the current block 500. Since the affine motion model using the two control points may be expressed with four parameters a, b, c and d as in Equation 4, the affine motion model or the affine motion prediction using the four parameters may be represented as 4-parameter affine motion model or AF4. That is, according to the affine motion model, the motion vector of each sample in the current block may be derived based on the motion vectors of the control points. Meanwhile, a set of the motion vectors of the samples in the current block which have been derived according to the affine motion model may be represented as an affine motion vector field (MVF).

Meanwhile, as described above, the motion vector of the sample unit may be derived through the affine motion model, and the accuracy of inter prediction can be considerably improved through this. However, in this case, complexity may be greatly increased in the motion compensation process.

Thus, it may be limited to derive the motion vector of the sub-block unit in the current block instead of the motion vector of the sample unit.

Figure 6:
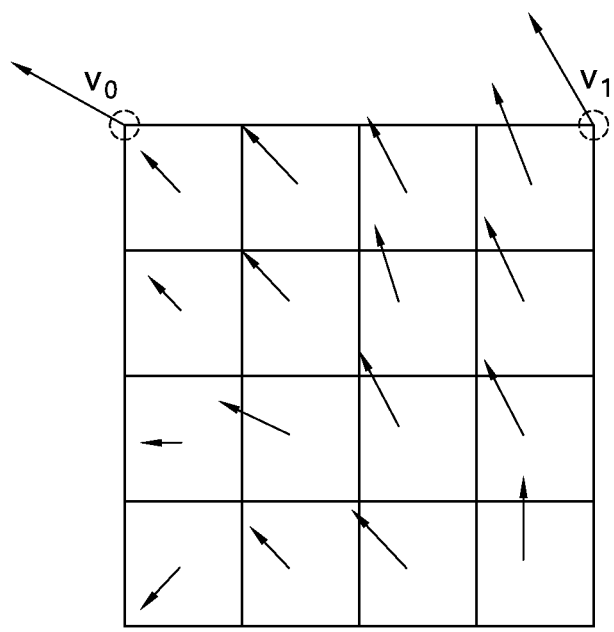
FIG. 6 illustratively represents a method of deriving a motion vector of a sub-block unit.

FIG. 6 illustratively represents a method of deriving a motion vector in a sub-block unit based on the affine motion model. FIG. 6 illustratively represents a case where the size of the current block is 16×16, and the motion vector is derived in 4×4 sub-block units. The sub-block may be set in various sizes, and for example, if the sub-block is set in an n×n size (n is a positive integer, and for example, n is 4), the motion vector may be derived in an n×n sub-block unit in the current block based on the affine motion model, and various method for deriving a motion vector representing each sub-block may be applied.

For example, referring to FIG. 6, the motion vector of each sub-block may be derived setting a center or center lower right side sample position of each sub-block as representative coordinates. Here, the center lower right side position may represent a sample position among four samples located at the center of the sub-block, which is located at a lower right side. For example, if n is an odd number, one sample may be located at the center of the sub-block, and in this case, the center sample position may be used for deriving the motion vector of the sub-block. However, if n is an even number, four samples may be located adjacent to the center of the sub-block, and in this case, the lower right side sample position may be used for deriving the motion vector. For example, referring to FIG. 6, representative coordinates for each of the sub-blocks may be derived as (2, 2), (6, 2), (10, 2), . . . (14, 14), and the encoding apparatus/decoding apparatus may derive the motion vector of each sub-block by inputting each of the representative coordinates of the sub-blocks into Equations 1 to 3. Predicting the motion of the sub-block in the current block through the affine motion model may be named motion prediction of sub-block unit or sub-block motion prediction, and such motion vectors of sub-blocks may be represented as MVF.

Meanwhile, as one example, the size of the sub-block in the current block may be derived based on the following equation:

$$\begin{cases} M = \text{clip3}\left(4, w, \dfrac{w * MvPre}{\max(\text{abs}(v_{1x} - v_{0x}), \text{abs}(v_{1y} - v_{0y}))}\right) \\ N = \text{clip3}\left(4, h, \dfrac{h * MvPre}{\max(\text{abs}(v_{2x} - v_{0x}), \text{abs}(v_{2y} - v_{0y}))}\right) \end{cases}$$ [Equation 5]

where M represents a width of the sub-block; and N, a height of the sub-block. Further, v0x and v0y represent an x component and y component of CPMV0 of the current block, respectively; v1x and v1y, an x component and y component of CPMV1 of the current block, respectively; w, a width of the current block; h, a height of the current block; and MvPre, motion vector fraction accuracy. For example, the motion vector fraction accuracy may be set as 1/16.

Meanwhile, in the inter prediction using above-described affine motion model, that is, the affine motion prediction, there may exist a merge mode (AF_MERGE) and an affine inter mode (AF_INTER). Here, the affine inter mode may be represented as an affine motion vector prediction mode (affine MVP mode, AF_MVP).

The merge mode using the affine motion model is similar to the existing merge mode in that MVD for motion vectors of the control points is not transmitted. That is, like the existing skip/merge mode, the merge mode using the affine motion model may represent an encoding/decoding method which performs prediction by deriving CPMV for each of two or three control points from the neighboring block of the current block without decoding for MVD (motion vector difference).

For example, if the AF_MRG mode is applied to the current block, MV for CP0 and CP0 (i.e., CPMV0 and CPMV1) may be derived from the neighboring block among the neighboring blocks of the current block, to which the prediction mode using the affine mode, that is, the affine motion prediction has been applied. That is, CPMV0 and CPMV1 of the neighboring block to which the affine mode has been applied may be derived as the merge candidate, and the merge candidate may be derived as CPMV0 and CPMV1 for the current block.

The affine inter mode may represent inter prediction in which prediction based on affine MVF is performed by deriving MVP (motion vector predictor) for motion vectors of the control points, deriving motion vectors of the control points based on the MVP and received MVP, and deriving affine MVF of the current block based on the motion vectors of the control points. Here, the motion vector of the control point may be represented as a control point motion vector (CPMV); MVP of the control point, a control point motion vector predictor (CPMVP); and MVD of the control point, control point motion vector difference (CPMVD). Specifically, for example, the encoding apparatus may derive the control point motion vector predictor (CPMVP) and the control point motion vector (CPMV) for each of CP0 and CP1 (or CP0, CP0 and CP1), and may transmit or store information on the CPMVP and/or CPMVD which is a difference value between the CPMVP and CPMV.

Here, if the affine inter mode is applied to the current block, the encoding apparatus/decoding apparatus may constitute an affine MVP candidate list based on the neighboring block of the current block, and the affine MVP candidate may be referred to as CPMVP pair candidate, and the affine MVP candidate list may be referred to as CPMVP candidate list.

Further, each affine MVP candidate may mean combination of CPMVPs of CP0 and CP1 in the four-parameter affine motion model (four parameter affine motion model), and may mean combination of CPMVPs of CP0, CP1 and CP2 in the six-parameter affine motion model.

Figure 7:
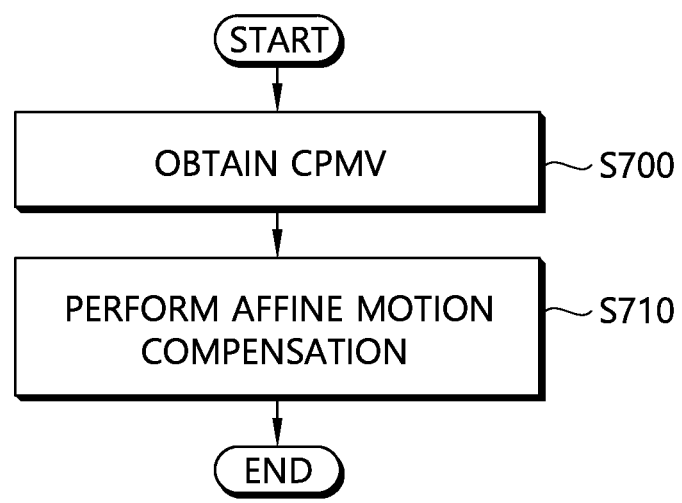
FIG. 7 illustratively represents a flowchart of a motion prediction method of a sub-block unit according to an embodiment of the present document.

FIG. 7 illustratively represents a flowchart of a motion prediction method of a sub-block unit according to an embodiment of the present document.

Referring to FIG. 7, the affine motion prediction method may be generally represented as below. When the affine motion prediction method is started, CPMV pair may be obtained first (S700). Here, if the four-parameter affine model is used, CPMV pair may include CPMV0 and CPMV1.

After this, affine motion compensation may be performed based on CPMV pair (S710), and the affine motion prediction may be ended.

Further, in order to determine the CPMV0 and the CPMV1, there may exist two affine prediction modes. Here, the two affine prediction modes include an affine inter mode and an affine merge mode. The affine inter mode may clearly determine CPMV0 and CPMV1 by signaling information on two-motion vector difference (MVD) for CPMV0 and CPMV1. Contrarily, the affine merge mode may derive CPMV pair without MVD information signaling.

In other words, the affine merge mode may derive CPMV of the current block by using CPMV of the neighboring block which has been coded in the affine mode, and, if the motion vector is determined in sub-block units, the affine merge mode may be referred to as a sub-block merge mode.

In the affine merge mode, the encoding apparatus may signal to the decoding apparatus an index for the neighboring block which has been coded in the affine mode for deriving CPMV of the current block. Here, the affine merge mode may constitute a merge candidate list based on the neighboring block, and the index for the neighboring block may represent the neighboring block among the merge candidate list, which is referred to for deriving CPMV of the current block. The merge candidate list may be referred to as a sub-block merge candidate list.

The affine inter mode may be referred to as an affine MVP mode. In the affine MVP mode, CPMV of the current block may be derived based on the control point motion vector predictor (CPMVP) and control point motion vector difference (CPMVD). In other words, the encoding apparatus may determine CPMVP for CPMV of the current block, derive CPMVD which is a difference value between CPMV and CPMVP of the current block, and signal information on CPMVP and information CPMVD to the decoding apparatus. Here, the affine MVP mode may constitute an affine MVP candidate list based on the neighboring block, and the information on CPMVP may represent the neighboring block among the affine MVP candidate list, which is referred to for deriving CPMVP for the CPMV of the current block. The affine MVP candidate list may be referred to as a control point motion vector candidate list.

Meanwhile, for example, if the affine merge mode is applied to the current block, the current block may be coded as described later.

The encoding apparatus/decoding apparatus may constitute a merge candidate list including merge candidates for the current block, and derive control point motion vectors (CPMVs) for control points (CPs) of the current block of the current block based on one of merge candidates of the merge candidate list. The encoding apparatus/decoding apparatus may derive prediction samples for the current block based on the CPMVs, and generate a reconstructed picture for the current block based on the derived prediction samples.

Specifically, the merge candidate list may be constituted as below.

Figure 8:
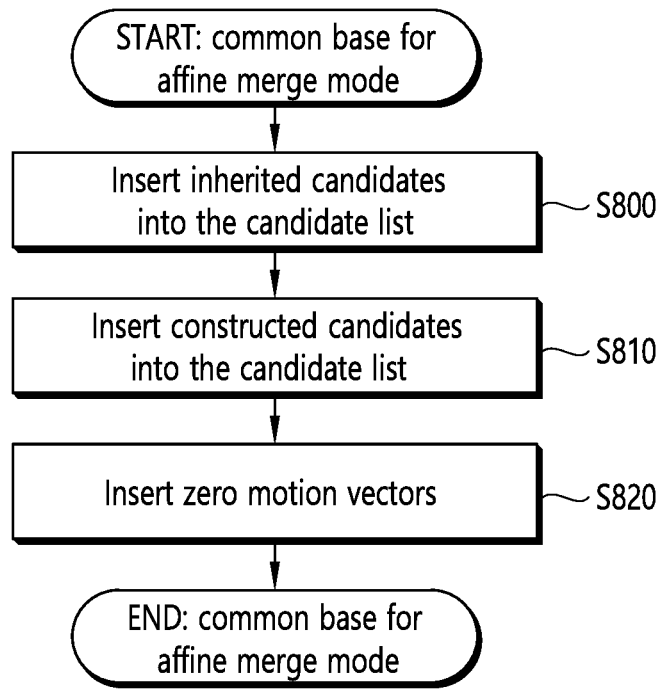
FIG. 8 represents a method of constituting a merge candidate list of a current block according to an embodiment of the present document.

FIG. 8 represents an example of constituting the merge candidate list of the current block.

Referring to FIG. 8, the encoding apparatus/decoding apparatus may add an inherited merge candidate to the merge candidate list (S800).

Specifically, the encoding apparatus/decoding apparatus may derive the inherited candidate based on the neighboring blocks of the current block.

The inherited candidate may refer to a candidate that the motion information of the neighboring block of the current block without other modification or combination, that is, CPMV itself of the neighboring block, is added into a merge candidate list of the current block. Here, the neighboring blocks may include a lower left corner neighboring block A0, a left neighboring block A1, a top neighboring block B0, a top right corner neighboring block B1 and a top left corner neighboring block B2 of the current block.

Figure 9:
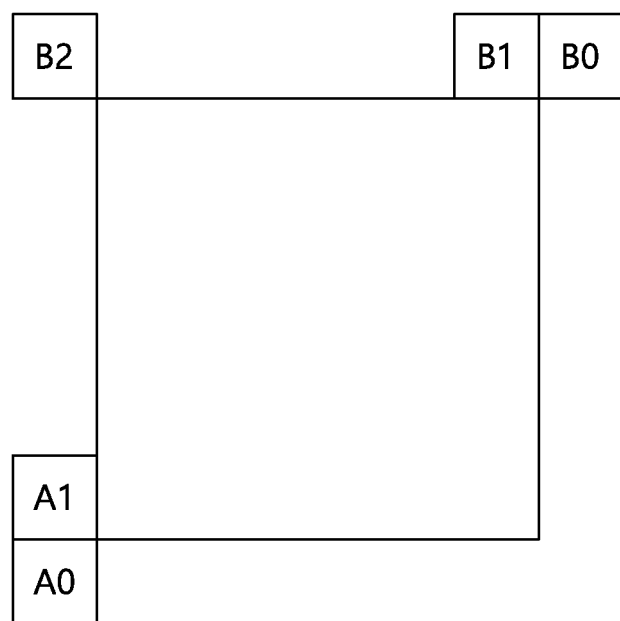
FIG. 9 illustratively represents neighboring blocks of the current block for deriving an inherited candidate according to an embodiment of the present document.

FIG. 9 illustratively represents neighboring blocks of the current block for deriving the inherited candidate. Referring to FIG. 9, the neighboring blocks of the current block may include a lower left corner neighboring block A0 of the current block, a left neighboring block A1 of the current block, a top right corner neighboring block B0 of the current block, a top neighboring block B1 of the current block, and a top left corner neighboring block B2 of the current block.

For example, if a size of the current block is W×H, and x component of the top-left sample position of the current block is 0 and y component thereof is 0, the left neighboring block may be a block including a sample at coordinates (−1, H−1); the top neighboring block, a block including a sample at coordinates (W−1, −1); the top right corner neighboring block, a block including a sample at coordinates (W, −1); the lower left corner neighboring block, a block including a sample at coordinates (−1, H); and the top left corner neighboring block, a block including a sample at coordinates (−1, −1).

The inherited candidate may be derived based on an effective neighboring block which has been coded in the affine mode. For example, the encoding apparatus/decoding apparatus may check the neighboring blocks A0, A1, B0, B1 and B2 sequentially, or blocks A1, B1 B0, A0 and B2 sequentially, and if the neighboring block has been coded in the affine mode (that is, if the neighboring block is a neighboring block which has been reconstructed effectively by using the affine motion model), may derive two CPMVs or three CPMVs for the current block based on the affine motion model of the neighboring block, and the CPMVs may be derived as inherited candidate of the current block. As one example, at most five inherited candidates may be added into the merge candidate list. That is, at most five inherited candidates may be derived based on the neighboring blocks.

After this, the encoding apparatus/decoding apparatus may add a constructed candidate into the merge candidate list (S810).

For example, if the number of merge candidates of the merge candidate list is less than five, the constructed candidate may be added into the merge candidate list. The constructed candidate may represent a merge candidate which is generated by combining neighbor motion information on each of CPs of the current block (i.e., motion vector of the neighboring block and reference picture index). The motion information on each of CPs may be derived based on a spatial neighboring block or a temporal neighboring block. The motion information on each of CPs may be represented as a candidate motion vector for the corresponding CP.

Figure 10:
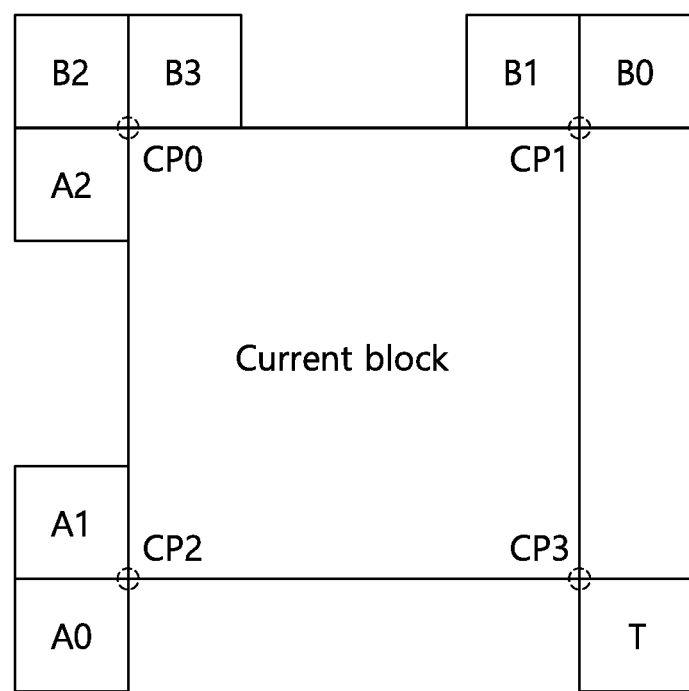
FIG. 10 represents neighboring blocks of the current block for deriving a constructed candidate according to an embodiment of the present document.

FIG. 10 represents neighboring blocks of the current block for deriving a constructed candidate according to an embodiment of the present document.

Referring to FIG. 10, the neighboring blocks may include spatial neighboring blocks and a temporal neighboring block. The spatial neighboring blocks may include a neighboring block A0, a neighboring block A1, a neighboring block A2, a neighboring block B0, a neighboring block B1, a neighboring block B2, and a neighboring block B3. A neighboring block T shown in FIG. 10 may represent the temporal neighboring block.

Here, the neighboring block B2 may represent a neighboring block located at a top-left of a top-left sample position of the current block; the neighboring block B3, a neighboring block located at a top of the top-left sample position of the current block; and the neighboring block A2, a neighboring block located at a left of the top-left sample position of the current block. In addition, the neighboring block B1 may represent a neighboring block located at a top of the top-right sample position of the current block; and the neighboring block B0, a neighboring block located at a top-right of the top-right sample position of the current block. In addition, the neighboring block A1 may represent a neighboring block located at a left of the bottom-left sample position of the current block; and the neighboring block A0, a neighboring block located at a bottom-left of the bottom-left sample position of the current block.

Further, referring to FIG. 10, the CPs of the current block may include CP0, CP1, CP2 and/or CP3. The CP0 may represent a top-left position of the current block; the CP1, a top-right position of the current block; the CP2, a bottom-left position of the current block; and the CP3, a bottom-right position of the current block. For example, if a size of the current block is W×H, and x component of the top-left sample position of the current block is 0 and y component thereof is 0, the CP0 may represent a position at coordinates (0, 0); the CP1, a position at coordinates (W, 0); the CP2, a position at coordinates (0, H); and the CP3, a position at coordinates (W, H). Meanwhile, the CP0 shown in FIG. 10 may represent the above-described CP0; the CP1 shown in FIG. 10, the above-described CP0; and the CP2 shown in FIG. 10, the above-described CP1.

A motion vector for each of the CPs may be derived as below.

For example, the encoding apparatus/decoding apparatus may check neighboring blocks in a first group along a first sequence whether it is available, and a motion vector of the neighboring block which has been first confirmed to be available during the checking process may be derived as a candidate motion vector for the CP0. That is, the candidate motion vector for the CP0 may be a motion vector of the neighboring block which has been first confirmed to be available while checking neighboring blocks in the first group along the first sequence. The availability may represent existence of motion vector of the neighboring block. That is, the available neighboring block may be a block which has been coded in inter prediction (that is, to which the inter prediction has been applied). Here, for example, the first group may include the neighboring block B2, the neighboring block B3 and the neighboring block A2. The first sequence may be a sequence in the first group from the neighboring block B2 to the neighboring block B3, and then to the neighboring block A2. As one example, if the neighboring block B2 is available, the motion vector of the neighboring block B2 may be derived as the candidate motion vector for the CP0; if the neighboring block B2 is not available and the neighboring block B3 is available, the motion vector of the neighboring block B3, as the candidate motion vector for the CP0; and if none of the neighboring blocks B2 and B3 is available and the neighboring block A2 is available, the motion vector of the neighboring block A2, as the candidate motion vector for the CP0.

Further, for example, the encoding apparatus/decoding apparatus may check neighboring blocks in a second group along a second sequence whether it is available, and a motion vector of the neighboring block which has been first confirmed to be available during the checking process may be derived as a candidate motion vector for the CP1. That is, the candidate motion vector for the CP1 may be a motion vector of the neighboring block which has been first confirmed to be available while checking neighboring blocks in the second group along the second sequence. The availability may represent existence of motion vector of the neighboring block. That is, the available neighboring block may be a block which has been coded in inter prediction (that is, to which the inter prediction has been applied). Here, the second group may include the neighboring block B1 and the neighboring block B0. The second sequence may be a sequence in the second group from the neighboring block B1 to the neighboring block B0. As one example, if the neighboring block B1 is available, the motion vector of the neighboring block B1 may be derived as the candidate motion vector for the CP1; and if the neighboring block B1 is not available and the neighboring block B0 is available, the motion vector of the neighboring block B0, as the candidate motion vector for the CP1.

Further, for example, the encoding apparatus/decoding apparatus may check neighboring blocks in a third group along a third sequence whether it is available, and a motion vector of the neighboring block which has been first confirmed to be available during the checking process may be derived as a candidate motion vector for the CP2. That is, the candidate motion vector for the CP2 may be a motion vector of the neighboring block which has been first confirmed to be available while checking neighboring blocks in the third group along the third sequence. The availability may represent existence of motion vector of the neighboring block. That is, the available neighboring block may be a block which has been coded in inter prediction (that is, to which the inter prediction has been applied). Here, the third group may include the neighboring block A1 and the neighboring block A0. The third sequence may be a sequence in the third group from the neighboring block A1 to the neighboring block A0. As one example, if the neighboring block A1 is available, the motion vector of the neighboring block A1 may be derived as the candidate motion vector for the CP2; and if the neighboring block A1 is not available and the neighboring block A0 is available, the motion vector of the neighboring block A0, as the candidate motion vector for the CP2.

Further, for example, the encoding apparatus/decoding apparatus may check the temporal neighboring block (i.e., the neighboring block T) whether it is available, and if the temporal neighboring block (i.e., the neighboring block T) is available, a motion vector of the temporal neighboring block (i.e., the neighboring block T) may be derived as a candidate motion vector for the CP3.

Combination of the candidate motion vector for the CP0, the candidate motion vector for the CP1, the candidate motion vector for the CP2, and/or the candidate motion vector for the CP3 may be derived as a constructed candidate.

For example, as described above, the six-affine model needs motion vectors of three CPs. For the six-affine model, three CPs may be selected from among the CP0, the CP1, the CP2 and the CP3. For example, the CPs may be selected as one of {CP0, CP1, CP3}, {CP0, CP1, CP2}, {CP1, CP2, CP3} and {CP0, CP2, CP3}. As one example, the six-affine model may be constituted by using CP0, CP1 and CP2. In this case, the CPs may be represented as the {CP0, CP1, CP2}.

Further, for example, as described above, the four-affine model needs motion vectors of two CPs. For the four-affine model, two CPs may be selected from among the CP0, the CP1, the CP2 and the CP3. For example, the CPs may be selected as one of {CP0, CP3}, {CP1, CP2}, {CP0, CP1}, {CP1, CP3}, {CP0, CP2} and {CP2, CP3}. As one example, the four-affine model may be constituted by using CP0 and CP1. In this case, the CPs may be represented as the {CP0, CP1}.

The constructed candidate, which is combinations of candidate motion vectors, may be added into the merge candidate list in the following order. That is, after candidate motion vectors for the CPs have been derived, the constructed candidate may be derived in the following order.

{CP0, CP1, CP2}, {CP0, CP1, CP3}, {CP0, CP2, CP3}, {CP1, CP2, CP3}, {CP0, CP1}, {CP0, CP2}, {CP1, CP2}, {CP0, CP3}, {CP1, CP3}, {CP2, CP3}

That is, for example, a constructed candidate including a candidate motion vector for the CP0, a candidate motion vector for the CP1 and a candidate motion vector for the CP2, a constructed candidate including a candidate motion vector for the CP0, a candidate motion vector for the CP1 and a candidate motion vector for the CP3, a constructed candidate including a candidate motion vector for the CP0, a candidate motion vector for the CP2 and a candidate motion vector for the CP3, a constructed candidate including a candidate motion vector for the CP1, a candidate motion vector for the CP2 and a candidate motion vector for the CP3, a constructed candidate including a candidate motion vector for the CP0 and a candidate motion vector for the CP1, a constructed candidate including a candidate motion vector for the CP0 and a candidate motion vector for the CP1, a constructed candidate including a candidate motion vector for the CP0 and a candidate motion vector for the CP2, a constructed candidate including a candidate motion vector for the CP1 and a candidate motion vector for the CP2, a constructed candidate including a candidate motion vector for the CP0 and a candidate motion vector for the CP3, a constructed candidate including a candidate motion vector for the CP1 and a candidate motion vector for the CP3, and a constructed candidate including a candidate motion vector for the CP2 and a candidate motion vector for the CP3 may be addadded into the merge candidate list in this order.

After this, the encoding apparatus/decoding apparatus may addadd a zero motion vector to the merge candidate list (S820).

For example, if the number of merge candidates of the merge candidate list is less than 5, a merge candidate including zero motion vectors may be addadded into the merge candidate list until the merge candidate list is constituted with the maximum merge candidate number. The maximum merge candidate number may be five. Further, the zero motion vector may represent a motion vector whose vector value is 0.

Meanwhile, since the merge candidate list may be constituted as described above, parameter setting according to the existing embodiment for constituting the merge candidate list may be represented as the following table.

TABLE 1

| Description | Number | Detailed |
|---|---|---|
| Parameter number of motion mode | 4 or 6 | DETERMINE DEPENDING ON AFFINE MODEL OF REFERENCE BLOCK Constructed USE BOTH 4- & 6-PARAMETER MODES |
| Length of candidate list | 5 | |
| Max number of inherited candidate | 5 | SAME TO THE NUMBER OF REFERENCE BLOCKS. |
| Max number of constructed candidate | 10 | 6 (4 parameter) + 4 (6 parameter): SEE TABLE 2. |

Referring to Table 1, the number of parameters of an affine motion model is four or six (i.e., four-affine motion model or six-affine motion model). If the neighbor reference block is a four-parameter model, a four-parameter model is used for inherited candidate generation, and if the neighbor reference block is a six-parameter model, a six-parameter model is used to generate an inherited candidate. In the case of the constructed candidate, the constructed candidate is generated using both of the four-parameter model or the six-parameter model. The number of merge candidates of the affine merge mode may be five; the maximum number of inherited candidates, five; and the maximum number of constructed candidates, ten.

The number of processes for constituting the merge candidate list may be represented as the following table.

TABLE 2

| Process | Number of process | Detailed description |
|---|---|---|
| Inherited candidate generation | 5 | Max 5 candidates |
| Pruning process | 10 | 10 = 4 + 3 + 2 + 1 |
| Scaling process | 0 | 0 |

TABLE 3

| Process | Number of process | Detailed description |
|---|---|---|
| constructed candidate generation | 10 | Maximum candidate number: 10 6 (4 parameter) + 6 (6 parameter) |
| Pruning process | 40 | 40 = 4 * 10 |
| Scaling process | 22 | See 표 4 |

Table 2 represents the number of processes accompanying an inherited candidate generation process, and when at most five inherited candidates are generated, a pruning check process of a motion vector may be performed at most ten times, and a scaling process may not be performed.

Table 3 represents the number of processes accompanying a constructed candidate generation process, and when at most ten inherited candidates are generated, a pruning check process of a motion vector may be performed at most 40 times, and a scaling process may be performed 22 times.

In this case, meanwhile, the pruning check process may determine whether merge candidate is identical to the merge candidate which has been already derived, and, if not, may represent a process of addadding into the merge candidate list.

In the process of deriving a merge candidate, the motion vector scaling process may be represented as the following table.

TABLE 4

| Process | Candidates | Number of scaling | Description |
|---|---|---|---|
| Constructed candidate based on 4 parameter | Affine {CP0, CP3} Affine {CP1, CP2} Affine {CP0, CP1} Affine {CP1, CP3} Affine {CP0, CP2} Affine {CP2, CP3}. | 12 = 1 * 2 * 6 | 1: PERFORMING SCALING BASED ON CP AMONG TWO CPS WHICH HAS SMALLER REFERENCE INDEX. 2: PERFORMING FOR LIST0 AND LIST1, RESPECTIVELY. 6: PERFORMING FOR SIX CANDIDATES. |
| Constructed candidate based on 6 parameter | Affine {CP0, CP1, CP3} Affine {CP0, CP1, CP2} Affine {CP1, CP2, CP3} Affine {CP0, CP2, CP3} | 8 = 1 * 2 * 4 | 1: PERFORMING SCALING BASED ON CP AMONG THREE CPS IN WHICH TWO OR MORE REFERENCE INDEXES EXSIT. 2: PERFORMNG FOR LIST0 AND LIST1, RESPECTIVELY. 4: PERFORMING FOR FOUR CANDIDATES. |
| CP3 | T | 2 = 1 * 2 | 1: SCALING FOR TMVP. 2: PERFORMING FOR LIST0 AND LIST1. |

Referring to FIG. 4, in the process of deriving a merge candidate, the number of motion vector scaling processes may be derived.

The number of operations necessary for each of processes represented in Tables 2 and 3 is as in Table 5 below, and is explained in detail in Tables 6 and 7. In Tables 5 and 6, "Add" means an addition operation; "Shift", a shift operation; "Comp.", a comparison operation; "Abs", an operation of obtaining an absolute value; "Div.", a division operation; and "Mult.", a multiplication operation.

TABLE 5

| Process | Add | Shift | Comp. | Abs | Div. | Mult. |
|---|---|---|---|---|---|---|
| Inherited candidate | 16 | 16 | 0 | 0 | 0 | 0 |
| Constructed candidate (all) | | | SEE TABLE 6 | | | |
| Pruning process | 0 | 0 | 15 | 0 | 0 | 0 |
| Scaling process | 8 | 4 | 11 | 1 | 1 | 3 |

TABLE 6

| Constructed candidate | Process | Add | Shift | Comp. |
|---|---|---|---|---|
| Affine {CP0, CP1, CP2} | | 0 | 0 | 0 |
| Affine {CP0, CP1, CP3} | Derive CP2 | 4 | 0 | 0 |
| Aifine {CP0, CP2, CP3} | Derive CP1 | 4 | 0 | 0 |
| Affine {CP1, CP2, CP3} | Derive CP0 | 4 | 0 | 0 |
| Affine {CP0, CP1} | | 0 | 0 | 0 |
| Affine {CP0, CP2} | Derive CP1 | 4 | 4 | 0 |
| | Round(CP1) | 5 | 3 | 4 |
| Affine {CP1, CP2} | Derive CP0 | 10 | 12 | 0 |
| Affine {CP0, CP3} | Derive CP1 | 10 | 12 | 0 |
| | Round(CP1) | 5 | 3 | 4 |
| Affine {CP1, CP3} | Derive CP0 | 4 | 4 | 0 |
| | Round(CP0) | 5 | 3 | 4 |
| Affine {CP2, CP3} | Derive CP0 | 4 | 4 | 0 |
| | Derive CP1 | 4 | 4 | 0 |
| | Round(CP0) | 5 | 3 | 4 |
| | Round(CP1) | 5 | 3 | 4 |

TABLE 7

| Process | Comp. | Detailed |
|---|---|---|
| Pruning process | 15 | 12 (3 CPMVs) + 2 (reference index for list0 and list1) + 1 (affine_type) |

The number of operations used for constituting this merge candidate list may be finally summarized as Table 8.

TABLE 8

| | Process | Add | Shift | Comp. | Abs | Div. | Mult. |
|---|---|---|---|---|---|---|---|
| Inherited | Candidate generation | 160 | 160 | 0 | 0 | 0 | 0 |
| | Pruning process | 0 | 0 | 150 | 0 | 0 | 0 |
| | Scaling process | 0 | 0 | 0 | 0 | 0 | 0 |
| Constructed | Canididate generation (Table 2.1-6) | 73 | 55 | 20 | 0 | 0 | 0 |
| | Pruning process | 0 | 0 | 600 | 0 | 0 | 0 |
| | Scaling process | 176 | 68 | 247 | 22 | 22 | 66 |
| All | All | 409 | 303 | 1012 | 22 | 22 | 66 |

What the present document intends to address is to reduce the complexity caused by the pruning check process accompanying the merge candidate list generation. Hereinafter, complexity analysis represented in embodiments below will be analyzed in terms of the number of comparison operations for the pruning check process of the inherited candidate and the constructed candidate in Table 8.

As one example, there may be proposed a method which includes checking the neighboring blocks in a scanning sequence and deriving the inherited candidates based on the affine block, wherein the derived merge candidates are derived from neighboring blocks for reference pictures different from each other. The present embodiment is proposed as there is high possibility that inherited candidates which have been derived based on neighboring blocks whose reference pictures are the same are the same or similar to each other. Here, the scanning sequence may be like this: the bottom-left corner neighboring block A0→the top-right corner neighboring block B0→the left neighboring block A1→the top neighboring block B1→the top-left corner neighboring block B2. This is an exemplary one, and the scanning sequence may be a scanning sequence shown in description for FIG. 9.

For example, inherited candidates according to the present embodiment may be derived as the following table.

TABLE 9

| Candidate | Affine prediction | Reference frame index of list0 and list1 | Affine inherited candidate | Description | Affine merge list |
|---|---|---|---|---|---|
| A0 | Yes | {0, 0} | Yes | A0 BLOCK IS CONSIDERED AS AFFINE MERGE CANDIDATE. SINCE IT IS AFFINE PREDICTION. | inherited(A0) |
| B0 | Yes | {1, 0} | Yes | B0 BLOCK IS CONSIDERED AS AFFINE MERGE CANDIDATE SINCE IT IS AFFINE PREDICTION AND AFFINE MERGE CANDIDATE HAVING THE SAME REFERENCE FRAME INDEX IS NOT PRESENT IN CANDIDATE LIST. | inherited(A0) inherited(B0) |
| A1 | No | {0, 0} | No | A1 BLOCK IS NOT CONSIDERED AS AFFINE MERGE CANDIDATE SINCE IT IS NOT AFFINE PREDICTION. | inherited(A0) inherited(B0) |

TABLE 9-continued

| Candidate | Affine prediction | Reference frame index of list0 and list1 | Affine inherited candidate | Description | Affine merge list |
|---|---|---|---|---|---|
| B1 | Yes | {0, 0} | No | B1 BLOCK IS NOT CONSIDERED AS AFFINE MERGE CANDIDATE SINCE, ALTHOUGH IT IS AFFINE PREDICTION, INHERITED(A0) HAVING THE SAME REFERENCE FRAME INDEX IS ALREADY PRESENT IN THE LIST. | inherited(A0) inherited(B0) |
| B2 | Yes | {0, 1} | Yes | B2 BLOCK IS CONSIDERED AS AFFINE MERGE CANDIDATE SINCE IT IS AFFINE PREDICTION AND AFFINE MERGE CANDIDATE HAVING THE SAME REFERENCE FRAME INDEX IS NOT PRESENT IN THE LIST. | inherited(A0) inherited(B0) inherited(B2) |

Referring to Table 9, the neighboring blocks may be checked in a sequence of the bottom-left corner neighboring block A0, the top-right corner neighboring block B0, the left neighboring block A1, the top neighboring block B1, the top-left corner neighboring block B2.

Referring to Table. 9, the bottom-left corner neighboring block A0 may be a block to which affine prediction has been applied (i.e., affine block), and thus an inherited candidate may be derived based on the bottom-left corner neighboring block A0.

Next, the top-right corner neighboring block B0 may be a block to which affine prediction has been applied (i.e., affine block), and may have a reference picture index {1, 0} different from a reference picture index {0, 0} of the bottom-left corner neighboring block A0 for the already derived inherited candidate. Therefore, an inherited candidate based on the top-right corner neighboring block B0 may be derived.

Next, since the left neighboring block A1 is a block to which affine prediction is not applied, that is, is not an affine block, an inherited candidate based on the left neighboring block A1 may not be derived.

Next, the top neighboring block B1 may be a block to which affine prediction has been applied (i.e., affine block), but may have a reference picture index {0, 0} identical to a reference picture index {0, 0} of the bottom-left corner neighboring block A0 for the already derived inherited candidate. Therefore, an inherited candidate based on the top neighboring block B1 may not be derived.

Next, the top-left corner neighboring block B2 may be a block to which affine prediction has been applied (i.e., affine block), and may have a reference picture index {0, 1} different from reference picture indexes of already derived inherited candidates. Therefore, an inherited candidate based on the top-left corner neighboring block B2 may be derived.

Since such an embodiment as in Table 9 compares only reference indexes in the pruning check process, the operation necessary for the pruning check process is as in Table 10, and complexity by the pruning check process may be finally summarized as in Table 11. Therefore, as shown in Table 11, the comparison operation number for deriving an inherited candidate may be decreased from 150 times to 20 times, and thus it is possible to reduce operation complexity by the pruning check process.

TABLE 10

| Process | Comp. | Detailed |
|---|---|---|
| Pruning process (inherited) | 2 | 2 (reference index for list0 and list1) |
| Pruning process (constructed) | 15 | 12 (3 CPMVs) + 2 (reference index for list0 and list1) + 1 (affine_type) |

TABLE 11

| Affine type | Pruning process | Com. For one pruning process | Comp. |
|---|---|---|---|
| Inherited | 10 | 2 | 20 ~~150~~ |
| Constructed | 40 | 15 | 600 |

Meanwhile, according to still another embodiment, there may be proposed a method which includes checking the neighboring blocks in a scanning sequence, so that the inherited candidate is derived based on affine block, wherein merge candidate is derived through checking whether a neighboring block is a neighboring block for a reference picture different from a current block, and what affine_type for a neighboring block is. Here, the affine type may be an index indicating whether the four-parameter model or the six-parameter model is used. For example, a case where affine type=0 may indicate that the four-parameter model is used, and a case where affine type=1 may indicate that the six-parameter is used. Therefore, in the pruning check process for an inherited candidate, only the reference index and the affine type are compared.

According to the present embodiment, operations necessary for the pruning check process are as in Table 12, and finally complexity may be summarized as in Table 13.

TABLE 12

| Process | Comp. | Detailed |
|---|---|---|
| Pruning process (inherited) | 3 | 2 (reference index for list0 and list1) + 1 (affine type) |
| Pruning process (constructed) | 15 | 12 (3 CPMVs) + 2 (reference index for list0 and list1) + 1 (affine_type) |

TABLE 13

| Affine type | Pruning process | Com. For one pruning process | Comp. |
|---|---|---|---|
| Inherited | 10 | 3 | 30 ~~150~~ |
| Constructed | 40 | 15 | 600 |

As in Table 13, the number of comparison processes of the pruning check process for an inherited candidate may be decreased from 150 to 30.

When the present embodiment is compared with the method of generating a merge candidate, which has been explained referring to Tables 9 to 11, in the case of the present embodiment, the affine type is additionally considered for the pruning check process of an inherited candidate. It has taken into consideration that, although the reference picture is the same, a candidate having different characteristics may be constituted when the affine type is different. When this method is compared with the embodiments of Tables 9 to 11, the operation number, that is, the number of comparison operations of the pruning check process is increased by one. However, the increasing extent is small, and rather there exists an effect of improvement in performance which results from the consideration of an additional candidate of different characteristics. That is, the additional consideration of the affine type may show a trade-off relation between complexity and performance.

Meanwhile, as described above, in the existing case, a scanning process is performed for generating an inherited candidate, and whenever the inherited candidate is generated at the scanning position, the pruning check process is performed. For example, the spatial position for the scanning process is as in FIG. 9, and if the scanning sequence is like this: A1→B1→B0→A0→B2, the scanning process may be performed as in Table 14 in the worst case.

TABLE 14

| Scanning position | Pruning process (PRIOR METHOD) | Pruning process (PROPOSED METHOD 1) | Pruning process (PROPOSED METHOD 2) | 참고 |
|---|---|---|---|---|
| A1 | | | | IN A |
| B1 | (B1, A1) | | (B1, A1) | CORRESPONDING |
| B0 | (B0, A1) | (B0, B1) | (B0, B1) | TABLE, (A, B) MEANS |
|  | (B0, B1) | | | PRUNING CHECKING |
| A0 | (A0, A1) | (A0, A1) | (A0, A1) | THE INHERITED |
|  | (A0, B1) | | | CANDIDATE OF A & B |
|  | (A0, B0) | | | |
| B2 | (B2, A1) | (B2, A1) | (B2, A1) | |
|  | (B2, B1) | (B2, B1) | (B2, B1) | |
|  | (B2, B0) | | | |
|  | (B2, A0) | | | |

In a case where the inherited candidate is generated according to the existing method, as represented in Table 14, the pruning check process is needed at most ten times.

In the proposed method of Table 14 (third column of Table 14), if the distance of the scanning position of the inherited candidate is near, the pruning check process is performed, while, if the distance is far, the pruning check process is not performed. For example, since blocks A1 and B1 of Table 14 have a low spatial correlation (or the distance between the two blocks is far), there is a high probability that a different inherited candidate is generated. Therefore, in this case, the merge candidate is addadded into the inherited candidate without performing the pruning check process. Similarly, in the case of the blocks B0 and B1, since the spatial correlation is high, there is a high probability that similar candidate is generated. In this case, by performing the pruning check process, it may be determined whether the corresponding candidate is addadded into the inherited candidate. In the case of the block B2, the pruning check process is performed only on the block A1 among the blocks A0 and A1, which is near, while the pruning check process is performed only on the block B1 among the blocks B0 and B1, which is near. According to proposed method 1, the number of the pruning check process may be decreased from existing ten to four.

Proposed method 2 of Table 14 corresponds to a case where the pruning check processes for the blocks A1 and B1 are added to proposed method 1. In the case of the corresponding blocks A1 and B1, as they are considered as a candidate at a higher probability compared to the other blocks, they may be additionally considered to minimize coding efficiency degradation which may be caused by decreasing the number of the pruning check processes.

Proposed method 1 or 2 described in Table 14 may be applied concurrently, i.e, doubly, with the existing method and the method for reducing the pruning check process of the embodiment described above. The methods explained in Tables 9 to 13 are ones which reduce the number of comparison operations necessary for the pruning check process, while proposed methods 1 and 2 according to Table 14 are ones which reduce the number of the pruning check processes.

Further, embodiments which reduce operation complexity in the constructed candidate deriving process are proposed in the present document.

Figure 11:
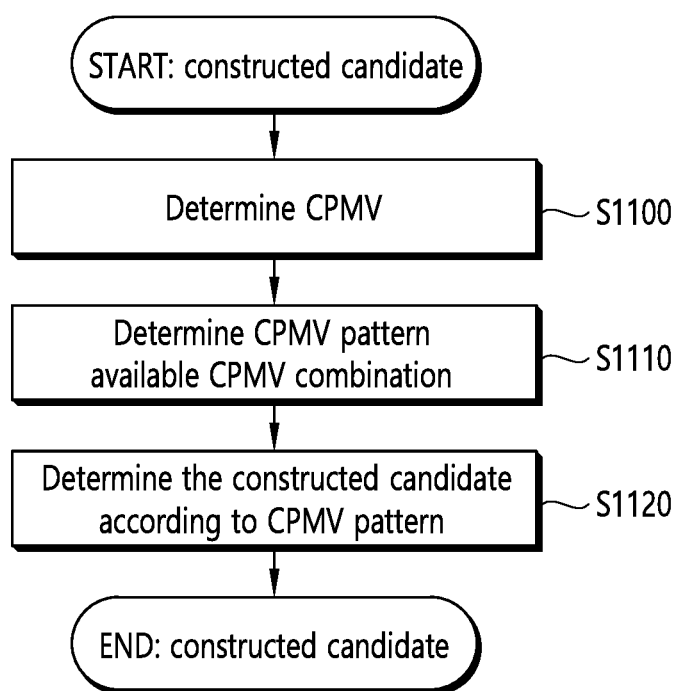
FIG. 11 represents a method of deriving a constructed candidate according to an embodiment of the present document.

FIG. 11 represents a method of deriving a constructed candidate according to an embodiment of the present document.

Referring to FIG. 11, the encoding apparatus/decoding apparatus may derive candidate motion vectors for CPs of the current block (S1100).

Meanwhile, the constructed candidate may be derived based on the candidate motion vectors for CPs. The candidate motion vectors may be derived based on neighboring blocks.

Figure 12:
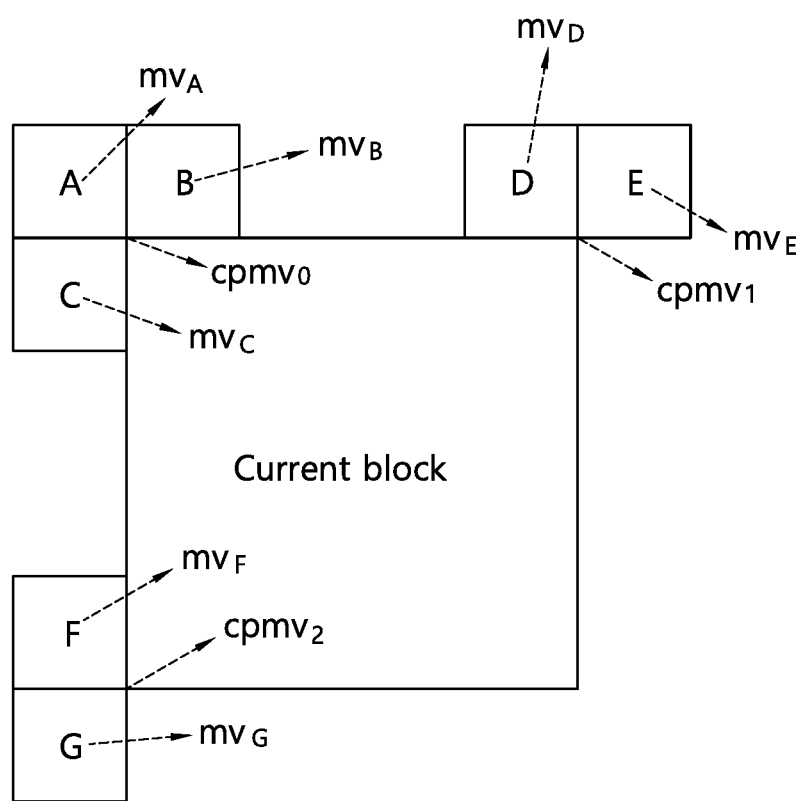
FIG. 12 is a diagram showing a candidate motion vector for CP of the current block and a neighboring block of the current block for deriving a constructed candidate according to an embodiment of the present document.

FIG. 12 is a diagram showing a candidate motion vector for CP of the current block and a neighboring block of the current block for deriving a constructed candidate according to an embodiment of the present document.

As shown in FIG. 12, a candidate motion vector CPMV0 for CP0 of the current block, a candidate motion vector CPMV1 for CP0 of the current block, and a candidate motion vector CPMV2 for CP1 of the current block may be selected as the following equations:

$$CPMV_0 = \{mv_A, mv_B, mv_C\}$$

$$CPMV_1 = \{mv_D, mv_E\}$$

$$CPMV_2 = \{mv_F, mv_G\} \qquad [\text{Equation 6}]$$

where the CP0 may represent a top-left position of the current block; the CP1, a top-right position of the current block; and the CP2, a bottom-left position of the current block.

For example, the encoding apparatus/decoding apparatus may check neighboring blocks in a first group along a first sequence whether it is available, and a motion vector of the neighboring block which has been first confirmed to be available during the checking process may be derived as a candidate motion vector for the CP0. That is, the candidate motion vector for the CP0 may be a motion vector of the neighboring block which has been first confirmed to be available while checking neighboring blocks in the first group along the first sequence. The availability may represent that the neighboring block exists, and that the neighboring block has been coded in inter prediction.

That is, the available neighboring block may be a block which has been coded in inter prediction (that is, to which the inter prediction has been applied). Here, for example, the first group may include the neighboring block B2, the neighboring block B3 and the neighboring block A2 shown in FIG. 10. The neighboring block B2 may be represented as a neighboring block A of FIG. 12; the neighboring block B3, as a neighboring block B of FIG. 12; and the neighboring block A2, as a neighboring block C of FIG. 12.

The first sequence may be a sequence in the first group from the neighboring block B2 to the neighboring block B3, and then to the neighboring block A2. As one example, if the neighboring block B2 is available, the motion vector of the neighboring block B2 may be derived as the candidate motion vector for the CP0; if the neighboring block B2 is not available and the neighboring block B3 is available, the motion vector of the neighboring block B3, as the candidate motion vector for the CP0; and if none of the neighboring blocks B2 and B3 is available and the neighboring block A2 is available, the motion vector of the neighboring block A2, as the candidate motion vector for the CP0.

Further, for example, the encoding apparatus/decoding apparatus may check neighboring blocks in a second group along a second sequence whether it is available, and a motion vector of the neighboring block which has been first confirmed to be available during the checking process may be derived as a candidate motion vector for the CP0. That is, the candidate motion vector for the CP0 may be a motion vector of the neighboring block which has been first confirmed to be available while checking neighboring blocks in the second group along the second sequence. The availability may represent that the neighboring block exists, and that the neighboring block has been coded in inter prediction.

That is, the available neighboring block may be a block which has been coded in inter prediction (that is, to which the inter prediction has been applied). Here, the second group may include the neighboring block B1 and the neighboring block B0. The neighboring block B1 may be represented as a neighboring block D of FIG. 12; and the neighboring block B0, as a neighboring block E of FIG. 12.

The second sequence may be a sequence in the second group from the neighboring block B1 to the neighboring block B0. As one example, if the neighboring block B1 is available, the motion vector of the neighboring block B1 may be derived as the candidate motion vector for the CP0; and if the neighboring block B1 is not available and the neighboring block B0 is available, the motion vector of the neighboring block B0, as the candidate motion vector for the CP0.

Further, for example, the encoding apparatus/decoding apparatus may check neighboring blocks in a third group along a third sequence whether it is available, and a motion vector of the neighboring block which has been first confirmed to be available during the checking process may be derived as a candidate motion vector for the CP1. That is, the candidate motion vector for the CP1 may be a motion vector of the neighboring block which has been first confirmed to be available while checking neighboring blocks in the third group along the third sequence. The availability may represent that the neighboring block exists, and that the neighboring block has been coded in inter prediction.

That is, the available neighboring block may be a block which has been coded in inter prediction (that is, to which the inter prediction has been applied). Here, the third group may include the neighboring block A1 and the neighboring block A0. The neighboring block A1 may be represented as a neighboring block F of FIG. 12; and the neighboring block A0, as a neighboring block G of FIG. 12.

The third sequence may be a sequence in the third group from the neighboring block A1 to the neighboring block A0. As one example, if the neighboring block A1 is available, the motion vector of the neighboring block A1 may be derived as the candidate motion vector for the CP1; and if the neighboring block A1 is not available and the neighboring block A0 is available, the motion vector of the neighboring block A0, as the candidate motion vector for the CP1.

Meanwhile, the candidate motion vector for the CP3 of the current block may not be considered. That is, the candidate motion vector for the CP3 may not be derived. Here, the CP3 may represent the bottom-right position of the current block. As the CP3 may be derived based on the motion vector of the temporal neighboring block (or temporal motion vector predictor (TMVP)) as described above, it is required to perform a scaling process for deriving a candidate motion vector for the CP3, which may become a main cause of increasing the operation complexity. Therefore, the candidate motion vector for the CP3 may not be derived.

The encoding apparatus/decoding apparatus may determine a CPMV pattern based on available CPMV combination (S1110). The available CPMV combination may represent combination of candidate motion vectors whose reference pictures are the same.

Referring to Table 15 below, integer value, such as "0", "1", "2", "3", "4", may be assigned to the CPMV pattern.

For example, if a reference picture for the candidate motion vector of the CP0, a reference picture for the candidate motion vector of the CP1 and a reference picture for the candidate motion vector of the CP2 are the same, the available CPMV combination may be represented as {CPMV0, CPMV1, CPMV2}. A CPMV pattern for the available CPMV combination {CPMV0, CPMV1, CPMV2} may be derived as CPMV pattern 1.

Further, for example, if a reference picture for the candidate motion vector of the CP0 and a reference picture for the candidate motion vector of the CP1 are the same, and different from a reference picture for the candidate motion vector of the CP2, the available CPMV combination may be represented as {CPMV0, CPMV1}. A CPMV pattern for the available CPMV combination {CPMV0, CPMV1} may be derived as CPMV pattern 2.

Further, for example, if a reference picture for the candidate motion vector of the CP0 and a reference picture for the candidate motion vector of the CP2 are the same, and different from a reference picture for the candidate motion vector of the CP1, the available CPMV combination may be represented as {CPMV0, CPMV2}. A CPMV pattern for the available CPMV combination {CPMV0, CPMV2} may be derived as CPMV pattern 3.

Further, for example, if a reference picture for the candidate motion vector of the CP1 and a reference picture for the candidate motion vector of the CP2 are the same, and different from a reference picture for the candidate motion vector of the CP0, the available CPMV combination may be represented as {CPMV1, CPMV2}. A CPMV pattern for the available CPMV combination {CPMV1, CPMV2} may be derived as CPMV pattern 4.

Meanwhile, if a reference picture for the candidate motion vector of the CP0, a reference picture for the candidate motion vector of the CP1 and a reference picture for the candidate motion vector of the CP2 are different from one another, the CPMV pattern may be derived as CPMV pattern 0.

The encoding apparatus/decoding apparatus may derive the constructed candidate based on the derived CPMV pattern (S1120).

For example, if the CPMV pattern 0 is derived, the constructed candidate may not be derived.

Further, for example, if the CPMV pattern 1 is derived, a constructed candidate including {CPMV0, CPMV1, CPMV2}, a constructed candidate including {CPMV0, CPMV1}, a constructed candidate including {CPMV0, CPMV2}, and a constructed candidate including {CPMV1, CPMV2} may be addadded in this order into the merge candidate list of the current block until the number of the candidates of the merge candidate list reaches the maximum number.

Further, for example, if the CPMV pattern 2 is derived, the constructed candidate including {CPMV0, CPMV1} may be addadded into the merge candidate list.

Further, for example, if the CPMV pattern 3 is derived, the constructed candidate including {CPMV0, CPMV2} may be addadded into the merge candidate list.

Further, for example, if the CPMV pattern 4 is derived, the constructed candidate including {CPMV1, CPMV2} may be addadded into the merge candidate list.

The CPMV pattern according to the available CPMV combination and the available constructed candidate may be derived as in Table 15.

TABLE 15

| CPMV pattern | Available CPMV combination | Available constructed candidate |
|---|---|---|
| 0 | N/A | N/A |
| 1 | {CPMV0, CPMV1, CPMV2} | Affine(CPMV0, CPMV1, CPMV2) |
|  |  | Affine(CPMV0, CPMV1) |
|  |  | Affine(CPMV0, CPMV2) |
|  |  | Affine(CPMV1, CPMV2) |
| 2 | {CPMV0, CPMV1} | Affine(CPMV0, CPMV1) |
| 3 | {CPMV0, CPMV2} | Affine(CPMV0, CPMV2) |
| 4 | {CPMV1, CPMV2} | Affine(CPMV1, CPMV2) |

If the above-described deriving process is represented in a pseudo code, it may be derived as in the following table.

TABLE 16

Determine CPMV
Determine CPMV pattern available CPMV combination.
If CPMV pattern == 0
  Insert nothing into the affine merge candidate list.

TABLE 16-continued

Else if CPMV pattern == 1
  Insert Affine(CPMV0, CPMV1, CPMV2),
    Affine(CPMV0, CPMV1), Affine(CPMV0, CPMV2),
    Affine(CPMV1, CPMV2) sequentially into the affine merge
    candidate list until the number of candidate list is max,
Else if CPMV pattern == 2
  Insert Affine(CPMV0, CPMV1) into the affine merge candidate
    list
Else if CPMV pattern == 3
  Insert Affine(CPMV0, CPMV2) into the affine merge candidate
    list
Else if CPMV pattern == 4
  Insert Affine(CPMV1, CPMV2) into the affine merge candidate
    list Tables 17 to 22 below represent operation complexity when following the present embodiment.

TABLE 17

| Description | Number | Detailed |
|---|---|---|
| Parameter number of motion model | 4 or 6 | 4 (constructed) 6 (inherited or constructed) |
| Length of candidate list | 5 |  |
| Max number of inherited candidate | 5 | SAME TO THE NUMBER OF REFERENCE BLOCKS. |
| Max number of constructed candidate | 4 ~~10~~ | 3 6 (4 param) + 1 4 (6 param); |

TABLE 18

| Process | Number of process | Detailed description |
|---|---|---|
| constructed candidate generation | 4 ~~10~~ | Maximum candidate number: 4 3 6 (4 param) + 1 4 (6 param) |
| Pruning Process | 16 ~~40~~ | 16 = 4 * 4 ~~10~~ |
| Scaling process | 0 ~~22~~ |  |

TABLE 19

| Process | Add | Shift | Comp. | Abs | Div. | Mult. |
|---|---|---|---|---|---|---|
| Inherited candidate | 15 | 16 | 0 | 0 | 0 | 0 |
| Constructed candidate |  |  | SEE TABLE 20 |  |  |  |
| Pruning process | 0 | 0 | 15 | 0 | 0 | 0 |
| Scaling process | 8 | 4 | 11 | 1 | 1 | 3 |

TABLE 20

| Constructed candidate | Process | Add | Shift | Comp. |
|---|---|---|---|---|
| Affine {CP0, CP1, CP2} |  | 0 | 0 | 0 |
| Affine {CP0, CP1} |  | 0 | 0 | 0 |
| Affine {CP0, CP2} | Derive CP1 | 4 | 4 | 0 |
|  | Round(CP1) | 5 | 3 | 4 |
| Affine {CP1, CP2} | Derive CP0 | 10 | 12 | 0 |

TABLE 21

| Process | Comp. | Detailed |
|---|---|---|
| Pruning process | 15 | 12 (3 CPMVs) + 2 (reference index for list0 and list1) + 1 (affine_type) |

TABLE 22

|  | Process | Add | Shift | Comp. | Abs | Div. | Mult. |
|---|---|---|---|---|---|---|---|
| Inherited | Candidate generation | 160 | 160 | 0 | 0 | 0 | 0 |
|  | Pruning process | 0 | 0 | 150 | 0 | 0 | 0 |
|  | Scaling process | 0 | 0 | 0 | 0 | 0 | 0 |
| Constructed | Canididate generation (표 6) | 19 ~~73~~ | 19 ~~55~~ | 4 ~~20~~ | 0 | 0 | 0 |
|  | Pruning process | 0 | 0 | 240 ~~600~~ | 0 | 0 | 0 |
|  | Scaling process | 0 | 0 | 0 | 0 | 0 | 0 |
| All | All | 179 ~~429~~ | 179 ~~323~~ | 394 ~~1012~~ | 0 ~~22~~ | 0 ~~22~~ | 0 ~~66~~ |

In the above-described embodiments, the worst case in which the operation complexity is highest is a case where the CPMV pattern is represented as CPMV pattern 1, and the maximum number of constructed candidates which can be generated in this case is four as represented in Table 17. Further, if the maximum number of constructed candidates is decreased from ten to four, the maximum number of pruning check processes between constructed candidates as in Table 18 is sixteen, and the scaling process may not be performed.

When the complexity for constructed candidate of Table 26 is compared with that of Table 6, addition operation is decreased from 73 to 19 times, and comparison operation of the pruning check process is decreased from 600 to 240 times. It may be understood that with the decrease in the complexity for this constructed candidate, total operation complexity is drastically decreased as in Table 26.

Meanwhile, there may be proposed an embodiment which has decrease in the CPMV pattern or the number of available constructed candidates according to the CPMV pattern from the above-described embodiment deriving the constructed candidate.

As one example, there may be proposed a method in which a combination including CPMV0 and CPMV2 or a combination including CPMV1 and CPMV2 is not considered.

That is, the encoding apparatus/decoding apparatus may determine a CPMV pattern based on an available CPMV combination, wherein the CPMV pattern may not include the CPMV pattern 3 or the CPMV pattern 4. For example, the available constructed candidate may not include the constructed candidate including {CPMV0, CPMV2}. Further, the available constructed candidate may not include the constructed candidate including {CPMV1, CPMV2}.

In the present embodiment, the CPMV pattern according to the available CPMV combination, and the available constructed candidate may be derived as in the following table.

TABLE 23

| CPMV pattern | Available CPMV combinaton | Available constructed candidate |
|---|---|---|
| 0 | N/A | N/A |
| 1 | {CPMV0, CPMV1, CPMV2} | Affine(CPMV0, CPMV1, CPMV2) |
|  |  | Affine(CPMV0, CPMV1) |
|  |  | ~~Affine(CPMV0, CPMV2)~~ |
|  |  | ~~Affine(CPMV1, CPMV2)~~ |
| 2 | {CPMV0, CPMV1} | Affine(CPMV0, CPMV1) |
| 3 | ~~{CPMV0, CPMV2}~~ | ~~Affine(CPMV0, CPMV2)~~ |
| 4 | ~~{CPMV1, CPMV2}~~ | ~~Affine(CPMV1, CPMV2)~~ |

In the case of the four-affine motion model, CPMV0 and CPMV1 are used, and in the case of the six-affine motion model, CPMV0, CPMV1 and CPMV2 are used. So, a method of deriving a constructed candidate as in the above-described embodiment may be considered in terms of unification.

Alternatively, as one example, there may be proposed a method in which a combination including CPMV1 and CPMV2 is not considered.

That is, the encoding apparatus/decoding apparatus may determine a CPMV pattern based on an available CPMV combination, wherein the CPMV pattern may be one of the CPMV pattern 0, the CPMV pattern 1, CPMV pattern 2 and CPMV pattern 3. Further, the available constructed candidate may not include the constructed candidate including {CPMV1, CPMV2}.

In the present embodiment, the CPMV pattern according to the available CPMV combination, and the available constructed candidate may be derived as in the following table.

TABLE 24

| CPMV pattern | Available CPMV combination | Available constructed candidate |
|---|---|---|
| 0 | N/A | N/A |
| 1 | {CPMV0, CPMV1, CPMV2} | Affine{CPMV0, CPMV1, CPMV2} |
|  |  | Affine{CPMV0, CPMV1} |
|  |  | Affine CPMV0, CPMV2} |
|  |  | ~~Affine {CPMV1, CPMV2}~~ |
| 2 | {CPMV0, CPMV1} | Affine{CPMV0, CPMV1} |
| 3 | {CPMV0, CPMV2} | Affine{CPMV0, CPMV2} |
| 4 | ~~{CPMV1, CPMV2}~~ | ~~Affine {CPMV1, CPMV2}~~ |

As affine prediction of the affine motion model using CPMV0 and CPMV2 may be considered, the above-described embodiment may be proposed.

Alternatively, as one example, there may be proposed a method in which the available constructed candidate according to the CPMV pattern is limited to one although all candidate motion vector combinations are considered.

That is, if the CPMV pattern 1 is derived as the CPMV pattern for the current block, the encoding apparatus/decoding apparatus may derive the constructed candidate including {CPMV0, CPMV1, CPMV2}, and addadd the constructed candidate into the merge candidate list.

In the present embodiment, the CPMV pattern according to the available CPMV combination, and the available constructed candidate may be derived as in the following table.

TABLE 25

| CPMV pattern | Available CPMV combination | Available constructed candidate |
| --- | --- | --- |
| 0 | N/A | N/A |
| 1 | {CPMV0, CPMV1, CPMV2} | Affine {CPMV0, CPMV1, CPMV2} |
|   |   | Affine {CPMV0, CPMV1} |
|   |   | Affine{CPMV0, CPMV2} |
|   |   | Affine {CPMV1, CPMV2} |
| 2 | {CPMV0, CPMV1} | Affine {CPMV0, CPMV1} |
| 3 | {CPMV0, CPMV2} | Affine {CPMV0, CPMV2} |
| 4 | {CPMV1, CPMV2} | Affine {CPMV1, CPMV2} |

Alternatively, as one example, there may be proposed a method in which the available constructed candidate according to the CPMV pattern is limited to one while a combination including CPMV0 and CPMV2 and a combination including CPMV1 and CPMV2 are not considered. That is, the present proposed method is one which limits an available constructed candidate according to a CPMV pattern to one in the method of Table 23.

That is, the encoding apparatus/decoding apparatus may determine a CPMV pattern based on an available CPMV combination, wherein the CPMV pattern may be one of the CPMV pattern 0, the CPMV pattern 1 and CPMV pattern 2. Further, the available constructed candidate may not include the constructed candidate including {CPMV0, CPMV2} and the constructed candidate including {CPMV1, CPMV2}. Further, if the CPMV pattern 1 is derived as the CPMV pattern for the current block, the encoding apparatus/decoding apparatus may derive the constructed candidate including {CPMV0, CPMV1, CPMV2}, and addadd the constructed candidate into the merge candidate list.

In the present embodiment, the CPMV pattern according to the available CPMV combination, and the available constructed candidate may be derived as in the following table.

TABLE 26

| CPMV pattern | Available CPMV combination | Available constructed candidate |
| --- | --- | --- |
| 0 | N/A | N/A |
| 1 | {CPMV0, CPMV1, CPMV2} | Affine{CPMV0, CPMV1, CPMV2} |
|   |   | Affine{CPMV0, CPMV1} |
|   |   | Affine{CPMV0, CPMV2} |
|   |   | Affine{CPMV1, CPMV2} |
| 2 | {CPMV0, CPMV1} | Affine{CPMV0, CPMV1} |
| 3 | {CPMV0, CPMV2} | Affine{CPMV0, CPMV2} |
| 4 | {CPMV1, CPMV2} | Affine{CPMV1, CPMV2} |

Alternatively, as one example, there may be proposed a method in which the available constructed candidate according to the CPMV pattern is limited to one while a combination including CPMV1 and CPMV2 is not considered. That is, the present proposed method is one which limits an available constructed candidate according to a CPMV pattern to one in the method of Table 24.

That is, the encoding apparatus/decoding apparatus may determine a CPMV pattern based on an available CPMV combination, wherein the CPMV pattern may be one of the CPMV pattern 0, the CPMV pattern 1, CPMV pattern 2 and CPMV pattern 3. Further, the available constructed candidate may not include the constructed candidate including {CPMV1, CPMV2}. Further, if the CPMV pattern 1 is derived as the CPMV pattern for the current block, the encoding apparatus/decoding apparatus may derive the constructed candidate including {CPMV0, CPMV1, CPMV2}, and addadd the constructed candidate into the merge candidate list.

In the present embodiment, the CPMV pattern according to the available CPMV combination, and the available constructed candidate may be derived as in the following table.

TABLE 27

| CPMV pattern | Available CPMV combination | Available constructed candidate |
| --- | --- | --- |
| 0 | N/A | N/A |
| 1 | {CPMV0, CPMV1, CPMV2} | Affine{CPMV0, CPMV1, CPMV2} |
|   |   | Affine{CPMV0, CPMV1} |
|   |   | Affine{CPMV0, CPMV2} |
|   |   | Affine{CPMV1, CPMV2} |
| 2 | {CPMV0, CPMV1} | Affine{CPMV0, CPMV1} |
| 3 | {CPMV0, CPMV2} | Affine{CPMV0, CPMV2} |
| 4 | {CPMV1, CPMV2} | Affine{CPMV1, CPMV2} |

Meanwhile, when the complexity according to the method of Table 24 is analyzed, it may be represented as in Table 28, and it exhibits an effect of decreasing the operation number when compared with the prior art.

TABLE 28

|   | Process | Add | Shift | Comp. | Abs | Div. | Mult. |
| --- | --- | --- | --- | --- | --- | --- | --- |
| Inherited | Candidate generation | 160 | 160 | 0 | 0 | 0 | 0 |
|   | Pruning process | 0 | 0 | 150 | 0 | 0 | 0 |
|   | Scaling process | 0 | 0 | 0 | 0 | 0 | 0 |
| Constructed | Canididate generation (TABLE 6) | 9 73 | 7 55 | 4 20 | 0 | 0 | 0 |
|   | Pruning process | 0 | 0 | 180 600 | 0 | 0 | 0 |

TABLE 28-continued

| | Process | Add | Shift | Comp. | Abs | Div. | Mult. |
|---|---|---|---|---|---|---|---|
| | Scaling process | 0 | 0 | 0 | 0 | 0 | 0 |
| All | All | 169 ~~429~~ | 167 ~~323~~ | 334 ~~1012~~ | 0 ~~22~~ | 0 ~~22~~ | 0 ~~66~~ |

When the complexity for constructed candidate of Table 28 is compared with that of Table 6, addition operation is decreased from 73 to 9 times; the number of shift operations, from 55 to 7 times; and comparison operation of the pruning check process, from 600 to 180 times. It may be understood that with the decrease in the complexity for this constructed candidate, total operation complexity is drastically decreased as in Table 28.

Figure 13:
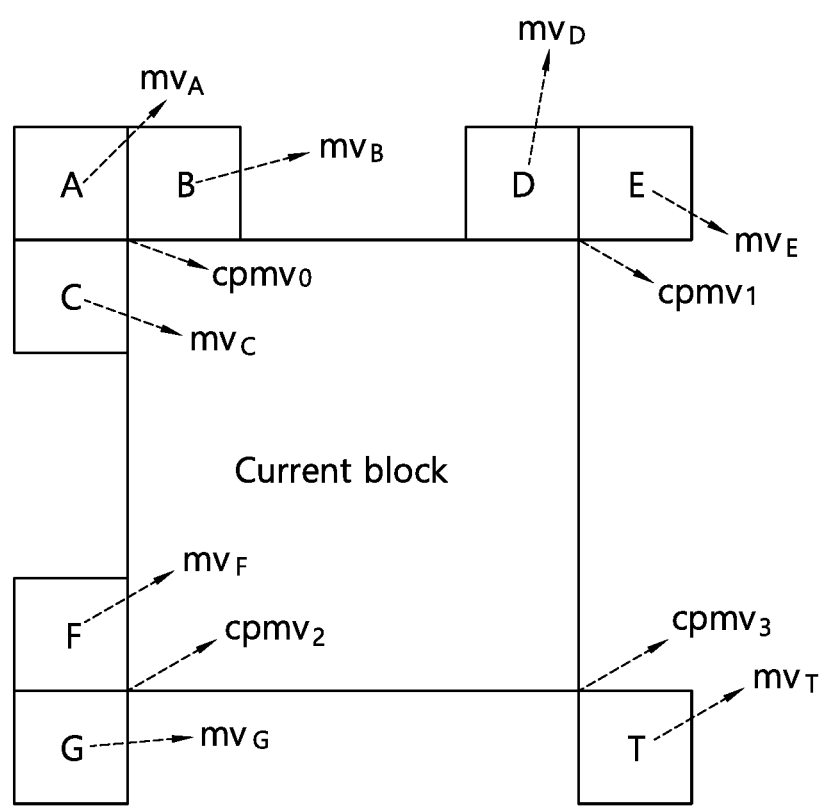
FIG. 13 is a diagram showing a candidate motion vector for CP of the current block and a neighboring block of the current block for deriving a constructed candidate according to another embodiment of the present document.

FIG. 13 is a diagram showing a candidate motion vector for CP of the current block and a neighboring block of the current block for deriving a constructed candidate according to another embodiment of the present document.

As shown in FIG. 13, a candidate motion vector CPMV0 for CP0 of the current block, a candidate motion vector CPMV1 for CP0 of the current block, a candidate motion vector CPMV2 for CP1 of the current block and a candidate motion vector CPMV3 for CP3 of the current block may be selected as the following equations:

$$CPMV_0 = \{mv_A, mv_B, mv_C\}$$

$$CPMV_1 = \{mv_D, mv_E\}$$

$$CPMV_2 = \{mv_F, mv_G\}$$

$$CPMV_3 = \{mv_T\} \quad \text{[Equation 7]}$$

where the CP0 may represent a top-left position of the current block; the CP0, a top-right position of the current block; the CP1, a bottom-left position of the current block; and the CP3, a bottom-right position of the current block.

For example, the encoding apparatus/decoding apparatus may check neighboring blocks in a first group along a first sequence whether it is available, and a motion vector of the neighboring block which has been first confirmed to be available during the checking process may be derived as a candidate motion vector for the CP0. That is, the candidate motion vector for the CP0 may be a motion vector of the neighboring block which has been first confirmed to be available while checking neighboring blocks in the first group along the first sequence. The availability may represent that the neighboring block exists, and that the neighboring block has been coded in inter prediction.

That is, the available neighboring block may be a block which has been coded in inter prediction (that is, to which the inter prediction has been applied). Here, for example, the first group may include the neighboring block B2, the neighboring block B3 and the neighboring block A2 shown in FIG. 10. The neighboring block B2 may be represented as a neighboring block A of FIG. 13; the neighboring block B3, as a neighboring block B of FIG. 13; and the neighboring block A2, as a neighboring block C of FIG. 13.

The first sequence may be a sequence in the first group from the neighboring block B2 to the neighboring block B3, and then to the neighboring block A2. As one example, if the neighboring block B2 is available, the motion vector of the neighboring block B2 may be derived as the candidate motion vector for the CP0; if the neighboring block B2 is not available and the neighboring block B3 is available, the motion vector of the neighboring block B3, as the candidate motion vector for the CP0; and if none of the neighboring blocks B2 and B3 is available and the neighboring block A2 is available, the motion vector of the neighboring block A2, as the candidate motion vector for the CP0.

Further, for example, the encoding apparatus/decoding apparatus may check neighboring blocks in a second group along a second sequence whether it is available, and a motion vector of the neighboring block which has been first confirmed to be available during the checking process may be derived as a candidate motion vector for the CP0. That is, the candidate motion vector for the CP0 may be a motion vector of the neighboring block which has been first confirmed to be available while checking neighboring blocks in the second group along the second sequence. The availability may represent that the neighboring block exists, and that the neighboring block has been coded in inter prediction.

That is, the available neighboring block may be a block which has been coded in inter prediction (that is, to which the inter prediction has been applied). Here, the second group may include the neighboring block B1 and the neighboring block B0. The neighboring block B1 may be represented as a neighboring block D of FIG. 13; and the neighboring block B0, as a neighboring block E of FIG. 13.

The second sequence may be a sequence in the second group from the neighboring block B1 to the neighboring block B0. As one example, if the neighboring block B1 is available, the motion vector of the neighboring block B1 may be derived as the candidate motion vector for the CP0; and if the neighboring block B1 is not available and the neighboring block B0 is available, the motion vector of the neighboring block B0, as the candidate motion vector for the CP0.

Further, for example, the encoding apparatus/decoding apparatus may check neighboring blocks in a third group along a third sequence whether it is available, and a motion vector of the neighboring block which has been first confirmed to be available during the checking process may be derived as a candidate motion vector for the CP1. That is, the candidate motion vector for the CP1 may be a motion vector of the neighboring block which has been first confirmed to be available while checking neighboring blocks in the third group along the third sequence. The availability may represent that the neighboring block exists, and that the neighboring block has been coded in inter prediction.

That is, the available neighboring block may be a block which has been coded in inter prediction (that is, to which the inter prediction has been applied). Here, the third group may include the neighboring block A1 and the neighboring block A0. The neighboring block A1 may be represented as a neighboring block F of FIG. 13; and the neighboring block A0, as a neighboring block G of FIG. 13.

The third sequence may be a sequence in the third group from the neighboring block A1 to the neighboring block A0. As one example, if the neighboring block A1 is available, the motion vector of the neighboring block A1 may be derived as the candidate motion vector for the CP1; and if the neighboring block A1 is not available and the neighboring block A0 is available, the motion vector of the neighboring block A0, as the candidate motion vector for the CP1.

Further, the encoding apparatus/decoding apparatus may check whether the motion vector of the CP3 which may represent the bottom-right position of the current block is available, and, if the corresponding vector is available, derive the motion vector of the CP3 as a candidate motion vector for the CP3. The CP3 may be derived based on the motion vector of the temporal neighboring block (or temporal motion vector predictor (TMVP)) as described above.

Subsequently, the encoding apparatus/decoding apparatus may determine a CPMV pattern based on available CPMV combination. The available CPMV combination may represent combination of candidate motion vectors whose reference pictures are the same.

For example, if the reference pictures of CPMV0, CPMV1 and CPMV2 are the same, the available CPMV combination may be represented as {CPMV0, CPMV1, CPMV2}, while, if the reference pictures of CPMV0 and CPMV1 are the same and different from the reference picture of CPMV2, the available CPMV combination may be represented as {CPMV0, CPMV1}. The CPMV pattern according to the CPMV combination may be represented as in Table 29. As represented in Table 29, integer value, such as "0", "1", "2", "3", "4", ~"11", may be assigned according to the CPMV pattern of the available CPMV combination.

The fact that the reference pictures are the same means that the reference picture indexes are the same.

Further, for example, if a reference picture for the candidate motion vector of the CP0, and reference pictures for the candidate motion vector of the CP1 and the candidate motion vector of the CP2 are the same, and the candidate motion vector of the CP3 is not available or a reference picture for the candidate motion vector of the CP3 is different, the available CPMV combination may be represented as {CPMV0, CPMV1, CPMV2}, {CPMV0, CPMV1}, {CPMV0, CPMV2} and {CPMV1, CPMV2}. That is, the CPMV pattern for the available CPMV combination {CPMV0, CPMV1, CPMV2} may be derived as CPMV pattern 2.

Further, for example, if a reference picture for the candidate motion vector of the CP0, a reference picture for the candidate motion vector of the CP1 and a reference picture for the candidate motion vector of the CP3 are the same, and the candidate motion vector of the CP2 is not available or a reference picture for the candidate motion vector of the CP2 is different, the available CPMV combination may be represented as {CPMV0, CPMV1, CPMV3}, {CPMV0, CPMV1}, {CPMV0, CPMV3} and {CPMV1, CPMV3}. That is, the CPMV pattern for the available CPMV combination {CPMV0, CPMV1, CPMV3} may be derived as CPMV pattern 3.

TABLE 29

| CPMV pattern | Available CPMV combination | Available constructed candidate |
|---|---|---|
| 0 | N/A | N/A |
| 1 | {CPMV0, CPMV1, CPMV2, CPMV3} | Affine{CPMV0, CPMV1, CPMV2} |
|   |   | Affine{CPMV0, CPMV1, CPMV3} |
|   |   | Affine{CPMV0, CPMV2, CPMV3} |
|   |   | Affine{CPMV1, CPMV2, CPMV3} |
| 2 | {CPMV0, CPMV1, CPMV2} | Affine{CPMV0, CPMV1, CPMV2} |
|   |   | Affine{CPMV0, CPMV1} |
|   |   | Affine{CPMV0, CPMV2} |
|   |   | Affine{CPMV1, CPMV2} |
| 3 | {CPMV0, CPMV1, CPMV3} | Affine{CPMV0, CPMV1, CPMV3} |
|   |   | Affine{CPMV0, CPMV1} |
|   |   | Affine{CPMV0, CPMV3} |
|   |   | Affine{CPMV1, CPMV3} |
| 4 | {CPMV0, CPMV1, CPMV3} | Affine{CPMV0, CPMV2, CPMV3} |
|   |   | Affine{CPMV0, CPMV2} |
|   |   | Affine{CPMV0, CPMV3} |
|   |   | Affine{CPMV2, CPMV3} |
| 5 | {CPMV1, CPMV2, CPMV3} | Affine{CPMV1, CPMV2, CPMV3} |
|   |   | Affine{CPMV1, CPMV2} |
|   |   | Affine{CPMV1, CPMV3} |
|   |   | Affine{CPMV2, CPMV3} |
| 6 | {CPMV0, CPMV1} | Affine{CPMV0, CPMV1} |
| 7 | {CPMV0, CPMV2} | Affine{CPMV0, CPMV2} |
| 8 | {CPMV1, CPMV2} | Affine{CPMV1, CPMV2} |
| 9 | {CPMV0, CPMV3} | Affine{CPMV0, CPMV3} |
| 10 | {CPMV1, CPMV3} | Affine{CPMV1, CPMV3} |
| 11 | {CPMV2, CPMV3} | Affine{CPMV2, CPMV3} |

Referring particularly to Table 29, if a reference picture for the candidate motion vector of the CP0, a reference picture for the candidate motion vector of the CP1, a reference picture for the candidate motion vector of the CP2 and a reference picture for the candidate motion vector of the CP3 are the same, the available CPMV combination may be represented as {CPMV0, CPMV1, CPMV2}, {CPMV0, CPMV1, CPMV3}, {CPMV0, CPMV2, CPMV3} and {CPMV1, CPMV2, CPMV3}. That is, the CPMV pattern for the available CPMV combination {CPMV0, CPMV1, CPMV2, CPMV3} may be derived as CPMV pattern 1.

Further, for example, if a reference picture for the candidate motion vector of the CP0, a reference picture for the candidate motion vector of the CP2 and a reference picture for the candidate motion vector of the CP3 are the same, and the candidate motion vector of the CP1 is not available or a reference picture for the candidate motion vector of the CP1 is different, the available CPMV combination may be represented as {CPMV0, CPMV2, CPMV3}, {CPMV0, CPMV2}, {CPMV0, CPMV3} and {CPMV2, CPMV3}. That is, the CPMV pattern for the available CPMV combination {CPMV0, CPMV2, CPMV3} may be derived as CPMV pattern 4.

Further, for example, if a reference picture for the candidate motion vector of the CP1, a reference picture for the candidate motion vector of the CP2 and a reference picture for the candidate motion vector of the CP3 are the same, and the candidate motion vector of the CP0 is not available or a reference picture for the candidate motion vector of the CP0 is different, the available CPMV combination may be represented as {CPMV1, CPMV2, CPMV3}, {CPMV1, CPMV2}, {CPMV1, CPMV3} and {CPMV2, CPMV3}. That is, the CPMV pattern for the available CPMV combination {CPMV1, CPMV2, CPMV3} may be derived as CPMV pattern 5.

Further, for example, if a reference picture for the candidate motion vector of the CP0 and a reference picture for the candidate motion vector of the CP1 are the same, the available CPMV combination may be represented as {CPMV0, CPMV1}. The CPMV pattern for the available CPMV combination {CPMV0, CPMV1} may be derived as CPMV pattern 6.

Further, for example, if a reference picture for the candidate motion vector of the CP0 and a reference picture for the candidate motion vector of the CP2 are the same, the available CPMV combination may be represented as {CPMV0, CPMV2}. A CPMV pattern for the available CPMV combination {CPMV0, CPMV2} may be derived as CPMV pattern 7.

Further, for example, if a reference picture for the candidate motion vector of the CP1 and a reference picture for the candidate motion vector of the CP2 are the same, the available CPMV combination may be represented as {CPMV1, CPMV2}. The CPMV pattern for the available CPMV combination {CPMV1, CPMV2} may be derived as CPMV pattern 8.

Further, for example, if a reference picture for the candidate motion vector of the CP0 and a reference picture for the candidate motion vector of the CP3 are the same, the available CPMV combination may be represented as {CPMV0, CPMV3}. The CPMV pattern for the available CPMV combination {CPMV0, CPMV3} may be derived as CPMV pattern 9.

Further, for example, if a reference picture for the candidate motion vector of the CP1 and a reference picture for the candidate motion vector of the CP3 are the same, the available CPMV combination may be represented as {CPMV1, CPMV3}. The CPMV pattern for the available CPMV combination {CPMV1, CPMV3} may be derived as CPMV pattern 10.

Further, for example, if a reference picture for the candidate motion vector of the CP2 and a reference picture for the candidate motion vector of the CP3 are the same, the available CPMV combination may be represented as {CPMV2, CPMV3}. The CPMV pattern for the available CPMV combination {CPMV2, CPMV3} may be derived as CPMV pattern 11.

Meanwhile, if a reference picture for the candidate motion vector of the CP0, a reference picture for the candidate motion vector of the CP1, a reference picture for the candidate motion vector of the CP2 and a reference picture for the candidate motion vector of the CP3 are different from one another, the CPMV pattern may be derived as CPMV pattern 0.

After this, the encoding apparatus/decoding apparatus may derive the constructed candidate based on the derived CPMV pattern.

For example, if the CPMV pattern 0 is derived, the constructed candidate may not be derived.

Further, for example, if the CPMV pattern 1 is derived as in Table 29, constructed candidates including {CPMV0, CPMV1, CPMV2}, {CPMV0, CPMV1, CPMV3}, {CPMV0, CPMV2, CPMV3}, {CPMV1, CPMV2, CPMV3} may be addadded in this order into the merge candidate list of the current block until the number of the candidates of the merge candidate list reaches the maximum number.

When {CPMV0, CPMV1, CPMV2}, {CPMV0, CPMV1, CPMV3}, {CPMV0, CPMV2, CPMV3}, {CPMV1, CPMV2, CPMV3} are addadded as constructed candidates, it may be determined whether the reference pictures for the available CPMV combination are the same. For example, when {CPMV0, CPMV1, CPMV2} is addadded as the constructed candidate, it may be determined whether all the reference pictures for CPMV0, CPMV1 and CPMV2 are the same. If the determination result indicates that all the reference pictures for CPMV0, CPMV1 and CPMVP2 are the same, {CPMV0, CPMV1, CPMV2} may be addadded as the constructed candidate.

Further, when {CPMV0, CPMV1, CPMV3} is addadded as the constructed candidate, it may be determined whether all the reference pictures for CPMV0, CPMV1 and CPMV3 are the same. If the determination result indicates that all the reference pictures for CPMV0, CPMV1 and CPMVP3 are the same, {CPMV0, CPMV1, CPMV3} may be addadded as the constructed candidate.

Further, for example, if the CPMV pattern 2 is derived, a constructed candidate including {CPMV0, CPMV1, CPMV2}, a constructed candidate including {CPMV0, CPMV1}, a constructed candidate including {CPMV0, CPMV2}, and a constructed candidate including {CPMV1, CPMV2} may be addadded in this order into the merge candidate list of the current block until the number of the candidates of the merge candidate list reaches the maximum number.

Further, for example, if the CPMV pattern 3 is derived, a constructed candidate including {CPMV0, CPMV1, CPMV3}, a constructed candidate including {CPMV0, CPMV1}, a constructed candidate including {CPMV0, CPMV3}, and a constructed candidate including {CPMV1, CPMV3} may be added in this order into the merge candidate list of the current block until the number of the candidates of the merge candidate list reaches the maximum number.

Further, for example, if the CPMV pattern 4 is derived, a constructed candidate including {CPMV0, CPMV2, CPMV3}, a constructed candidate including {CPMV0, CPMV2}, a constructed candidate including {CPMV0, CPMV3}, and a constructed candidate including {CPMV2, CPMV3} may be added in this order into the merge candidate list of the current block until the number of the candidates of the merge candidate list reaches the maximum number.

Further, for example, if the CPMV pattern 5 is derived, a constructed candidate including {CPMV1, CPMV2, CPMV3}, a constructed candidate including {CPMV1, CPMV2}, a constructed candidate including {CPMV1, CPMV3}, and a constructed candidate including {CPMV2, CPMV3} may be added in this order into the merge candidate list of the current block until the number of the candidates of the merge candidate list reaches the maximum number.

Further, for example, if the CPMV pattern 6 is derived, the constructed candidate including {CPMV0, CPMV1} may be added into the merge candidate list.

When {CPMV0, CPMV1} is added as the constructed candidate, it may be determined whether all the reference pictures for the available CPMV combination are the same. That is, when {CPMV0, CPMV1} is added as the constructed candidate, it may be determined whether all the reference pictures for CPMV0 and CPMV1 are the same. If the determination result indicates that the reference pictures for CPMV0 and CPMVP1 are the same, {CPMV0, CPMV1} may be added as the constructed candidate.

Further, for example, if the CPMV pattern 7 is derived, the constructed candidate including {CPMV0, CPMV2} may be added into the merge candidate list.

When {CPMV0, CPMV2} is added as the constructed candidate, it may be determined whether all the reference pictures for the available CPMV combination are the same. That is, when {CPMV0, CPMV2} is added as the constructed candidate, it may be determined whether all the reference pictures for CPMV0 and CPMV1 are the same. If the determination result indicates that the reference pictures for CPMV0 and CPMVP2 are the same, {CPMV0, CPMV2} may be added as the constructed candidate.

Further, for example, if the CPMV pattern 8 is derived, the constructed candidate including {CPMV1, CPMV2} may be added into the merge candidate list.

Further, for example, if the CPMV pattern 9 is derived, the constructed candidate including {CPMV0, CPMV3} may be added into the merge candidate list.

Further, for example, if the CPMV pattern 10 is derived, the constructed candidate including {CPMV0, CPMV3} may be added into the merge candidate list.

Further, for example, if the CPMV pattern 11 is derived, the constructed candidate including {CPMV2, CPMV3} may be added into the merge candidate list.

When the complexity analysis is performed according to the method of Table 29, it is as in Tables 30 to 36.

TABLE 30

| Description | Number | Detailed |
|---|---|---|
| Parameter number of motion model | 4 or 6 | 4 (constructed) 6 (inherited or constructed) |
| Length of candidate list | 5 | |
| Max number of inherited candidate | 5 | SAME TO THE NUMBER OF REFERENCE . BLOCKS |
| Max nuumber of constructed candidate | ~~10~~ | 6 (~~4 parameter~~) + 4 (6 parameter); |

As in Table 30, the maximum number of the constructed candidates is four.

TABLE 31

| Process | Number of process | Detailed description |
|---|---|---|
| constructed candidate generation | 4 ~~10~~ | CPMV pattern = 4 |
| Pruning process | 16 ~~40~~ | 16 ~~40~~ = 4 * ~~440~~ |
| Scaling process | 2 ~~22~~ | SEE TABLE 32 |

TABLE 32

| Process | Candidates | Number of scaling | Description |
|---|---|---|---|
| CP3 | T | 2 = 1 * 2 | 1: SCALING FOR TMVP 2: PERFORMING FOR LIST0 AND LIST1. |

Table 31 represents the number of processes for the constructed candidate, and Table 32 represents the detailed scaling process for the constructed candidate.

As in Table 32, the process of obtaining the motion vector candidate for CP3 may be accompanied by two scaling process, that is, a scaling process for TMVP and a scaling process for list 0 and list 1.

TABLE 33

| Process | Add | Shift | Comp. | Abs | Div. | Mult. |
|---|---|---|---|---|---|---|
| Inherited candidate | 16 | 16 | 0 | 0 | 0 | 0 |
| Constructed candidate | | | SEE TABLE 34 | | | |
| Pruning process | 0 | 0 | 15 | 0 | 0 | 0 |
| Scaling process | 8 | 4 | 11 | 1 | 1 | 3 |

TABLE 34

| Constructed candidate | Process | Add | Shift | Comp. |
|---|---|---|---|---|
| Affine {CP0, CP2, CP3} | Derive CP1 | 4 | 0 | 0 |
| Affine {CP0, CP2} | Derive CP1 | 4 | 4 | 0 |
| | Round (CP1) | 5 | 3 | 4 |
| Affine {CP0, CP2} | Derive CP1 | 10 | 12 | 0 |
| | Round (CP1) | 5 | 3 | 4 |
| Affine {CP2, CP3} | Derive CP0 | 4 | 4 | 4 |
| | Derive CP1 | 4 | 4 | 0 |
| | Round (CP0) | 5 | 3 | 4 |
| | Round (CP1) | 5 | 3 | 4 |

Table 33 represents the pruning check process and the scaling process which accompany the generation of the inherited candidate, and Table 34 represents the numbers of various operation processes which accompany the generation of the constructed candidate.

TABLE 35

| Process: | Comp. | Detailed |
|---|---|---|
| Pruning process | 15 | 12 (3 CPMVs) + 2 (reference index for list 0 and list1 + 1 (affine_type) |

Table 35 represents the number of comparison operations which accompany the comparison of two merge candidate. That is, when two merge candidates are compared with each other, twelve times of redundancy check, two times of comparison operation for the identity between an L0 reference picture and an L1 reference picture and one time of comparison operation for an affine type may be performed in the pruning check process.

TABLE 36

| | Process | Add | Shift | Comp. | Abs | Div. | Mult. |
|---|---|---|---|---|---|---|---|
| Inherited | Candidate generation | 160 | 160 | 0 | 0 | 0 | 0 |
| | Pruning process | 0 | 0 | 150 | 0 | 0 | 0 |
| | Scaling process | 0 | 0 | 0 | 0 | 0 | 0 |
| Constructed | Canidate generation (TABLE 6) | 46 ~~73~~ | 36 ~~55~~ | 16 ~~20~~ | 0 | 0 | 0 |
| | Pruning process | 0 | 0 | 240 ~~600~~ | 0 | 0 | 0 |
| | Scaling process | 16 | 8 | 22 | 2 | 2 | 6 |
| All | All | 222 | 204 | 428 | 2 | 2 | 6 |

Table 36 represents the number of times of process for a merge candidate generation, and when the complexity for constructed candidate thereof is compared with that of Table 6, addition operation is decreased from 73 to 46 times; the number of shift operations, from 55 to 36 times; and comparison operation of the pruning check process, from 600 to 240 times. It may be understood that with this decrease in the complexity for a constructed candidate, total operation complexity is drastically decreased as in Table 36.

Meanwhile, there may be proposed an embodiment which has decrease in the CPMV pattern or the number of available constructed candidates according to the CPMV pattern from the embodiment deriving the constructed candidate as in FIG. 11.

As one example, there may be proposed a method in which a combination including CPMV0 and CPMV2 or a combination including CPMV1 and CPMV2 is not considered.

That is, the encoding apparatus/decoding apparatus may determine a CPMV pattern based on an available CPMV combination, wherein the CPMV pattern may not include the CPMV pattern 3 of Table 15 or the CPMV pattern 4 of Table 15. For example, the available constructed candidate may not include the constructed candidate including {CPMV0, CPMV2}. Further, the available constructed candidate may not include a constructed candidate including {CPMV1, CPMV2}.

That is, according to the present embodiment, when the available CPMV combination is generated, a candidate may be added into the candidate list by determining whether reference picture indexes of the current block and a constructed candidate are identical to each other, and specific CPMV combination may be excluded. For example, the available constructed candidate may not include the constructed candidate including {CPMV0, CPMV2}. Further, the available constructed candidate may not include a constructed candidate including {CPMV1, CPMV2}.

Meanwhile, according to an example of the present document, there may be proposed a method in which a planar motion vector prediction is considered for a predetermined CVMP pattern.

Figure 14:
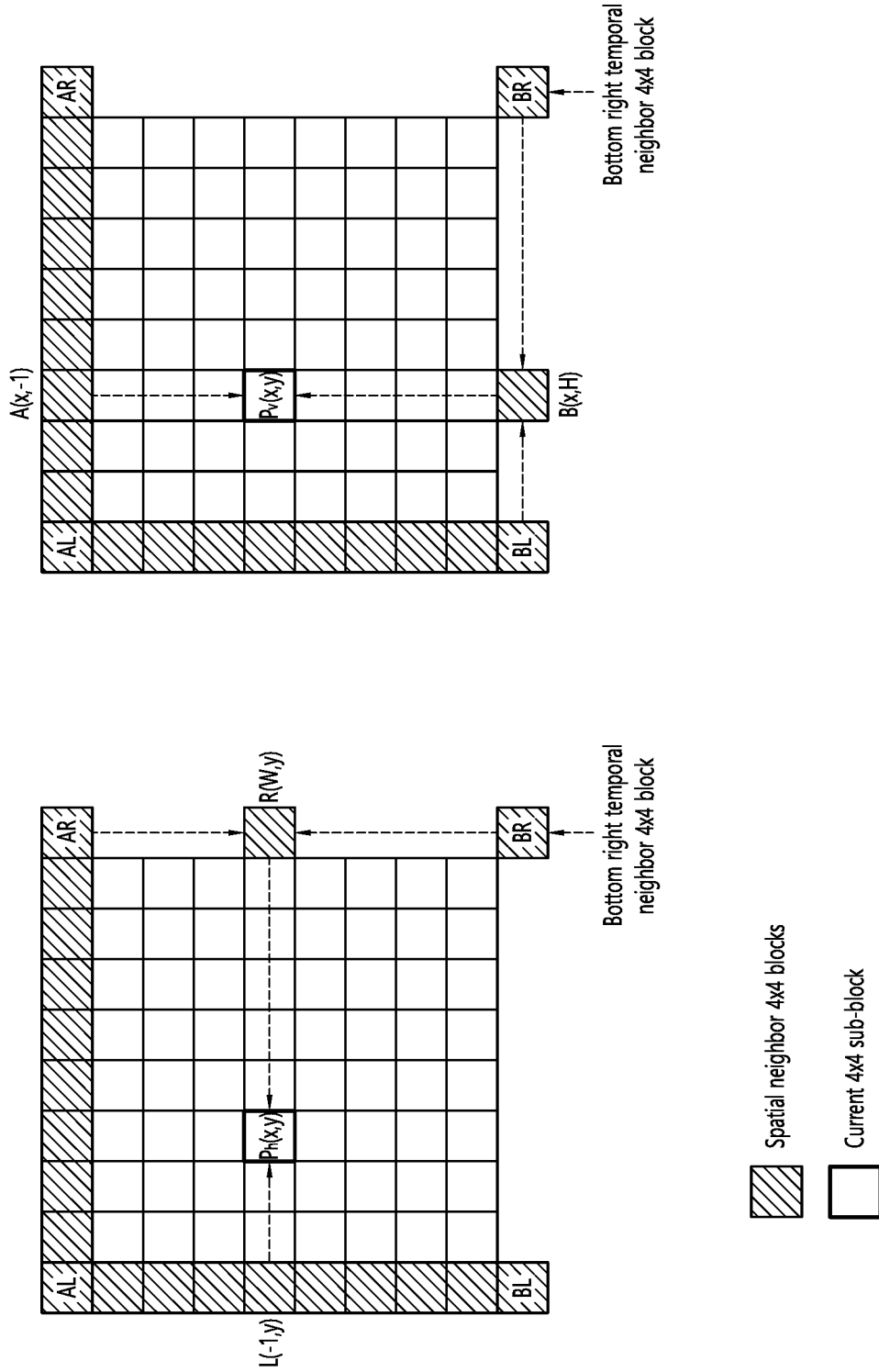
FIG. 14 is a diagram showing planar motion vector prediction according to an embodiment of the present document.

FIG. 14 is a diagram showing planar motion vector prediction according to an embodiment of the present document.

FIG. 14 is a schematic diagram for the planar motion vector prediction, and as shown, the planar motion vector prediction may be acquired by averaging a horizontal and vertical linear interpolation on a 4×4 block.

The motion vector prediction for the current block (Current 4×4 sub-block) is as Equation 8:

$$P(x,y)=(H \times P_h(x,y)+W \times P_v(x,y)+H \times W)/(2 \times H \times W) \quad \text{[Equation 8]}$$

In Equation 8, H and W mean a height and a width of a coding block (16×16) including the current block. As shown, Ph(x,y) may be derived by the linear interpolation according to a relative distance between L(−1, y) and R(W, y) for the horizontal direction of the current block, and Pw(x, y) may be derived by the linear interpolation according to a relative distance between A(x, −1) and B(x, H) for the vertical direction of the current block.

Meanwhile, the planar motion vector prediction according to the present embodiment may be applied to the constructed candidate generation described with reference to FIG. 13, and, if the CPMV pattern is 1, that is, if reference pictures for CP0 to CP3 are all the same, may be applied.

If the CPMV pattern is 1, when the planar motion vector prediction is applied, Table 29 may be changed into Table 37.

TABLE 37

| CPMV pattern | Available CPMV combination | Available constructed candidate |
|---|---|---|
| 0 | N/A | N/A |
| 1 | {CPMV0, CPMV1, CPMV2, CPMV3} | Planar {CPMV0, CPMV1, CPMV2, CPMV3} |
| | | Affine{CPMV0, CPMV1, CPMV2} |
| | | Affine{CPMV0, CPMV1, CPMV3} |
| | | Affine{CPMV0, CPMV2, CPMV3} |
| | | Affine{CPMV1, CPMV2, CPMV3} |
| 2 | {CPMV0, CPMV1, CPMV2} | Affine{CPMV0, CPMV1, CPMV2} |
| | | Affine{CPMV0, CPMV1} |
| | | Affine{CPMV0, CPMV2} |
| | | Affine{CPMV1, CPMV2} |
| 3 | {CPMV0, CPMV1, CPMV3} | Affine{CPMV0, CPMV1, CPMV3} |
| | | Affine{CPMV0, CPMV1} |
| | | Affine{CPMV0, CPMV3} |
| | | Affine{CPMV1, CPMV3} |
| 4 | {CPMV0, CPMV2, CPMV3} | Affine{CPMV0, CPMV2, CPMV3} |
| | | Affine{CPMV0, CPMV2} |
| | | Affine{CPMV0, CPMV3} |
| | | Affine{CPMV2, CPMV3} |
| 5 | {CPMV1, CPMV2, CPMV3} | Affine{CPMV1, CPMV2, CPMV3} |
| | | Affine{CPMV1, CPMV2} |
| | | Affine{CPMV1, CPMV3} |
| | | Affine{CPMV2, CPMV3} |
| 6 | {CPMV0, CPMV1} | Affine{CPMV0, CPMV1} |
| 7 | {CPMV0, CPMV2} | Affine{CPMV0, CPMV2} |
| 8 | {CPMV1, CPMV2} | Affine{CPMV1, CPMV2} |
| 9 | {CPMV0, CPMV3} | Affine{CPMV0, CPMV3} |
| 10 | {CPMV1, CPMV3} | Affine{CPMV1, CPMV3} |
| 11 | {CPMV2, CPMV3} | Affine{CPMV2, CPMV3} |

As in the table above, if the CPMV pattern is 1, constructed candidates including {CPMV0, CPMV1, CPMV2, CPMV3}, {CPMV0, CPMV1, CPMV2}, {CPMV0, CPMV1, CPMV3}, {CPMV0, CPMV2, CPMV3} and {CPMV1, CPMV2, CPMV3} may be added in this order into the merge candidate list of the current block until the number of the candidates of the merge candidate list reaches the maximum number.

Meanwhile, according to another example, the constructed candidate according to Table 37 may be changed like Table 38, considering coding complexity and performance

TABLE 38

| CPMV pattern | Available CPMV combination | Available constructed candidate |
|---|---|---|
| 0 | N/A | N/A |
| 1 | {CPMV0, CPMV1, CPMV2, CPMV3} | Planar {CPMV0, CPMV1, CPMV2, CPMV3} |
| 2 | {CPMV0, CPMV1, CPMV2} | Affine{CPMV0, CPMV1, CPMV2} |
|   |   | Affine{CPMV0, CPMV1} |
|   |   | Affine{CPMV0, CPMV2} |
|   |   | Affine{CPMV1, CPMV2} |
| 3 | {CPMV0, CPMV1, CPMV3} | Affine{CPMV0, CPMV1, CPMV3} |
|   |   | Affine{CPMV0, CPMV1} |
|   |   | Affine{CPMV0, CPMV3} |
|   |   | Affine{CPMV1, CPMV3} |
| 4 | {CPMV0, CPMV2, CPMV3} | Affine{CPMV0, CPMV2, CPMV3} |
|   |   | Affine{CPMV0, CPMV2} |
|   |   | Affine{CPMV0, CPMV3} |
|   |   | Affine{CPMV2, CPMV3} |
| 5 | {CPMV1, CPMV2, CPMV3} | Affine{CPMV1, CPMV2, CPMV3} |
|   |   | Affine{CPMV1, CPMV2} |
|   |   | Affine{CPMV1, CPMV3} |
|   |   | Affine{CPMV2, CPMV3} |
| 6 | {CPMV0, CPMV1} | Affine{CPMV0, CPMV1} |
| 7 | {CPMV0, CPMV1} | Affine{CPMV0, CPMV2} |
| 8 | {CPMV1, CPMV2} | Affine{CPMV1, CPMV2} |
| 9 | {CPMV0, CPMV3} | Affine{CPMV0, CPMV3} |
| 10 | {CPMV1, CPMV3} | Affine{CPMV1, CPMV3} |
| 11 | {CPMV2, CPMV3} | Affine{CPMV2, CPMV3} |

As in the table above, if the CPMV pattern is 1, planar {CPMV0, CPMV1, CPMV2, CPMV3} may be added into the merge candidate list of the current block.

Meanwhile, when the merge candidate list is generated according to another embodiment of the present document, there may be proposed a method in which the pruning check process is not performed between the inherited candidate and the constructed candidate.

Generally, if the neighboring block is the affine block, the inherited candidate takes place, while the constructed candidate supposes a case where the neighboring block is not the affine block. Therefore, the characteristics of the two candidates are different from each other, and thus it is possible to be supposed as another candidate without performing the pruning check process.

This method may be used concurrently with or independent from the previously proposed method of determining the inherited candidate or the constructed candidate.

Figure 15:
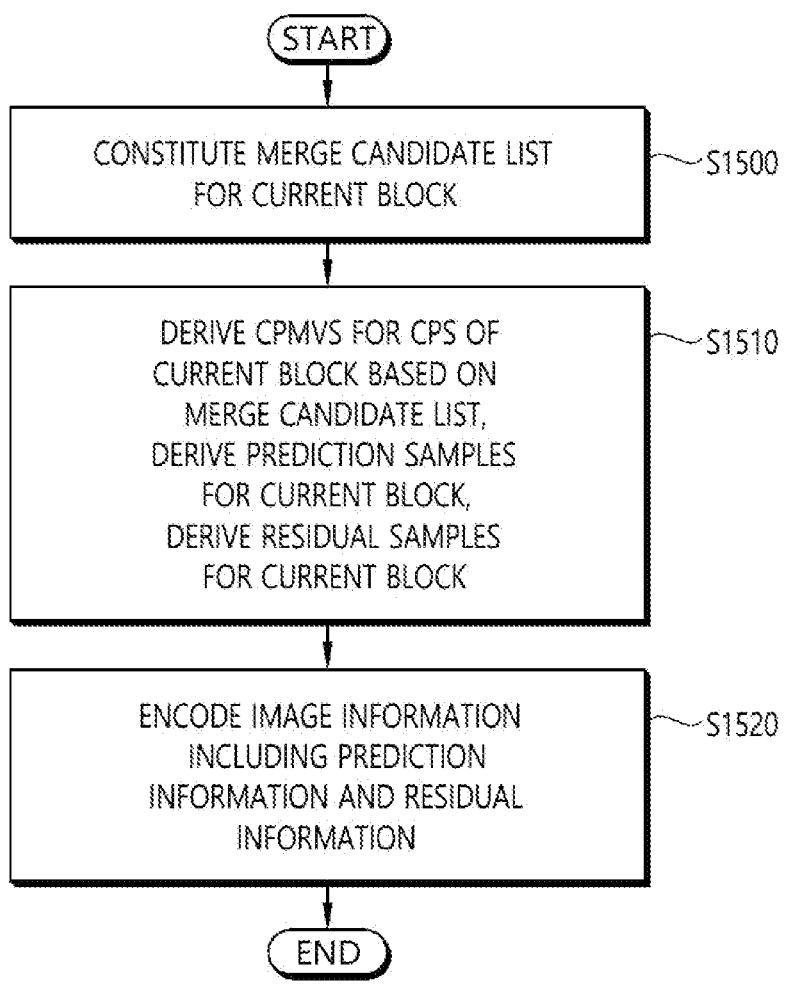
FIG. 15 schematically represents an image encoding method by an encoding apparatus according to the present document.

FIG. 15 schematically represents an image encoding method by an encoding apparatus according to the document. The method disclosed in FIG. 15 may be performed by the encoding apparatus disclosed in FIG. 1. Specifically, S1500 to S1510 in FIG. 15 may be performed by the predictor of the encoding apparatus; and S1520, by the entropy encoder of the encoding apparatus. Further, although not shown, the process of deriving prediction samples for the current block based on the CPMVs may be performed by the predictor of the encoding apparatus; the process of deriving the residual sample for the current block based on the prediction sample and the original sample for the current block, by the subtractor of the encoding apparatus; the process of generating information on residual for the current block based on the residual sample, by the transformer of the encoding apparatus; and the process of encoding the information on residual, by the entropy encoder of the encoding apparatus.

The encoding apparatus constitutes the merge candidate list for the current block (S1500).

The encoding apparatus may constitute the merge candidate list including candidates for the current block. The candidates may include inherited candidates (inherited affine candidates) and constructed candidates.

As an example, the inherited candidates may be derived based on the neighboring blocks of the current block, and the maximum number of the inherited candidates may be two. For example, the inherited candidates may include a first inherited candidate and a second inherited candidate.

Specifically, the first inherited candidate may be derived based on a left block group including the bottom-left corner neighboring block (bottom-left corner neighboring block) and the left neighboring block (left neighboring block) of the current block. For example, the neighboring blocks in the left block group may be checked in a first sequence, and the first inherited candidate, which is an affine motion model that has been first checked, may be derived based on the coded neighboring block. Here, the first sequence may be a sequence from the bottom-left corner neighboring block to the left neighboring block.

Further, the second inherited candidate may be derived based on a top block group including the top-right corner neighboring block (top-right neighboring block), the top neighboring block (top neighboring block), and the top-left corner neighboring block (top-left corner neighboring block) of the current block. For example, the neighboring blocks in the top block group may be checked in a second sequence, and the second inherited candidate may be derived based on the neighboring block that has been coded with an affine motion model which has been first checked. Here, the second sequence may be a sequence from the top-right corner neighboring block to the top neighboring block, and then to the top-left corner neighboring block.

Meanwhile, if a size is W×H, and x component of the top-left sample position of the current block is 0 and y component thereof is 0, the bottom-left corner neighboring block may be a block including a sample at coordinates (−1, H); the left neighboring block, a block including a sample at coordinates (−1, H−1); the top-right corner neighboring block, a block including a sample at coordinates (W, −1); the top neighboring block, a block including a sample at coordinates (W−1, −1); and the top-left corner neighboring block, a block including a sample at coordinates (−1, −1). That is, the left neighboring block may be a left neighboring block among the left neighboring blocks of the current block, which is located at a lowermost side; and the top neighboring block, a top neighboring block among the top neighboring blocks of the current block, which is located at a leftmost side.

Further, as an example, the inherited candidates may be derived based on the neighboring blocks of the current block, and the maximum number of the inherited candidates may be one.

Specifically, for example, the neighboring blocks may be checked in a certain sequence, and the second inherited candidate may be derived based on the neighboring block that has been coded with an affine motion model which has been first checked. Here, the neighboring blocks may include a left neighboring block, a top neighboring block, a bottom-left corner neighboring block, a top-right corner neighboring block and a top-left corner neighboring block of the current block. Further, the certain sequence may be a sequence from the left neighboring block to the top neighboring block to the bottom-left corner neighboring block to the top-right corner neighboring block and then to the top-left corner neighboring block.

Meanwhile, if a size is W×H, and x component of the top-left sample position of the current block is 0 and y component thereof is 0, the bottom-left corner neighboring block may be a block including a sample at coordinates (−1, H); the left neighboring block, a block including a sample at coordinates (−1, H−1); the top-right corner neighboring block, a block including a sample at coordinates (W, −1); the top neighboring block, a block including a sample at coordinates (W−1, −1); and the top-left corner neighboring block, a block including a sample at coordinates (−1, −1). That is, the left neighboring block may be a left neighboring block among the left neighboring blocks of the current block, which is located at a lowermost side; and the top neighboring block, a top neighboring block among the top neighboring blocks of the current block, which is located at a leftmost side.

Alternatively, as an example, the inherited candidates may be derived based on the neighboring blocks of the current block, and the reference picture indexes of the inherited candidates may represent reference pictures different from each other. For example, the neighboring blocks may be checked in a certain sequence, and the first inherited candidate may be derived based on the first neighboring block coded with an affine motion model. After this, if the reference picture index of the second neighboring block coded with the affine motion model, which follows the first neighboring block according to the certain sequence represents the reference picture different from the reference picture index of the first neighboring block, the second inherited candidate may be derived based on the second neighboring block. If the reference picture index of the second neighboring block represents the same reference picture as the reference picture index of the first neighboring block, no inherited candidate may be derived based on the second neighboring block.

Further, as an example, the constructed candidates may be derived based on the neighboring blocks of the current block.

For example, the candidate motion vectors for the control points (CP) of the current block based on the neighboring blocks may be derived. Here, the CPs may include CP0, CP1, CP2 and CP3. The CP0 may represent a top-left position of the current block; the CP1, a top-right position of the current block; the CP2, a bottom-left position of the current block; and the CP3, a bottom-right position of the current block.

Further, the neighboring blocks may include a neighboring block A, a neighboring block B, a neighboring block C, a neighboring block D, a neighboring block E, a neighboring block F, a neighboring block G, and a neighboring block T. If a size is W×H, and x component of the top-left sample position of the current block is 0 and y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block D, a block including a sample at coordinates (W−1, −1); the neighboring block E, a block including a sample at coordinates (W, −1); the neighboring block F, a block including a sample at coordinates (−1, H−1); and the neighboring block G, a block including a sample at coordinates (−1, H). That is, the neighboring block A may be the topmost corner neighboring block of the current block; the neighboring block B, the top neighboring block among the top neighboring blocks of the current block, which is located at the leftmost side; the neighboring block C, the left neighboring block among the left neighboring blocks of the current block, which is located at the uppermost side; the neighboring block D, the top neighboring block among the top neighboring blocks of the current block, which is located at the rightmost side; the neighboring block E, the top-right corner neighboring block of the current block; the neighboring block F, the left neighboring block among the left neighboring blocks of the current block, which is located at the lowermost side; and the neighboring block G, the bottom-left corner neighboring block of the current block. The neighboring block T may be the bottom-right corner neighboring block of the current block.

Specifically, for example, neighboring blocks in a first group may be checked in a first sequence whether it is available, and a motion vector of the first neighboring block which has been first confirmed to be available may be derived as a candidate motion vector for the CP0. That is, the candidate motion vector for the CP0 may be derived based on a motion vector of the first neighboring block which has been first confirmed to be available while checking the neighboring blocks in the first group in the first sequence whether it is available. The availability may represent that the neighboring block has been coded in inter prediction. That is, the available neighboring block may be a block to which the inter prediction has been applied. Here, for example, the first group may include the neighboring block A, the neighboring block B and the neighboring block C. The first sequence may be a sequence in the first group from the neighboring block A to the neighboring block B, and then to the neighboring block C. As one example, if the neighboring block A is available, the motion vector of the neighboring block A may be derived as the candidate motion vector for the CP0; if the neighboring block A is not available and the neighboring block B is available, the motion vector of the neighboring block B, as the candidate motion vector for the CP0; and if none of the neighboring blocks A and B is available and the neighboring block C is available, the motion vector of the neighboring block C, as the candidate motion vector for the CP0.

Further, for example, neighboring blocks in a second group may be checked in a second sequence whether it is available, and a motion vector of the second neighboring block which has been first confirmed to be available may be derived as a candidate motion vector for the CP0. That is, the candidate motion vector for the CP0 may be derived based on a motion vector of the second neighboring block which has been first confirmed to be available while checking the neighboring blocks in the second group in the second sequence whether it is available. The availability may represent that the neighboring block has been coded in inter prediction. That is, the available neighboring block may be a block to which the inter prediction has been applied. Here, the second group may include the neighboring block D and the neighboring block E. The second sequence may be a sequence in the second group from the neighboring block D to the neighboring block E. As one example, if the neighboring block D is available, the motion vector of the neighboring block D may be derived as the candidate motion vector for the CP0; and if the neighboring block D is not available and the neighboring block E is available, the motion vector of the neighboring block E, as the candidate motion vector for the CP0.

Further, for example, neighboring blocks in a third group may be checked in a third sequence whether it is available, and a motion vector of the third neighboring block which has been first confirmed to be available may be derived as a candidate motion vector for the CP1. That is, the candidate motion vector for the CP1 may be derived based on a motion vector of the third neighboring block which has been first confirmed to be available while checking the neighboring blocks in the third group in the third sequence whether it is available. The availability may represent that the neighboring block has been coded in inter prediction. That is, the available neighboring block may be a block to which the inter prediction has been applied. Here, the third group may include the neighboring block F and the neighboring block G. The third sequence may be a sequence in the third group from the neighboring block F to the neighboring block G. As one example, if the neighboring block F is available, the motion vector of the neighboring block F may be derived as the candidate motion vector for the CP1; and if the neighboring block F is not available and the neighboring block G is available, the motion vector of the neighboring block G, as the candidate motion vector for the CP1.

Further, for example, the encoding apparatus/decoding apparatus may check the temporal neighboring block (i.e., the neighboring block T) whether it is available, and if the temporal neighboring block (i.e., the neighboring block T) is available, a motion vector of the temporal neighboring block (i.e., the neighboring block T) may be derived as a candidate motion vector for the CP3.

After this, the constructed candidates may be derived based on the candidate motion vectors of the CPs.

The constructed candidates may be derived based on combination of at least two of the first neighboring block in the first group, the second neighboring block in the second group, the third neighboring block in the third group and the fourth neighboring block, and the first neighboring block, the second neighboring block, the third neighboring block and the fourth neighboring block constituting the combination have the same reference picture index. That the reference picture indexes may be the same means that the reference pictures for the corresponding neighboring blocks are the same.

For example, if the reference picture for the first neighboring block, the reference picture for the second neighboring block and the reference picture for the third neighboring block are the same, the constructed candidates may include a first constructed candidate including the candidate motion vector for the CP0, the candidate motion vector for the CP1 and the candidate motion vector for the CP2.

Alternatively, for example, if the reference picture for the first neighboring block, the reference picture for the second neighboring block and the reference picture for the third neighboring block are the same, the constructed candidates may include the first constructed candidate, and a second constructed candidate including the candidate motion vector for the CP0 and the candidate motion vector for the CP1.

Alternatively, for example, if the reference picture for the first neighboring block, the reference picture for the second neighboring block and the reference picture for the third neighboring block are the same, the constructed candidates may include the first constructed candidate, the second constructed candidate, and a third constructed candidate including the candidate motion vector for the CP0 and the candidate motion vector for the CP2.

Alternatively, for example, if the reference picture for the first neighboring block, the reference picture for the second neighboring block and the reference picture for the third neighboring block are the same, the constructed candidates may include the first constructed candidate, the second constructed candidate, the third constructed candidate, and a fourth constructed candidate including the candidate motion vector for the CP1 and the candidate motion vector for the CP2.

Further, for example, if the reference picture for the first neighboring block and the reference picture for the second neighboring block are the same, the constructed candidates may include the second constructed candidate including the candidate motion vector for the CP0 and the candidate motion vector for the CP1.

Further, for example, if the reference picture for the first neighboring block and the reference picture for the third neighboring block are the same, the constructed candidates may include the third constructed candidate including the candidate motion vector for the CP0 and the candidate motion vector for the CP2.

Further, for example, if the reference picture for the second neighboring block and the reference picture for the third neighboring block are the same, the constructed candidates may include the fourth constructed candidate including the candidate motion vector for the CP1 and the candidate motion vector for the CP2.

Meanwhile, there may be proposed a method in which a combination including CPMV0 and CPMV2 or a combination including CPMV1 and CPMV2 is not considered in the process of deriving the constructed candidate as described above.

That is, the encoding apparatus/decoding apparatus may determine a CPMV pattern based on an available CPMV combination, wherein the CPMV pattern may not include the CPMV pattern 3 of Table 15 or the CPMV pattern 4 of Table 15. For example, the available constructed candidate may not include the constructed candidate including {CPMV0, CPMV2}. Further, the available constructed candidate may not include the constructed candidate including {CPMV1, CPMV2}.

That is, according to the present embodiment, when the available CPMV combination is generated, a candidate may be added into the candidate list by determining whether reference picture indexes of the current block and a constructed candidate are identical to each other, and specific CPMV combination may be excluded. For example, the available constructed candidate may not include the constructed candidate including {CPMV0, CPMV2}. Further, the available constructed candidate may not include a constructed candidate including {CPMV1, CPMV2}.

Meanwhile, if the number of merge candidates (i.e., inherited candidates and/or constructed candidates) which have been derived through the above-described process is less than the maximum candidate number, the merge candidate list may include a zero candidate. For example, the zero candidate may include a reference picture index and candidate motion vectors whose values are 0.

Further, if the number of the inherited candidates and the constructed candidates is less than the maximum candidate number of the merge candidate list, that is, if the number of the derived merge candidates is less than the maximum candidate number, the merge candidate list may include the zero candidate. The zero candidate may include candidate motion vectors whose values for the CPs are 0, and a reference picture index whose value is 0.

Alternatively, for example, if the number of the derived merge candidates is less than the maximum candidate number, a first zero candidate, a second zero candidate, a third zero candidate . . . an $n^{th}$ zero candidate may be added in this order into the merge candidate list until the number of merge candidates of the merge candidate list reaches the maximum candidate number. For example, the first zero candidate may include candidate motion vectors whose values are 0, L0 (list 0) reference picture index and L1 (list 1) reference picture index whose values are 0; the second zero candidate, candidate motion vectors whose values are 0, L0 reference picture index whose value is 0, and L1 reference picture index whose value is 1; the third zero candidate may include candidate motion vectors whose values are 0, L0 reference picture index whose value is 1, and L1 reference picture index whose value is 0; and the fourth zero candidate may include candidate motion vectors whose values are 0, L0 reference picture index whose value is 1, and L1 reference picture index whose value is 1. Alternatively, for example, reference picture indexes of the neighboring block A, the neighboring block B, the neighboring block C, the neighboring block D, the neighboring block E, the neighboring block F, and neighboring block G may be included in the first zero candidate to the $n^{th}$ zero candidate in order of frequency (from highest to lowest). Alternatively, for example, the first zero candidate may include candidate motion vectors whose values are 0, and a reference picture index whose value is the same as that of the reference picture index of the left neighboring block of the current block; the second zero candidate, candidate motion vectors whose values are 0, and a reference picture index whose value is the same as that of the reference picture index of the top neighboring block of the current block; the third zero candidate, candidate motion vectors whose values are 0, and a reference picture index whose value is the same as that of the reference picture index of the bottom-left corner neighboring block of the current block; the fourth zero candidate, candidate motion vectors whose values are 0, and a reference picture index whose value is the same as that of the reference picture index of the top-right corner neighboring block of the current block; and the fifth zero candidate, candidate motion vectors whose values are 0, and a reference picture index whose value is the same as that of the reference picture index of the top-left corner neighboring block of the current block.

The encoding apparatus derives control point motion vectors (CPMVs) for control points (CPs) of the current block based on the merger candidate list (S1510).

The encoding apparatus may derive CPMVs for the CPs of the current block which has optimal RD cost, and may select as the merge candidate for the current block the merge candidate from among the candidates of the merge candidate list, which is most similar to the CPMVs. The encoding apparatus derives control point motion vectors (CPMVs) for control points (CPs) of the current block based on the selected merger candidate from among the merge candidates included in the merge candidate list.

Specifically, if the selected merge candidate includes the candidate motion vector for CP0 and the candidate motion vector for CP1, the candidate motion vector for CP0 of the merge candidate may be derived as CPMV of the CP0, and the candidate motion vector for CP1 of the merge candidate may be derived as CPMV of the CP1.

Further, if the selected merge candidate includes the merge motion vector for CP0 the candidate motion vector for CP1 and the candidate motion vector for CP2, the candidate motion vector for CP0 of the merge candidate may be derived as CPMV of the CP0, the candidate motion vector for CP1 of the merge candidate may be derived as CPMV of the CP1, and the candidate motion vector for CP2 of the merge candidate may be derived as CPMV of the CP2.

Further, if the selected merge candidate includes the merge motion vector for CP0 the candidate motion vector for CP1 and the candidate motion vector for CP3, the candidate motion vector for CP0 of the merge candidate may be derived as CPMV of the CP0, the candidate motion vector for CP1 of the merge candidate may be derived as CPMV of the CP1, and the candidate motion vector for CP3 of the merge candidate may be derived as CPMV of the CP3.

Further, if the selected merge candidate includes the candidate motion vector for CP1 and the candidate motion vector for CP1, the candidate motion vector for CP1 of the merge candidate may be derived as CPMV of the CP1, and the candidate motion vector for CP2 of the merge candidate may be derived as CPMV of the CP1.

The encoding apparatus may encode the merge candidate index indicating the selected merge candidate from among the merge candidates. The merge candidate index may indicate the one merge candidate among the merge candidates included in the merge candidate list for the current block.

The encoding apparatus encodes image information including prediction information on the current block (S1520).

The encoding apparatus may output image information including information on the current block in the form of a bitstream. The encoding apparatus may encode the image information, the image information may include the prediction information on the current block, and the prediction information may include the merge candidate index.

As described above, the merge candidate index may indicate the selected merge candidate among the merge candidates included in the merge candidate list for the current block.

Meanwhile, as an example, the encoding apparatus may derive prediction samples for the current block based on the CPMVs, derive the residual sample for the current block based on prediction sample and original sample for the current block, generate information on residual for the current block based on the residual sample, and encode information on the residual. The image information may include information on the residual.

Meanwhile, the bitstream may be transmitted to the decoding apparatus through a network or a (digital) storage medium. Here, the network may include a broadcast network and/or a communication network, and the digital storage medium may include various storage media such as USB, SD, CD, DVD, Blu-ray, HDD, SSD, and the like.

Figure 16:
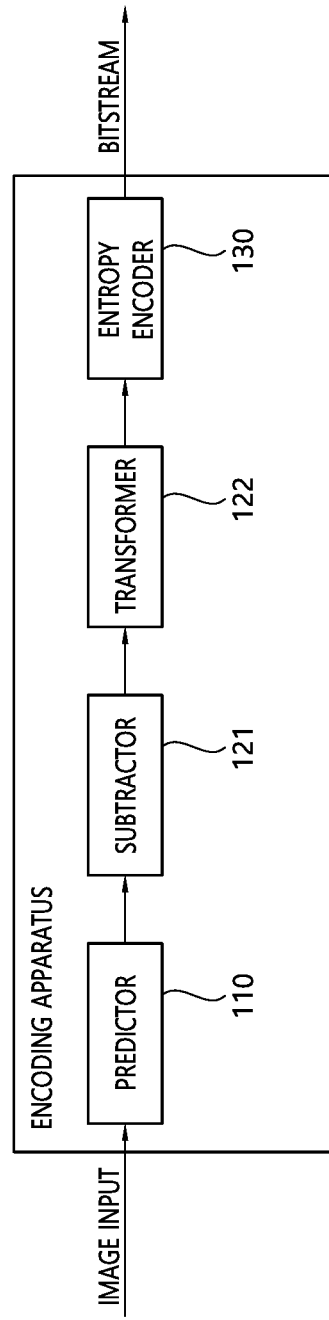
FIG. 16 schematically represents an encoding apparatus performing an image encoding method according to the present document.

FIG. 16 schematically represents an encoding apparatus performing an image encoding method according to the document. The method disclosed in FIG. 15 may be performed by the encoding apparatus disclosed in FIG. 16. Specifically, for example, the predictor of FIG. 16 may perform S1500 to S1510 in FIG. 15; and the entropy encoder of the encoding apparatus, S1520 in FIG. 15. Further, although not shown, the process of deriving prediction samples for the current block based on the CPMVs may be performed by the predictor of the encoding apparatus of FIG. 1; the process of deriving the residual sample for the current block based on the prediction sample and the original sample for the current block, by the subtractor of the encoding apparatus of FIG. 16; the process of generating information on residual for the current block based on the residual sample, by the transformer of the encoding apparatus of FIG. 16; and the process of encoding the information on residual, by the entropy encoder of the encoding apparatus of FIG. 16.

Figure 17:
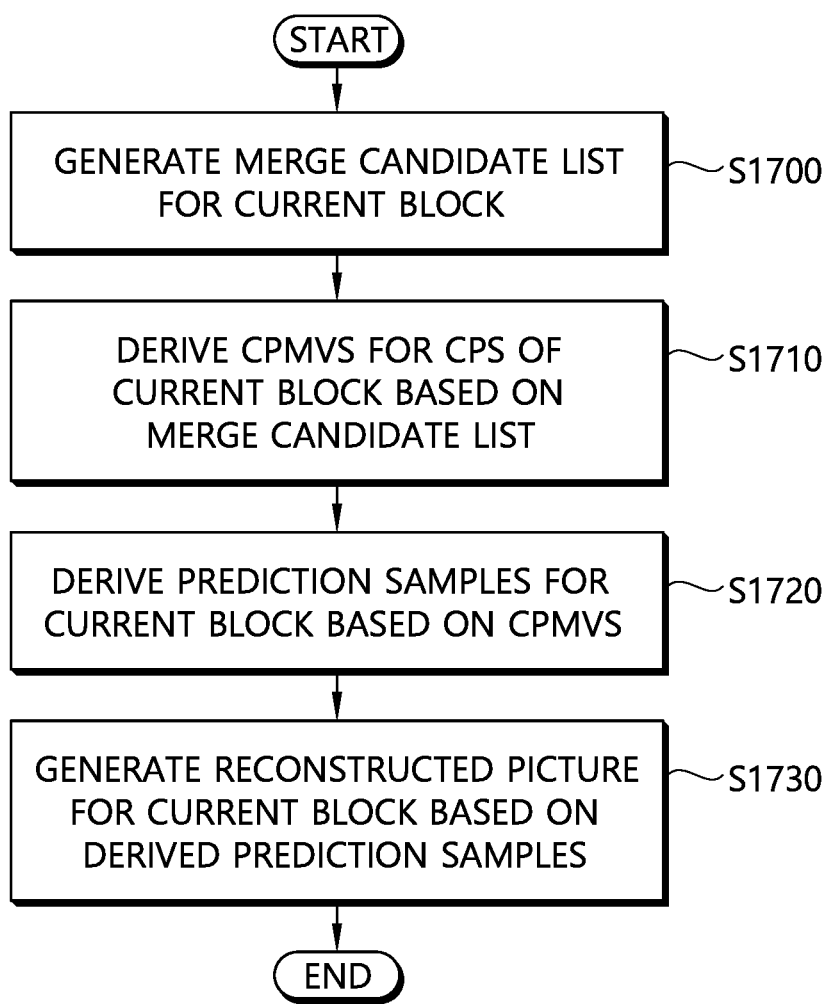
FIG. 17 schematically represents an image decoding method by a decoding apparatus according to the present document.

FIG. 17 schematically represents an image decoding method by a decoding apparatus according to the present document. The method disclosed in FIG. 17 may be performed by the decoding apparatus disclosed in FIG. 2. Specifically, S1700 to S1720 in FIG. 17 may be performed by the predictor of the decoding apparatus; and S1730, by the adder of the decoding apparatus. Further, although not shown, the process of acquiring image information including prediction information and/or information on residual of the current block through a bitstream may be performed by the entropy encoder of the decoding apparatus; and the process of deriving the residual sample for the current block based on information on the residual, by the inverse transformer of the decoding apparatus.

The decoding apparatus constitutes the merge candidate list (affine merge candidate list) for the current block (S1700).

The decoding apparatus may constitute the merge candidate list including candidates for the current block. The candidates may include inherited candidates and constructed candidates.

As an example, the inherited candidates may be derived based on the neighboring blocks of the current block, and the maximum number of the inherited candidates may be two. For example, the inherited candidates may include a first inherited candidate and a second inherited candidate.

Specifically, the first inherited candidate may be derived based on a left block group including the bottom-left corner neighboring block (bottom-left corner neighboring block) and the left neighboring block (left neighboring block) of the current block. For example, the neighboring blocks in the left block group may be checked in a first sequence, and the first inherited candidate, which is an affine motion model that has been first checked, may be derived based on the coded neighboring block. Here, the first sequence may be a sequence from the bottom-left corner neighboring block to the left neighboring block.

Further, the second inherited candidate may be derived based on a top block group including the top-right corner neighboring block (top-right neighboring block), the top neighboring block (top neighboring block), and the top-left corner neighboring block (top-left corner neighboring block) of the current block. For example, the neighboring blocks in the top block group may be checked in a second sequence, and the second inherited candidate may be derived based on the neighboring block that has been coded with an affine motion model which has been first checked. Here, the second sequence may be a sequence from the top-right corner neighboring block to the top neighboring block, and then to the top-left corner neighboring block.

Meanwhile, if a size is W×H, and x component of the top-left sample position of the current block is 0 and y component thereof is 0, the bottom-left corner neighboring block may be a block including a sample at coordinates (−1, H); the left neighboring block, a block including a sample at coordinates (−1, H−1); the top-right corner neighboring block, a block including a sample at coordinates (W, −1); the top neighboring block, a block including a sample at coordinates (W−1, −1); and the top-left corner neighboring block, a block including a sample at coordinates (−1, −1). That is, the left neighboring block may be a left neighboring block among the left neighboring blocks of the current block, which is located at a lowermost side; and the top neighboring block, a top neighboring block among the top neighboring blocks of the current block, which is located at a leftmost side.

Further, as an example, the inherited candidates may be derived based on the neighboring blocks of the current block, and the maximum number of the inherited candidates may be one.

Specifically, for example, the neighboring blocks may be checked in a certain sequence, and the second inherited candidate may be derived based on the neighboring block that has been coded with an affine motion model which has been first checked. Here, the neighboring blocks may include a left neighboring block, a top neighboring block, a bottom-left corner neighboring block, a top-right corner neighboring block and a top-left corner neighboring block of the current block. Further, the certain sequence may be a sequence from the left neighboring block to the top neighboring block to the bottom-left corner neighboring block to the top-right corner neighboring block and then to the top-left corner neighboring block.

Meanwhile, if a size is W×H, and x component of the top-left sample position of the current block is 0 and y component thereof is 0, the bottom-left corner neighboring block may be a block including a sample at coordinates (−1, H); the left neighboring block, a block including a sample at coordinates (−1, H−1); the top-right corner neighboring block, a block including a sample at coordinates (W, −1); the top neighboring block, a block including a sample at coordinates (W−1, −1); and the top-left corner neighboring block, a block including a sample at coordinates (−1, −1). That is, the left neighboring block may be a left neighboring block among the left neighboring blocks of the current block, which is located at a lowermost side; and the top neighboring block, a top neighboring block among the top neighboring blocks of the current block, which is located at a leftmost side.

Alternatively, as an example, the inherited candidates may be derived based on the neighboring blocks of the current block, and the reference picture indexes of the inherited candidates may represent reference pictures different from each other. For example, the neighboring blocks may be checked in a certain sequence, and the first inherited candidate may be derived based on the first neighboring block coded with an affine motion model. After this, if the reference picture index of the second neighboring block coded with the affine motion model, which follows the first neighboring block according to the certain sequence represents the reference picture different from the reference picture index of the first neighboring block, the second inherited candidate may be derived based on the second neighboring block. If the reference picture index of the second neighboring block represents the same reference picture as the reference picture index of the first neighboring block, no inherited candidate may be derived based on the second neighboring block.

Further, as an example, the constructed candidates may be derived based on the neighboring blocks of the current block.

For example, the candidate motion vectors for the control points (CP) of the current block based on the neighboring blocks may be derived. Here, the CPs may include CP0, CP1, CP2 and CP3. The CP0 may represent a top-left position of the current block; the CP1, a top-right position of the current block; the CP2, a bottom-left position of the current block; and the CP3, a bottom-right position of the current block.

Further, the neighboring blocks may include a neighboring block A, a neighboring block B, a neighboring block C, a neighboring block D, a neighboring block E, a neighboring block F and a neighboring block G. If a size is W×H, and x component of the top-left sample position of the current block is 0 and y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block D, a block including a sample at coordinates (W−1, −1); the neighboring block E, a block including a sample at coordinates (W, −1); the neighboring block F, a block including a sample at coordinates (−1, H−1); and the neighboring block G, a block including a sample at coordinates (−1, H). That is, the neighboring block A may be the topmost corner neighboring block of the current block; the neighboring block B, the top neighboring block among the top neighboring blocks of the current block, which is located at the leftmost side; the neighboring block C, the left neighboring block among the left neighboring blocks of the current block, which is located at the uppermost side; the neighboring block D, the top neighboring block among the top neighboring blocks of the current block, which is located at the rightmost side; the neighboring block E, the top-right corner neighboring block of the current block; the neighboring block F, the left neighboring block among the left neighboring blocks of the current block, which is located at the lowermost side; and the neighboring block G, the bottom-left corner neighboring block of the current block. The neighboring block T may be the bottom-right corner neighboring block of the current block.

Specifically, for example, neighboring blocks in a first group may be checked in a first sequence whether it is available, and a motion vector of the first neighboring block which has been first confirmed to be available may be derived as a candidate motion vector for the CP0. That is, the candidate motion vector for the CP0 may be derived based on a motion vector of the first neighboring block which has been first confirmed to be available while checking the neighboring blocks in the first group in the first sequence whether it is available. The availability may represent that the neighboring block has been coded in inter prediction. That is, the available neighboring block may be a block to which the inter prediction has been applied. Here, for example, the first group may include the neighboring block A, the neighboring block B and the neighboring block C. The first sequence may be a sequence in the first group from the neighboring block A to the neighboring block B, and then to the neighboring block C. As one example, if the neighboring block A is available, the motion vector of the neighboring block A may be derived as the candidate motion vector for the CP0; if the neighboring block A is not available and the neighboring block B is available, the motion vector of the neighboring block B, as the candidate motion vector for the CP0; and if none of the neighboring blocks A and B is available and the neighboring block C is available, the motion vector of the neighboring block C, as the candidate motion vector for the CP0.

Further, for example, neighboring blocks in a second group may be checked in a second sequence whether it is available, and a motion vector of the second neighboring block which has been first confirmed to be available may be derived as a candidate motion vector for the CP0. That is, the candidate motion vector for the CP0 may be derived based on a motion vector of the second neighboring block which has been first confirmed to be available while checking the neighboring blocks in the second group in the second sequence whether it is available. The availability may represent that the neighboring block has been coded in inter prediction. That is, the available neighboring block may be a block to which the inter prediction has been applied. Here, the second group may include the neighboring block D and the neighboring block E. The second sequence may be a sequence in the second group from the neighboring block D to the neighboring block E. As one example, if the neighboring block D is available, the motion vector of the neighboring block D may be derived as the candidate motion vector for the CP0; and if the neighboring block D is not available and the neighboring block E is available, the motion vector of the neighboring block E, as the candidate motion vector for the CP0.

Further, for example, neighboring blocks in a third group may be checked in a third sequence whether it is available, and a motion vector of the third neighboring block which has been first confirmed to be available may be derived as a candidate motion vector for the CP1. That is, the candidate motion vector for the CP1 may be derived based on a motion vector of the third neighboring block which has been first confirmed to be available while checking the neighboring blocks in the third group in the third sequence whether it is available. The availability may represent that the neighboring block has been coded in inter prediction. That is, the available neighboring block may be a block to which the inter prediction has been applied. Here, the third group may include the neighboring block F and the neighboring block G. The third sequence may be a sequence in the third group from the neighboring block F to the neighboring block G. As one example, if the neighboring block F is available, the motion vector of the neighboring block F may be derived as the candidate motion vector for the CP1; and if the neighboring block F is not available and the neighboring block G is available, the motion vector of the neighboring block G, as the candidate motion vector for the CP1.

Further, for example, the encoding apparatus/decoding apparatus may check the temporal neighboring block (i.e., the neighboring block T) whether it is available, and if the temporal neighboring block (i.e., the neighboring block T) is available, a motion vector of the temporal neighboring block (i.e., the neighboring block T) may be derived as a candidate motion vector for the CP3.

After this, the constructed candidates may be derived based on the candidate motion vectors of the CPs.

The constructed candidates may be derived based on combination of at least two of the first neighboring block in the first group, the second neighboring block in the second group, the third neighboring block in the third group and the fourth neighboring block, and the first neighboring block, the second neighboring block, the third neighboring block and the fourth neighboring block constituting the combination have the same reference picture index. That the reference picture indexes are the same means that the reference pictures for the corresponding neighboring blocks are the same.

For example, if the reference picture for the first neighboring block, the reference picture for the second neighboring block and the reference picture for the third neighboring block are the same, the constructed candidates may include a first constructed candidate including the candidate motion vector for the CP0, the candidate motion vector for the CP1 and the candidate motion vector for the CP2.

Alternatively, for example, if the reference picture for the first neighboring block, the reference picture for the second neighboring block and the reference picture for the third neighboring block are the same, the constructed candidates may include the first constructed candidate, and a second constructed candidate including the candidate motion vector for the CP0 and the candidate motion vector for the CP0.

Alternatively, for example, if the reference picture for the first neighboring block, the reference picture for the second neighboring block and the reference picture for the third neighboring block are the same, the constructed candidates may include the first constructed candidate, the second constructed candidate, and a third constructed candidate including the candidate motion vector for the CP0 and the candidate motion vector for the CP1.

Alternatively, for example, if the reference picture for the first neighboring block, the reference picture for the second neighboring block and the reference picture for the third neighboring block are the same, the constructed candidates may include the first constructed candidate, the second constructed candidate, the third constructed candidate, and a fourth constructed candidate including the candidate motion vector for the CP0 and the candidate motion vector for the CP1.

Further, for example, if the reference picture for the first neighboring block and the reference picture for the second neighboring block are the same, the constructed candidates may include the second constructed candidate including the candidate motion vector for the CP0 and the candidate motion vector for the CP0.

Further, for example, if the reference picture for the first neighboring block and the reference picture for the third neighboring block are the same, the constructed candidates may include the third constructed candidate including the candidate motion vector for the CP0 and the candidate motion vector for the CP1.

Further, for example, if the reference picture for the second neighboring block and the reference picture for the third neighboring block are the same, the constructed candidates may include the fourth constructed candidate including the candidate motion vector for the CP0 and the candidate motion vector for the CP1.

Meanwhile, there may be proposed a method in which a combination including CPMV0 and CPMV2 or a combination including CPMV1 and CPMV2 is not considered in the process of deriving the constructed candidate as described above.

That is, the encoding apparatus/decoding apparatus may determine a CPMV pattern based on an available CPMV combination, wherein the CPMV pattern may not include the CPMV pattern 3 of Table 15 or the CPMV pattern 4 of Table 15. For example, the available constructed candidate may not include the constructed candidate including {CPMV0, CPMV2}. Further, the available constructed candidate may not include a constructed candidate including {CPMV1, CPMV2}.

That is, according to the present embodiment, when the available CPMV combination is generated, a candidate may be added into the candidate list by determining whether reference picture indexes of the current block and a constructed candidate are identical to each other, and specific CPMV combination may be excluded. For example, the available constructed candidate may not include the constructed candidate including {CPMV0, CPMV2}. Further, the available constructed candidate may not include a constructed candidate including {CPMV1, CPMV2}.

Further, if the number of the inherited candidates and the constructed candidates is less than the maximum candidate number of the merge candidate list, that is, if the number of the derived merge candidates is less than the maximum candidate number, the merge candidate list may include the zero candidate. The zero candidate may include candidate motion vectors whose values for the CPs are 0, and a reference picture index whose value is 0.

Alternatively, for example, if the number of the derived merge candidates is less than the maximum candidate number, a first zero candidate, a second zero candidate, a third zero candidate ... an $n^{th}$ zero candidate may be added in this order into the merge candidate list until the number of merge candidates of the merge candidate list reaches the maximum candidate number. For example, the first zero candidate may include candidate motion vectors whose values are 0, L0 (list 0) reference picture index and L1 (list 1) reference picture index whose values are 0; the second zero candidate, candidate motion vectors whose values are 0, L0 reference picture index whose value is 0, and L1 reference picture index whose value is 1; the third zero candidate may include candidate motion vectors whose values are 0, L0 reference picture index whose value is 1, and L1 reference picture index whose value is 0; and the fourth zero candidate may include candidate motion vectors whose values are 0, L0 reference picture index whose value is 1, and L1 reference picture index whose value is 1. Alternatively, for example, reference picture indexes of the neighboring block A, the neighboring block B, the neighboring block C, the neighboring block D, the neighboring block E, the neighboring block F, and neighboring block G may be included in the first zero candidate to the $n^{th}$ zero candidate in order of frequency (from highest to lowest). Alternatively, for example, the first zero candidate may include candidate motion vectors whose values are 0, and a reference picture index whose value is the same as that of the reference picture index of the left neighboring block of the current block; the second zero candidate, candidate motion vectors whose values are 0, and a reference picture index whose value is the same as that of the reference picture index of the top neighboring block of the current block; the third zero candidate, candidate motion vectors whose values are 0, and a reference picture index whose value is the same as that of the reference picture index of the bottom-left corner neighboring block of the current block; the fourth zero candidate, candidate motion vectors whose values are 0, and a reference picture index whose value is the same as that of the reference picture index of the top-right corner neighboring block of the current block; and the fifth zero candidate, candidate motion vectors whose values are 0, and a reference picture index whose value is the same as that of the reference picture index of the top-left corner neighboring block of the current block.

The decoding apparatus derives control point motion vectors (CPMVs) for control points (CPs) of the current block based on the merger candidate list (S1710).

The decoding apparatus may select one merge candidate from among merge candidates included in the merge candidate list, and derive CPMVs for the CPs of the current block based on the selected merger candidate.

For example, the decoding apparatus may acquire a merge candidate index for the current block from the bitstream, and derive CPMVs for the CPs of the current block based on the merger candidate among the merge candidates included in the merge candidate list, which the merge candidate index indicates. The decoding apparatus may acquire image information from the bitstream, and the image information may include the prediction information on the current block. The prediction information may include the merge candidate index.

Specifically, if the merge candidate includes the candidate motion vector for the CP0 and the candidate motion vector for the CP1, the candidate motion vector for CP0 of the merge candidate may be derived as CPMV of the CP0, and the candidate motion vector for CP1 of the merge candidate may be derived as CPMV of the CP1.

Further, if the merge candidate includes the merge motion vector for CP0 the candidate motion vector for CP1 and the candidate motion vector for CP2, the candidate motion vector for CP0 of the merge candidate may be derived as CPMV of the CP0, the candidate motion vector for CP1 of the merge candidate may be derived as CPMV of the CP1, and the candidate motion vector for CP2 of the merge candidate may be derived as CPMV of the CP2.

Further, if the selected merge candidate includes the merge motion vector for CP0 the candidate motion vector for CP1 and the candidate motion vector for CP3, the candidate motion vector for CP0 of the merge candidate may be derived as CPMV of the CP0, the candidate motion vector for CP1 of the merge candidate may be derived as CPMV of the CP1, and the candidate motion vector for CP3 of the merge candidate may be derived as CPMV of the CP3.

Further, if the merge candidate includes the candidate motion vector for CP0 and the candidate motion vector for CP1, the candidate motion vector for CP0 of the merge candidate may be derived as CPMV of the CP0, and the candidate motion vector for CP1 of the merge candidate may be derived as CPMV of the CP1.

The decoding apparatus may derive the prediction samples for the current block based on the CPMVs (S1720).

The decoding apparatus may derive motion vectors of sub-block units or sample units of the current block based on the CPMVs. That is, the decoding apparatus may derive motion vector of each sub-block or each sample of the current block based on the CPMVs. The motion vectors of the subblock units or the sample units may be derived based on above-described Equation 1 or Equation 3. The motion vectors may be represented as an affine motion vector field (MVF) or a motion vector array.

The decoding apparatus may derive prediction samples for the current block based on motion vectors of the sub-block units or the sample units. The decoding apparatus may derive a reference area in a reference picture based on motion vectors of the sub-block unit or the sample unit, and generate a prediction sample of the current block based on reconstruction sample in the reference area.

The decoding apparatus generates a reconstructed picture for the current block based on the derived prediction samples (S1730).

The decoding apparatus may generate a reconstructed picture for the current block based on the derived prediction samples. The decoding apparatus may use a prediction sample directly as a reconstruction sample according to prediction mode, or may generate a reconstruction sample by adding a residual sample to the prediction sample. If there exists a residual sample for the current block, the decoding apparatus may acquire image information including information on residual for the current block from the bitstream. The information on residual may include a transform coefficient relating to the residual sample. The decoding apparatus may derive the residual sample (or residual sample array) for the current block based on information on the residual. The decoding apparatus may generate a reconstruction sample based on the prediction sample and the residual sample, and derive a reconstruction block or reconstructed picture based on the reconstruction sample. After this, as described above, the decoding apparatus may apply an in-loop filtering procedure such as an SAO procedure and/or deblocking filtering to the reconstructed picture in order to improve subjective/objective video quality as needed.

Figure 18:
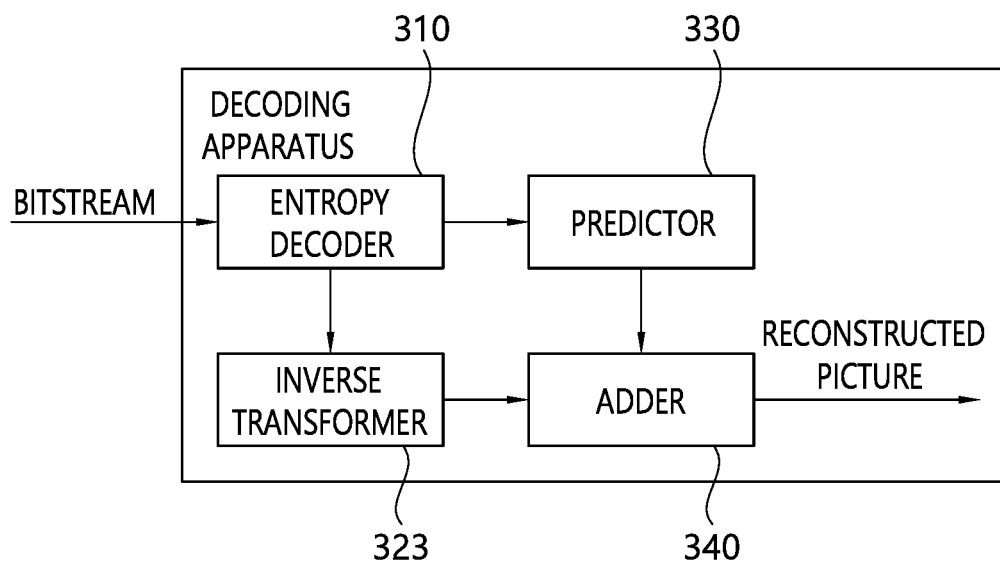
FIG. 18 schematically represents a decoding apparatus performing an image decoding method according to the present document.

FIG. 18 schematically represents a decoding apparatus performing an image decoding method according to the document. The method disclosed in FIG. 17 may be performed by the decoding apparatus disclosed in FIG. 18. Specifically, for example, a predictor of the decoding apparatus of FIG. 18 may perform S1700 to S1720 in FIG. 17; and an adder of the decoding apparatus of FIG. 18, S1730 in FIG. 17. Further, although not shown, the process of acquiring image information including prediction information and/or information on residual of the current block through a bitstream may be performed by an entropy encoder of the decoding apparatus of FIG. 18; and the process of deriving the residual sample for the current block based on the residual information, by an inverse transformer of the decoding apparatus of FIG. 18.

According to the present document, it is possible to reduce operation complexity of the merge mode, which can lead to improved efficiency of general image coding.

Further, according to the present document, it is possible to reduce operation complexity of the process of constituting a merge candidate list and the process of deriving a constructed candidate and improve coding efficiency by adding a motion vector for a neighboring block whose reference picture index is the same when deriving a constructed candidate list.

In the above-described embodiment, the methods are explained on the basis of a flowchart by means of a series of steps or blocks, but the present document is not limited to the order of steps, and a certain step may occur in a different order or concurrently with other steps than those described above. Further, it may be understood by a person having ordinary skill in the art that the steps shown in a flowchart is not exclusive, and that another step may be incorporated or one or more steps of the flowchart may be removed without affecting the scope of the present document.

Figure 19:
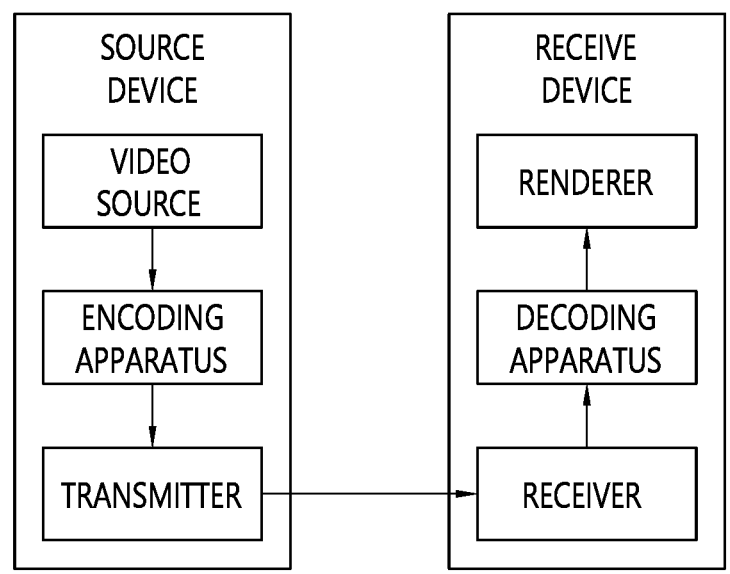
FIG. 19 schematically represents an example of a video/image coding system to which the present document may be applied.

FIG. 19 schematically represents an example of a video/image coding system to which the present document may be applied.

Referring to FIG. 9, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Further, embodiments described in the present document may be embodied and performed on a processor, a microprocessor, a controller or a chip. For example, function units shown in each drawing may be embodied and performed on a processor, a microprocessor, a controller or a chip. In this case, information or algorithm for embodying (e.g., information on instruction) may be stored in a digital storage medium.

Further, the decoding apparatus and the encoding apparatus to which the present document is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an internet streaming service providing device, a three-dimensional (3D) video device, a video telephony video device, a transportation means terminal (e.g., a vehicle terminal, an aircraft terminal, a ship terminal, etc.) and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present document is applied may be produced in the form of a program executed by a computer, and be stored in a computer-readable recording medium. Multimedia data having a data structure according to the present document may be also stored in a computer-readable recording medium. The computer-readable recording medium includes all kinds of storage devices and distribution storage devices in which computer-readable data are stored. The computer-readable recording medium may include, for example, a Blu-ray Disc (BD), a Universal Serial Bus (USB), a ROM, a PROM, an EPROM, an EEPROM, a RAM, a CD-ROM, a magnetic tape, a floppy disk and an optical data storage device. Further, the computer-readable recording medium also includes media embodied in the form of a carrier wave (for example, transmission over the Internet). In addition, the bit stream generated by the encoding method may be stored in a computer-readable recording medium or transmitted through a wired or wireless communication network.

Additionally, the embodiment of the present document may be embodied as a computer program product by program codes, and the program codes may be performed in a computer by the embodiment of the present document. The program codes may be stored on a computer-readable carrier.

Figure 20:
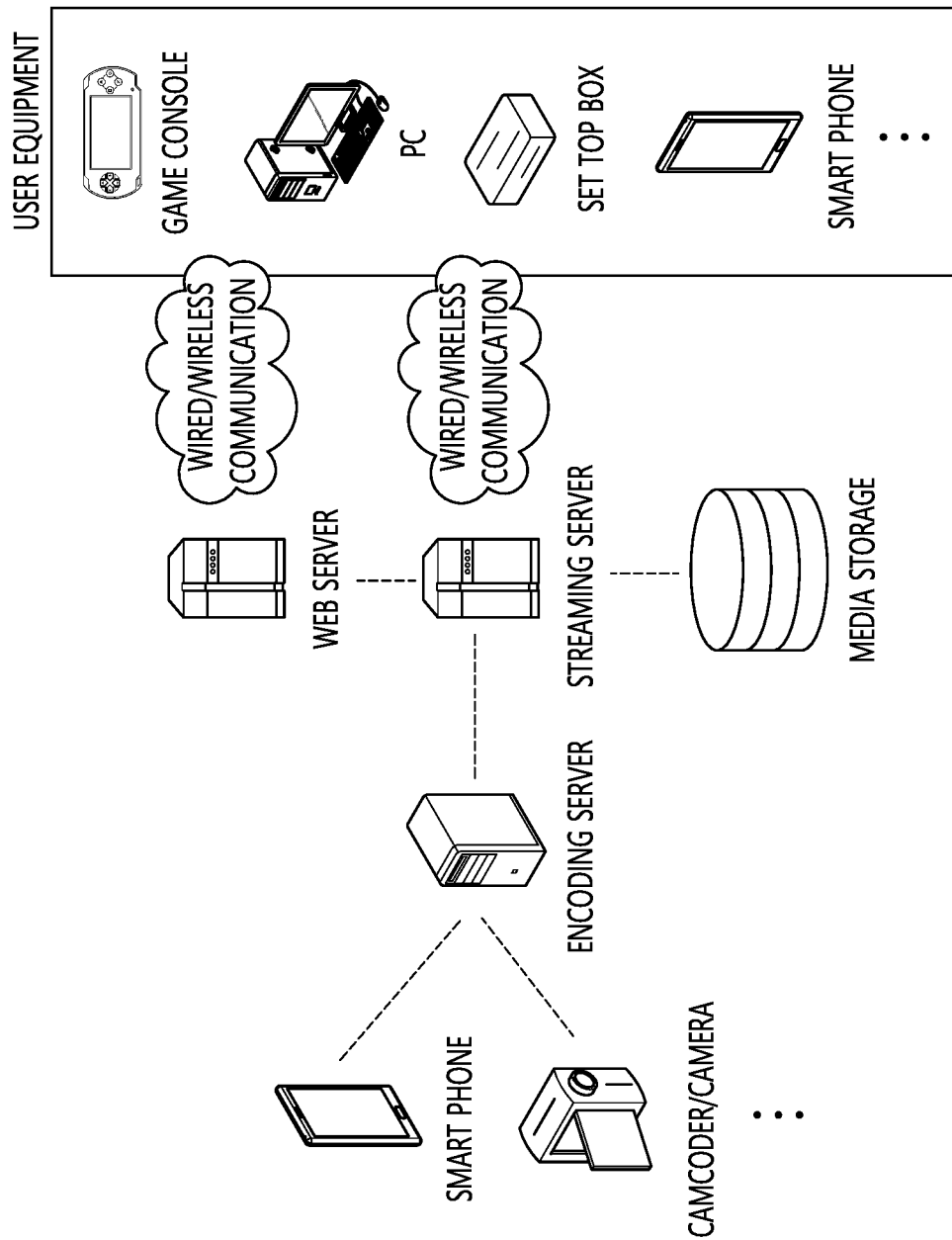
FIG. 20 illustratively represents a contents streaming system structure diagram to which a technology disclosed in the present document may be applied.

FIG. 20 illustratively represents a contents streaming system structure diagram to which the present document is applied.

The content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like. Each server in the content streaming system may be operated as a distributed server, in which case data received from each server may be distributed.

What is claimed is:

1. An image decoding method performed by a decoding apparatus, the image decoding method comprising:

constituting a merge candidate list for a current block, wherein the merge candidate list includes a constructed candidate;

deriving control point motion vectors (CPMVs) for control points (CPs) of the current block based on the constructed candidate included in the merge candidate list;

deriving prediction samples for the current block by performing an inter prediction based on the CPMVs; and generating a reconstructed picture for the current block based on the derived prediction samples, wherein the CPs includes CP0, CP1, CP2 and CP3, wherein a candidate motion vector for the CP0 is derived based on a first neighboring block derived from three neighboring blocks included in a first group, a candidate motion vector for the CP1 is derived based on a second neighboring block derived from two neighboring blocks included in a second group, a candidate motion vector for the CP2 is derived based on a third neighboring block derived from two neighboring blocks included in a third group and a candidate motion vector for the CP3 is derived based on a temporal neighboring block, wherein the constructed candidate is derived based on a combination of candidate motion vectors for three CPs among the CP0, the CP1, the CP2 and the CP3, wherein the constituting the merge candidate list for the current block comprises determining whether a reference picture of the first neighboring block used for deriving the candidate motion vector for the CP0 related to a top-left corner of the current block, a reference picture of the second neighboring block used for deriving the candidate motion vector for the CP1 related to a top-right corner of the current block, and a reference picture of the third neighboring block used for deriving the candidate motion vector for the CP2 related to a bottom-left corner of the current block are a same reference picture, wherein based on the determination that the reference picture of the first neighboring block used for deriving the candidate motion vector for the CP0 related to the top-left corner of the current block, the reference picture of the second neighboring block used for deriving the candidate motion vector for the CP1 related to the top-right corner of the current block and the reference picture of the third neighboring block used for deriving the candidate motion vector for the CP2 related to the bottom-left corner of the current block are the same reference picture, the constructed candidate for a 6-parameter affine model comprises CPMV0 for the CP0, CPMV1 for the CP1 and CPMV2 for the CP2, and wherein based on the determination that the reference picture of the first neighboring block used for deriving the candidate motion vector for the CP0 related to the top-left corner of the current block and the reference picture of the second neighboring block used for deriving the candidate motion vector for the CP1 related to the top-right corner of the current block are the same reference picture, the constructed candidate for a 4-parameter affine model is derived based on a combination of the candidate motion vector for the CP0 and the candidate motion vector for the CP1.

2. An image encoding method performed by an encoding apparatus, the image encoding method comprising:

constituting a merge candidate list for a current block, wherein the merge candidate list includes a constructed candidate;

deriving control point motion vectors (CPMVs) for control points (CPs) of the current block based on the constructed candidate included in the merge candidate list; and deriving prediction samples for the current block by performing an inter prediction based on the CPMVs;

deriving residual samples for the current block based on the prediction samples; and encoding image information including prediction information and residual information, wherein the CPs includes CP0, CP1, CP2 and CP3, wherein a candidate motion vector for the CP0 is derived based on a first neighboring block derived from three neighboring blocks included in a first group, a candidate motion vector for the CP1 is derived based on a second neighboring block derived from two neighboring blocks included in a second group, a candidate motion vector for the CP2 is derived based on a third neighboring block derived from two neighboring blocks included in a third group and a candidate motion vector for the CP3 is derived based on a temporal neighboring block, wherein the constructed candidate is derived based on a combination of candidate motion vectors for three CPs among the CP0, the CP1, the CP2 and the CP3, wherein the constituting the merge candidate list for the current block comprises determining whether a reference picture of the first neighboring block used for deriving the candidate motion vector for the CP0 related to a top-left corner of the current block, a reference picture of the second neighboring block used for deriving the candidate motion vector for the CP1 related to a top-right corner of the current block, and a reference picture of the third neighboring block used for deriving the candidate motion vector for the CP2 related to a bottom-left corner of the current block are a same reference picture, wherein based on the determination that the reference picture of the first neighboring block used for deriving the candidate motion vector for the CP0 related to the top-left corner of the current block, the reference picture of the second neighboring block used for deriving the candidate motion vector for the CP1 related to the top-right corner of the current block and the reference picture of the third neighboring block used for deriving the candidate motion vector for the CP2 related to the bottom-left corner of the current block are the same reference picture, the constructed candidate for a 6-parameter affine model comprises CPMV0 for the CP0, CPMV1 for the CP1 and CPMV2 for the CP2, and wherein based on the determination that the reference picture of the first neighboring block used for deriving the candidate motion vector for the CP0 related to the top-left corner of the current block and the reference picture of the second neighboring block used for deriving the candidate motion vector for the CP1 related to the top-right corner of the current block are the same reference picture, the constructed candidate for a 4-parameter affine model is derived based on a combination of the candidate motion vector for the CP0 and the candidate motion vector for the CP1.

3. A non-transitory computer readable storage medium storing a bitstream generated by a method, the method comprising:

constituting a merge candidate list for a current block, wherein the merge candidate list includes a constructed candidate;

deriving control point motion vectors (CPMVs) for control points (CPs) of the current block based on the constructed candidate included in the merge candidate list; and deriving prediction samples for the current block by performing an inter prediction based on the CPMVs;

deriving residual samples for the current block based on the prediction samples; and encoding image information including prediction information and residual information to generate the bitstream, wherein the CPs includes CP0, CP1, CP2 and CP3, wherein a candidate motion vector for the CP0 is derived based on a first neighboring block derived from three neighboring blocks included in a first group, a candidate motion vector for the CP1 is derived based on a second neighboring block derived from two neighboring blocks included in a second group, a candidate motion vector for the CP2 is derived based on a third neighboring block derived from two neighboring blocks included in a third group and a candidate motion vector for the CP3 is derived based on a temporal neighboring block, wherein the constructed candidate is derived based on a combination of candidate motion vectors for three CPs among the CP0, the CP1, the CP2 and the CP3, wherein the constituting the merge candidate list for the current block comprises determining whether a reference picture of the first neighboring block used for deriving the candidate motion vector for the CP0 related to a top-left corner of the current block, a reference picture of the second neighboring block used for deriving the candidate motion vector for the CP1 related to a top-right corner of the current block, and a reference picture of the third neighboring block used for deriving the candidate motion vector for the CP2 related to a bottom-left corner of the current block are a same reference picture, wherein based on the determination that the reference picture of the first neighboring block used for deriving the candidate motion vector for the CP0 related to the top-left corner of the current block, the reference picture of the second neighboring block used for deriving the candidate motion vector for the CP1 related to the top-right corner of the current block and the reference picture of the third neighboring block used for deriving the candidate motion vector for the CP2 related to the bottom-left corner of the current block are the same reference picture, the constructed candidate comprises for a 6-parameter affine model CPMV0 for the CP0, CPMV1 for the CP1 and CPMV2 for the CP2, and wherein based on the determination that the reference picture of the first neighboring block used for deriving the candidate motion vector for the CP0 related to the top-left corner wherein based on the determination that the reference picture of the first neighboring block used for deriving the candidate motion vector for the CP0 related to the top-left corner of the current block and the reference picture of the second neighboring block used for deriving the candidate motion vector for the CP1 related to the top-right corner of the current block are the same reference picture, the constructed candidate for a 4-parameter affine model is derived based on a combination of the candidate motion vector for the CP0 and the candidate motion vector for the CP1.

* * * * *